(12) United States Patent
Takeda et al.

(10) Patent No.: US 7,349,518 B2
(45) Date of Patent: Mar. 25, 2008

(54) BOILING WATER REACTOR CORE AND FUEL ASSEMBLIES THEREFOR

(75) Inventors: Renzou Takeda, Kawasaki (JP); Motoo Aoyama, Mito (JP); Junichi Miwa, Mito (JP); Tomohiko Ikegawa, Hitachi (JP); Kumiaki Moriya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/376,415

(22) Filed: Mar. 16, 2006

(65) Prior Publication Data
US 2006/0210009 A1  Sep. 21, 2006

Related U.S. Application Data

(62) Division of application No. 10/804,112, filed on Mar. 19, 2004.

(30) Foreign Application Priority Data
Mar. 20, 2003  (JP)  ............................. 2003-076769

(51) Int. Cl.
*G21C 3/32*  (2006.01)
(52) U.S. Cl. .................. 376/434; 376/426; 376/443; 376/444; 376/370
(58) Field of Classification Search ........ 376/370–376, 376/409, 426, 428, 434–449
See application file for complete search history.

(56) References Cited

U.S. PATENT DOCUMENTS

| | | | | |
|---|---|---|---|---|
| 3,147,191 A | * | 9/1964 | Crowther | .................... 376/172 |
| 5,171,522 A | * | 12/1992 | Fennern | ...................... 376/444 |
| 5,377,247 A | * | 12/1994 | Yoshioka et al. | ........... 376/428 |
| 5,383,229 A | * | 1/1995 | Nakajima et al. | ........... 376/434 |
| 5,388,132 A | * | 2/1995 | Aoyama et al. | ............. 376/435 |
| 5,640,435 A | * | 6/1997 | Kurosaki et al. | ........... 376/444 |
| 5,940,461 A | * | 8/1999 | Takeda et al. | ............... 376/171 |
| 5,978,431 A | * | 11/1999 | Edwards | ..................... 376/261 |
| 6,512,805 B1 | * | 1/2003 | Takeda et al. | ............... 376/171 |
| 6,658,078 B2 | * | 12/2003 | Anegawa et al. | ........... 376/435 |
| 6,925,138 B2 | * | 8/2005 | Nakamaru et al. | .......... 376/347 |

* cited by examiner

*Primary Examiner*—Ricardo J. Palabrica
(74) *Attorney, Agent, or Firm*—Antonelli, Terry, Stout & Kraus, LLP.

(57) ABSTRACT

A ratio of the number of fuel assemblies loaded on a core to the number of control rod drive mechanisms is 3 or more. The fuel assembly itself contains mixed oxides of a low enrichment concentration uranium oxide containing 3 to 8 wt % in the average enrichment concentration of the fuel assembly, or mixed oxide containing not less than 2 wt %, but less than 6 wt % in the average enrichment concentration of fissile plutonium of. In the burner type BWR core on which the fuel assemblies are loaded, an average weight density of uranium, plutonium and minor actinides is 2.1 to 3.4 kg/L as a conversion at the value of unburned state.

8 Claims, 24 Drawing Sheets

○ 4.9 wt %
● 4.0 wt %
◍ 4.9 wt % (Gd$_2$O$_3$ 4.5wt%)

○ 7.5wt%
● 6.5wt%
◍ 7.5wt% (Gd$_2$O$_3$ 4.5wt%)

○ Puf 5.9wt%
● Puf 5.0wt%
◍ Puf 5.9wt% (Gd$_2$O$_3$ 4.5wt%)

○ 4.9 wt %
● 4.0 wt %
◍ 4.9 wt % (Gd$_2$O$_3$ 4.5wt%)

○ 4.9 wt %
● 4.0 wt %
◍ 4.9 wt % ($Gd_2O_3$ 4.5wt%)

○ 4.9 wt%
● 4.0 wt%
◐ 4.9 wt% ($Gd_2O_3$ 4.5 wt%)

○ 4.9wt%
● 4.0wt%
◉ 4.9wt% (Gd$_2$O$_3$ 4.5wt%)

○ 4.9 wt%
● 4.0 wt%
◉ 4.9 wt% ($Gd_2O_3$ 4.5wt%)

○ 4.9wt%
● 4.0wt%
◐ 4.9wt% (Gd$_2$O$_3$ 4.5wt%)

○ 4.9wt%
● 4.0wt%

○ 4.9wt%
● 4.0wt%

○ 4.9wt%
● 4.0wt%
◐ 4.9wt% ($Gd_2O_3$ 4.5wt%)

○ 4.9 wt %
● 4.0 wt %
◉ 4.9 wt % (Gd₂O₃ 4.5wt%)

○ 4.9 wt %
● 4.0 wt %
◉ 4.9 wt % (Gd₂O₃ 4.5wt%)

○ 4.9 wt %
● 4.0 wt %
◍ 4.9 wt % (Gd$_2$O$_3$ 4.5wt%)

○ 4.9 wt %
● 4.0 wt %
◍ 4.9 wt % (Gd$_2$O$_3$ 4.5wt%)

○ 4.9 wt %
● 4.0 wt %
◍ 4.9 wt % (Gd$_2$O$_3$ 4.5wt%)

○ 4.9 wt %
● 4.0 wt %
◐ 4.9 wt % ($Gd_2O_3$ 4.5wt%)

○ 4.9 wt %
● 4.0 wt %

○ 4.9wt%
● 4.0wt%
◉ 4.9wt% (Gd$_2$O$_3$ 4.5wt%)

○ 7.5 wt%
● 6.5 wt%
⊘ 7.5 wt% (Gd$_2$O$_3$ 4.5wt%)

○ 4.9 wt%
● 4.0 wt%

○ 4.9wt%
● 4.0wt%
⊘ 4.9wt% (Gd$_2$O$_3$ 4.5wt%)

○ 4.9wt%
● 4.0wt%
⊘ 4.9wt% (Gd$_2$O$_3$ 4.5wt%)

○ 4.9 wt%
● 4.0 wt%
◍ 4.9 wt% (Gd$_2$O$_3$ 3.7wt%)
◉ 4.9 wt% (PART-LENGTH FUEL ROD)

○ 4.9wt%
● 4.0wt%
◎ 4.9wt% (Gd₂O₃ 3.7wt%)
⊛ 4.9wt% (PART-LENGTH FUEL ROD)

○ 4.9 wt %
● 4.0 wt %
◐ 4.9 wt % (Gd$_2$O$_3$ 3.7wt%)
⊛ 4.9 wt % (PART-LENGTH FUEL ROD)

○ 4.9 wt%
● 4.0 wt%
◐ 4.9 wt% (Gd$_2$O$_3$ 3.7wt%)
⊛ 4.9 wt% (PART-LENGTH FUEL ROD)

○ 4.9 wt%
● 4.0 wt%
◐ 4.9 wt% (Gd$_2$O$_3$ 4.5wt%)

○ 4.9 wt%
● 4.0 wt%
◍ 4.9 wt% ($Gd_2O_3$ 4.5wt%)

○ 4.9 wt%
● 4.0 wt%
◍ 4.9 wt% ($Gd_2O_3$ 4.5wt%)

BOILING WATER REACTOR CORE AND FUEL ASSEMBLIES THEREFOR

CROSS REFERENCE TO RELATED APPLICATION

This application is a Divisional application of U.S. application Ser. No. 10/804,112, filed Mar. 19, 2004, the contents of which are incorporated herein by reference.

FIELD OF THE INVENTION

The present invention related to a core of a boiling water reactor (BWR) and a fuel assembly for constituting the core.

BACKGROUND OF THE INVENTION

A boiling water reactor core using water as a neutron moderator and a cooling medium is constituted by a number of fuel assemblies, water flowing through the fuel assemblies, control rods inserted and withdrawn between the fuel assemblies, etc. In the construction of the fuel assemblies and control rods, as shown in FIG. 8 of the patent document 1, the BWR fuel assemblies are surrounded by channel boxes.

Fuel rods containing uranium, plutonium and minor actinides and arranged in square lattice are disposed within the inner area of the fuel assemblies. In an ABWR core, the length of the fuel rod which contains uranium, plutonium and minor actinides in the vertical direction is about 3.7 m. In the present invention, this length is abbreviated as an active fuel length. When the fuel assembly is constituted by such fuel rods as having different lengths, the longest fuel rod in the fuel assembly is referred to as the active fuel length. The core is constituted by 872 fuel assemblies and 205 of cross-shaped control rods.

Since water works as both moderator for neutrons and cooling medium for control rods in the boiling water reactor, it is said that the fuel rods and water are arranged as homogeneously as possible. Thus, in PWRs now under operation, fuel rods and water are arranged almost homogeneously.

On the other hand, since BWRs are the direct cycle type, wherein steam is present in the reactor core which is two phase flow, channel boxes are disposed to prevent cross flow of steam phase in the transverse direction, and cross shaped control rods are inserted into gaps between the channel boxes. In recent high burnup fuels, in order to secure 4 to 5 of H/HM (atomic number ratio of hydrogen to heavy metal; the heavy metals include uranium, plutonium and minor actinides such as Np, Am, Cm, etc.), with an increase in enrichment, water rods are disposed in the center of the fuel assembly. This structure apparently seems to be not homogeneous; however, the above-mentioned structure was necessarily employed, because of the structure comprising the channel box and cross-shaped control rods.

The basic concept that aims at the homogeneousness is common to the PWRs, however. As a result, in the ABWR reactor cores having about 155 mm of a fuel assembly lattice pitch to secure sufficient moderating effect of two-phase flow, the two-phase flow occupies 40% or more of valuable space in the reactor core. Thus, a volume rate of the fuel material area is only 20%, the volume rate being a volume rate of fuel pellet area. Although, in view of a further reduction of spent fuels and increase in fuel economy, a great increase in a discharged burnup is strongly desired. Although there was prepossession of consistency for attaining both neutron moderating and heat removal, new design for increase in H/HM so as to improve reduction of shutdown margin and reactivity coefficient of the reactor with the high enrichment is being investigated.

On the other hand, the patent documents 2 and 3 disclose a design wherein distribution of moderating material in and outside of the channel boxes is changed; the range of H/HM was 4 to 5, however. The study for increasing fuels has not been conducted.

The conventional design has been prepossessed by structure for attaining the functions of neutron moderating and heat removal; such new designs as to separate functions of water and to increase fuel loading per unit volume without losing fuel economy and thermal margin has not been investigated.

Patent document 1: Japanese Patent Laid-open Hei 3-273189
Patent document 2: Japanese Patent Laid-open Hei 7-167988
Patent document 3: Japanese Patent Laid-open Shou 63-231298

SUMMARY OF THE INVENTION

The present invention aims at solving on or more of the following objects.

One of objects of the present invention is to provide a reactor core and fuel assemblies that contribute to construction of such electric power plants as having a greatly lowered building height at a low building cost, keeping the same thermal margin and safety as those of the BWRs under operation.

Another object of the present invention is to provide a reactor core and fuel assemblies that contribute to increasing of production of plutonium during operation and lowering of the fuel cycle cost, keeping the same thermal margin and safety as those of BWRs under operation.

Still another object of the present invention is to provide a reactor core and fuel assemblies that contribute to power generation cost reduction by lengthening continuous operation to improve an operational cycle length of the power plant, keeping the same thermal margin and safety as the BWRs under operation.

Still another object of the present invention is to provide a reactor core and fuel assemblies that contribute to improvement of shutdown performance and transient and stability which are the subjects of high burnup reactors, by reducing the reactivity increase at the cold condition and the absolute values of a void coefficient, keeping the same thermal margin and safety as those of BWRs in operation.

BRIEF DESCRIPTION OF DRAWINGS

FIG. 8b is a lateral cross sectional view of a fuel assembly, which is loaded on the core of FIG. 8a.

FIG. 9b is a lateral cross sectional view of a fuel assembly, which is loaded on the core of FIG. 9a.

FIG. 36a is a lateral cross sectional view of a quarter of the top guide beam where four fuel assemblies shown in FIG. 35 are loaded.

FIG. 36b is a vertical sectional view along the line A-A shown in FIG. 36a.

FIG. 39 is a lateral cross sectional view of a fuel assembly according to another embodiment, where the contour of the lateral view of the water rod is modified from the cross-shaped water rod shown in FIG. 35, etc.

FIG. 40 is a lateral cross sectional view of a fuel assembly according to another embodiment, where the water rod is constituted by a group of five round rods, and part-length fuel rods are employed for the fuel assemblies shown in FIG. 35.

FIG. 41 is a lateral cross sectional view of a fuel assembly according to another embodiment of the present invention, where the water rod is constituted by a group of four round rods, and the part-length fuel rods as shown in FIG. 35 and FIG. 36b are employed.

FIG. 42 is a lateral cross sectional view of a fuel assembly according to another embodiment.

FIG. 43 is a lateral cross sectional view of a fuel assembly according to another embodiment of the present invention.

DESCRIPTION OF THE INVENTION

Figure 1:
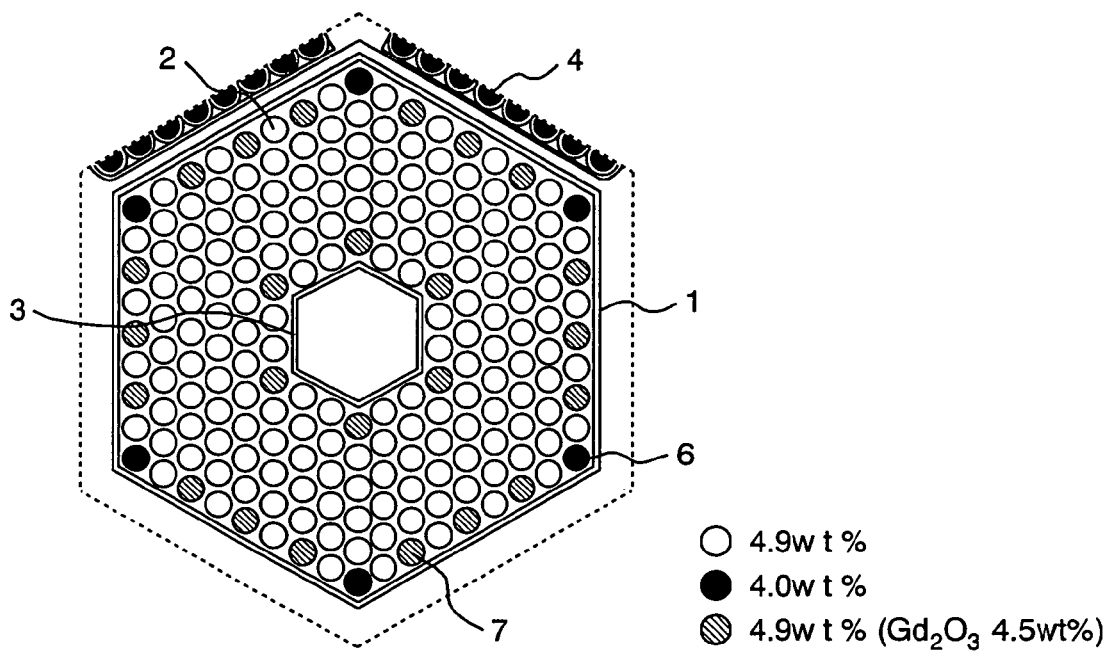
FIG. 1 is a lateral cross sectional view of the first embodiment according to the present invention.

In case where a ratio of the number of fuel assemblies loaded on a reactor core to the number of control rod drive mechanisms is 3 or more, the following inventions attain at least one of the above-mentioned first to third objects. That is, one aspect of the invention that attains one or more of the first, second and third objects and provides a BWR core characterized in that an average weight of uranium, plutonium and minor actinides contained in the core per unit volume is 2.1 to 3.4 kg/L as a conversion into a value at the time of unburned state.

The increase in the fuel loading quantity per unit volume makes the height of the core shorter, thereby to reduce the construction cost of the power plant. Further, the water-to-fuel volume ratio in the channel box of the fuel assembly becomes smaller, thereby to lengthen the life of the fuel assembly and to reduce the fuel cycle cost, because conversion of uranium 238 to plutonium can be increased. Furthermore, the term of continuous operation of the plant can be extended to increase plant utilization efficiency.

Another aspect of the invention that attains one or more of the first, second and third objects provides a BWR core characterized in that a volume rate of two phase flow cooling water including subcooled water except for water in gaps outside of fuel assembly channel boxes, in guide rods into which control rods are inserted, and in water rods is 18 to 39%. By reducing the volume rate of the two-phase flow cooling water, the fuel assemblies can be loaded in the area so that an fuel loading amount can be increased. This invention attains the same objects as the first invention.

A still another aspect of the present invention that attains one or more of the above-mentioned first, second, third and fourth objects provides a BWR core characterized in that a volume rate of sub-cooled water and saturated water in gaps outside of fuel assembly channel boxes, in guide rods into which control rods are inserted, and in water rods is 26 to 38%.

By increasing the volume rate of water in the channel boxes and water rods, a neutron moderating effect is more accelerated than the conventional core, thereby to increase a fuel loading quantity. As a result, the third invention attains the same object as the first invention. Further, an improved neutron moderating effect reduces the reactivity increase at the cold condition and the absolute values of a void coefficient.

A still another aspect of the present invention that attains one or more of the above-mentioned first, second, third and fourth objects provides a BWR core characterized in that volume rate of sub-cooled water and saturated water in guide rods into which control rods are inserted, and in water rods is 6 to 9%. By increasing the volume rate of water in the water rods, a fuel loading quantity per unit volume can be increased without losing neutron moderating property. As a result, the fourth invention can attain the same objects as the first invention. Further, the increase in neutron moderating effect reduces the reactivity increase at the cold condition and the absolute values of a void coefficient.

In order to attain one or more of the first, second and third objects, another aspect of the present invention provides a BWR core characterized in that a volume rate of fuel material in the core area is 23 to 37%.

Another aspect of the present invention that attains one or more of the first, second, and third objects provides a BWR core characterized in that a ratio of a volume of two phase flow cooling water including sub-cooled water in channel boxes except for water in gaps between the channel boxes, in guide rods into which control rods are inserted and in water rods to a volume of fuel material is 0.5 to 1.8.

Another aspect of the present invention that attains one or more of the first object provides a BWR core characterized in that a power density is 63 to 140 kW/L. The increase in the power density greatly lowers the height of the core, thereby to reduce a cost for construction of the plant.

Another aspect of the present invention that attains one or more of the first, second, third and fourth objects provides a BWR core characterized in that an average gap between the fuel assembly channel boxes is 17 to 40 mm. The increase in the gaps between the channel boxes improves the neutron moderating effect, thereby to attain the same object as the third invention.

Another aspect of the present invention that attains one or more of the first, second and third objects provides a BWR core characterized in that the gaps between the fuel rods is 0.7 to 2.6 mm in case of a square lattice configuration, or is 0.7 to 3.6 mm in case of triangular lattice configuration. The reduced gaps between the fuel rods make it possible to load fuels more to attain the same object as the first invention.

Another aspect of the present invention that attains one or more of the first, second, third and fourth objects provides a BWR core characterized in that a ratio of an outer width of a channel box to an average lattice width of the fuel assembly is 0.8 to 0.89. Since the ratio of an outer width of a channel box to an average lattice width of the fuel assembly is made smaller than the conventional one, the neutron moderating efficiency can be improved. The tenth invention attains the same object as the third invention.

Another aspect of the present invention that attains at least one of the first, second, third and fourth objects of the present invention provides a BWR core characterized in that an active fuel length is 1.0 to 3.0 m.

Another aspect of the present invention that attains at least one of the first, second, third and fourth objects provides a BWR core characterized in that an average weight of uranium, plutonium and minor actinides contained in a core area per unit volume is 2.1 to 3.4 kg/L, as a conversion into an unburnt state, and that the core is the type where control rods are inserted into gaps between the channel boxes and an average distance between the channel boxes where the control rods are inserted is larger than the distance between the channel boxes at the side where the control rods are not inserted.

A still another aspect of the present invention that attains one or more of the first, second, third and fourth objects provides a BWR core characterized in that an average weight of uranium, plutonium and minor actinides contained in a unit volume of a core area is 2.1 to 3.4 kg/L as a conversion into a value of an unburned state, and that the core is constituted by a fuel assembly having at least one water rod whose sectional area is larger than a sectional area of a fuel rod unit lattice cell.

Another aspect of the present invention that attains at least one of the first, second, third and fourth objects provides a BWR core characterized in that an average weight of uranium, plutonium and minor actinides contained in a unit volume of a core area is 2.1 to 3.4 kg/L as a conversion into a value of an unburned state, and that the core is constituted by square fuel assemblies and cross shaped control rods to be inserted between the fuel assemblies at a rate of at least one for 4 fuel assemblies.

A further aspect of the present invention that attains on or more of the first, second, third and fourth objects provides a BWR core characterized in that an average weight of uranium, plutonium and minor actinides contained in a unit volume of a core area is 2.1 to 3.4 kg/L as a conversion into a value of an unburned state, and that the core is constituted by square fuel assemblies and round shaped control rods to be inserted in the fuel assemblies at a rate of at least one for one fuel assembly.

Another aspect of the present invention that attains one or more of the first, second, third and fourth objects provides a BWR core characterized in that an average weight of uranium, plutonium and minor actinides contained in a unit volume of a core area is 2.1 to 3.4 kg/L as a conversion into a value of an unburned state, and that the core is constituted by hexagonal fuel assemblies and Y-type control rods to be inserted between the fuel assemblies.

Another aspect of the present invention that attains one or more of the first, second, third and fourth objects provides a BWR core characterized in that an average weight of uranium, plutonium and minor actinides contained in a unit volume of a core area is 2.1 to 3.4 kg/L as a conversion into a value of an unburned state, and that the core is constituted by hexagonal fuel assemblies and round or hexagonal control rods to be inserted in the fuel assemblies at a rate of at least one for one fuel assembly.

Another aspect of the present invention that attains at least one of the first, second, third and fourth objects provides a BWR core characterized in that an average weight of uranium, plutonium and minor actinides contained in a unit volume of a core area is 2.1 to 3.4 kg/L as a conversion into a value of an unburned state, and that at least one of a water removal plate and a water removal rod is disposed in gaps between the channel boxes or in the water rods, the removal plate and removal rod being able to be withdrawn during operation of the core.

Another aspect of the present invention that attains one or more of the first, second, third and fourth objects provides a BWR core characterized in that an average weight of uranium, plutonium and minor actinides contained in a unit volume of a core area is 2.1 to 3.4 kg/L as a conversion into a value of an unburned state, and that a water removal plate is disposed at the tip of the control, the removal plate being detachable and able to be withdrawn during operation of the core.

Another aspect of the present invention that attains at least one of the first, second, third and fourth objects provides a BWR core characterized in that an average weight of uranium, plutonium and minor actinides contained in a unit volume of a core area is 2.1 to 3.4 kg/L as a conversion into a value of an unburned state, and that a water removal round or hexagonal rod is disposed at the tip of the control, the removal rod being detachable and able to be withdrawn during operation of the core.

In case of fuel assemblies loaded on the BWR core, at least one of the above-mentioned objects is attained by the following manners.

One aspect of the present invention that attains one or more of the first, second and third objects provides a BWR fuel assembly characterized in that an average weight of uranium, plutonium and minor actinides contained in a unit volume of a core area is 2.8 to 4.5 kg/L as a conversion into a value of an unburned state.

Another aspect of the present invention that attains one or more of the first, second, third and fourth objects provides a BWR fuel assembly characterized in that a volume rate of two phase flow cooling water including sub-cooled water for cooling fuel rods, except for water in water rods and in guide rods for into which control rods are inserted in the channel box area is 24 to 49%.

Another aspect of the present invention that attains one or more of the first, second, third and fourth objects provides a BWR fuel assembly characterized in that in a fuel assembly to be loaded on a core wherein a ratio of the number of fuel assemblies to the number of control rod drive mechanisms is more than three, a volume rate of two phase flow cooling water including sub-cooled water for cooling fuel rods, except for water in water rods and in guide rods into which the control rods are inserted in the channel box area is 24 to 52%.

Another aspect of the present invention that attains one or more of the first, second, third and fourth objects provides a BWR fuel assembly characterized in that a volume rate of subcooled water and saturated water in a guide rod for a control rod into which the guide rod is inserted and in a water rod is 9 to 12%.

Still, another aspect of the present invention that attains at least one of the first, second, third and fourth objects provides a BWR fuel assembly characterized in that in a fuel assembly to be loaded on a core wherein a ratio of the number of fuel assemblies to the number of control rod drive mechanisms is more than three, a volume rate of subcooled water and saturated water in a guide rod for a control rod into which the control rod is inserted and in a water rod is 8 to 12%.

Further, another aspect of the present invention that attains at least one of the first, second and third objects provides a BWR fuel assembly characterized in that a volume rate of a fuel material within a channel box area is 30 to 49%.

Another aspect of the present invention that attains one or more of the first, second and third objects provides a fuel assembly characterized in that a ratio of a volume rate of two phase flow cooling water including subcooled water for cooling fuel rods in the channel box except for water in guide rods for guiding control rods and in water rods, to a volume rate of fuel material area is 0.5 to 1.6.

Another aspect of the present invention that attains at least one of the first, second and third objects provides a fuel assembly characterized in that in a fuel assembly to be loaded on a core wherein a ratio of the number of fuel assemblies to the number of control rod drive mechanisms is more than three, a ratio of a volume rate of two phase flow cooling water including sub-cooled water for cooling fuel rods in the channel box, except for water in guide rods for guiding control rods and in water rods, to a volume rate of fuel material area is 0.5 to 1.8.

Another aspect of the present invention that attains one or more of the first, second and third objects provides a fuel assembly characterized in that the gaps between the fuel rods is 0.7 to 2.3 mm in case of a square lattice configuration, or is 0.7 to 3.3 mm in case of triangular lattice configuration.

Another aspect of the present invention that attains at least one of the first, second, third and fourth objects provides a fuel assembly characterized in that in a fuel assembly to be loaded on a core wherein a ratio of the number of fuel assemblies to the number of control rod drive mechanisms is more than three, the gaps between the fuel rods is 0.7 to 2.6 mm in case of a square lattice configuration, or is 0.7 to 3.6 mm in case of triangular lattice configuration.

Another aspect of the present invention that attains one or more of the first object provides a fuel assembly characterized in that an active fuel length is 1.0 to 3.0 m.

Another aspect of the present invention that attains one or more of the first, second, third and fourth objects provides a fuel assembly characterized in that an average weight of uranium, plutonium and minor actinides contained in a unit volume of an interior of a channel box is 2.8 to 4.5 kg/L as a conversion into a value of unburnt state, and that the fuel assembly has at least one water rod whose sectional area is larger than the sectional area of a unit cell of the fuel rod lattice.

Further, in case of a BWR core where a ratio of the number of the fuel assemblies loaded on the core to the number of control rod drive mechanisms is less than 3, the following inventions attain at least one of the above-mentioned objects.

That is, an aspect of the present invention that attains at least one of the first, second and third objects provides a BWR core characterized in that an average weight of uranium, plutonium and minor actinides contained in a unit volume of a core area is 2.3 to 3.4 kg/L as a conversion into a value of an unburned state.

Another aspect of the present invention that attains one or more of the first, second and third objects provides a BWR core characterized in that a volume rate of two phase flow cooling water including subcooled water for cooling fuel rods is 18 to 39%, the two phase flow cooling water including sub-cooled water for cooling the fuel rods, except for water in gaps between channel boxes outside of the channel boxes of the fuel assemblies in the reactor core area, in guide rods into which the control rods are inserted, and in the inside of water rods in the channel box area.

Another aspect of the present invention that attains one or more of the first, second, third and fourth objects provides a BWR core characterized in that a volume rate of subcooled water and saturated water is 23 to 38%, the subcooled water and saturated water being present in gaps between channel boxes outside of the channel boxes of the fuel assemblies in the reactor core area, in guide rods for inserting control rods thereinto, and in channel boxes, and in the inside of water rods.

Another aspect of the present invention that attains one or more of the first, second, third and fourth objects provides a BWR core characterized in that a volume rate of subcooled water and saturated water in a guide rod for a control rod into which the control rod is inserted and in a water rod is 7 to 9%.

Another aspect of the present invention that attains one or more of the first, second and third objects provides a BWR core characterized in that a volume rate of fuel material in a core area is 25 to 37%.

Another aspect of the present invention that attains one or more of the first, second and third objects provides a BWR core characterized in that a volume ratio of a volume of subcooled water and saturated water except for water in gaps between channel boxes outside of the channel boxes of the fuel assemblies in the reactor core area, in guide rods for inserting control rods thereinto, and in water rods to a volume of a fuel substance area is 0.5 to 1.6.

Another aspect of the present invention that attains one or more of the first object provides a BWR core characterized in that a power density is 63 to 140 kW/L.

Another aspect of the present invention that attains one or more of the first, second, third and fourth objects provides a BWR core characterized in that an average distance between the fuel assembly channel boxes is 19 to 40 mm.

Another aspect of the present invention that attains one or more of the first, second and third objects provides a BWR core characterized in that the gaps between the fuel rods is 0.7 to 2.3 mm in case of a square lattice configuration.

Another aspect of the present invention that attains one or more of the first, second, third and fourth objects provides a BWR core characterized in that a ratio of a channel box outer width of a fuel assembly to an average fuel bundle pitch is 0.82 to 0.91.

Another aspect of the present invention that attains at least one of the first object provides a BWR core characterized in that an active fuel length is 1.0 to 3.0 m.

Another aspect of the present invention that attains at least one of the first, second, third and fourth objects provides a BWR core characterized in that an average weight of uranium, plutonium and minor actinides contained in a core area per unit volume is 2.1 to 3.4 kg/L, as a conversion into an unburnt state, and that the core is the type where control rods are inserted into gaps between the channel boxes and an average distance between the channel boxes where the control rods are inserted is larger than the distance between the channel boxes at the side where the control rods are not inserted.

Another aspect of the present invention that attains at least one of the first, second, third and fourth objects provides a BWR core characterized in that an average weight of uranium, plutonium and minor actinides contained in a unit volume of a core area is 2.3 to 3.4 kg/L as a conversion into a value of an unburned state, and that the core is constituted by a fuel assembly having at least one water rod whose sectional area is larger than a sectional area of a fuel rod unit lattice cell.

Another aspect of the present invention that attains at least one of the first, second, third and fourth objects provides a BWR core characterized in that an average weight of uranium, plutonium and minor actinides contained in a unit volume of a core area is 2.3 to 3.4 kg/L as a conversion into a value of an unburned state, and that the core is constituted by square fuel assemblies and cross shaped control rods to be inserted between the fuel assemblies at a rate of at least one for 2 fuel assemblies.

Another aspect of the present invention that attains at least one of the first, second, third and fourth objects provides a BWR core characterized in that an average weight of uranium, plutonium and minor actinides contained in a unit volume of a core area is 2.3 to 3.4 kg/L as a conversion into a value of an unburned state, and that the core is constituted by square fuel assemblies and cross shaped control rods to be inserted between the fuel assemblies at a rate of at least one for one fuel assembly, and that a water removal plate is disposed at the tips of the control rods, the water removal plate being detachable and able to be withdrawn from the core during operation.

According to the inventors' investigation, the following have been revealed. In an example for explanation, a specification of the ABWR core is as follows: a thermal power is 3926 MW, (electric power is 1356 MW), the number of fuel assemblies is 872, and the number of control rods is 205 (The ratio of the number of the fuel assemblies loaded on the core to the number of control rod drive mechanisms 872/205=4.25). High burnup fuel assemblies of 8×8 in a lattice configuration are loaded. The number of fuel rods per one fuel assembly is 60. Advantages of the present invention are not limited by the lattice arrangement of fuel assemblies, shapes (square shape fuel assemblies), sizes of fuel assemblies and the core, etc. Other shapes such as hexagonal fuel assemblies and various sizes of fuel assemblies and core will bring about the same advantages. Powers and cooling systems are not limited. The same advantages will be obtained by from small cores to large cores, forced circulation systems, natural circulation systems, etc.

The axial distribution of the uranium enrichment in the fuel assembly or the axial distribution of the plutonium enrichment is not automatically limited. Fuel assemblies having a distribution in the axial direction or fuel assemblies having at both ends blanket zones comprising depleted uranium, natural uranium, low enrichment uranium, etc. will bring the same advantages. The fuel assemblies may be constituted by fuel rods having different lengths.

The present invention aims at a burner type thermal neutron boiling water reactor. That is, the BWR cores on which low enrichment uranium oxide fuel having 3 to 8 wt % of uranium oxide concentration or mixed oxide fuel having 2 to 6 wt % of fissile Pu enrichment is loaded or BWR cores having an average effective water-to-fuel volume ratio [$(V_m/V_f)$eff] of 1 or more during operation of 50% or more of the rated power are targets of the present invention. The effective water-to-fuel volume ratio (in the present invention, it refers to fuel pellets) is an expansion of geometrical water-to-fuel volume ratio [$(V_m/V_f)$geo] in light of generation of steam in the core. There is the following relationship between the two.

$$(V_m/V_f)\text{eff} = F \times (V_m/V_f)\text{geo}$$

F is expressed using the core average void rate [V(%)] as the following equation.

F=(100−V)/100+f×V/100, where f is a ratio of saturated steam density to saturated water density.

In recent years, a demand of improving economy to atomic power plants is becoming strong. Especially, lowering of construction cost of the plants is demanded. From the view point of construction economy, it is desirable to shorten the fuel length as much as possible, to lower the building height of the reactor, and to reduce the number of floors. The reduction of active fuel length contributes to lowering of the reactor building by 5 to 6 times the height of a pressure vessel and the height of a lower dry well, and reduction of space for a fuel storage pool and fuel transport.

If the reactor building height of ABWR is lowered by 6 to 7 m, the reactor building can be lowered by one floor, so that the construction cost of the power plants is remarkably reduced. Since the active fuel length of ABWR is 3.7 m, the active fuel length should be shortened to 2.3 m or less so as to achieve the object. However, if the active fuel length is simply shortened, an average thermal power (hereinafter referred to as average linear heat generation ratio) (W/cm), which is a division of the thermal power (W) of the core divided by the product of the total number of fuel rods in the core and the active fuel length (cm) will increase so that heat removal characteristic may be lessened. In order to secure at least the same thermal margin as that of ABWR, it is necessary to design the core under such conditions that the average linear heat generation ratio is the same or less as that of ABWR. In order to lower the active fuel length from 3.7 m to 2.3 m or less, the total number of fuel rods must be larger than that of ABWR.

As means for increasing the total number of fuel rods, there may be two methods.

(1) To increase the number of fuel assemblies to be loaded on the core
(2) To increase the number of fuel rods per one fuel assembly If the method (1) is employed, the size of the core, i.e. a core outer radius becomes large, the diameter of the reactor vessel becomes larger, thereby to increase the construction cost of the reactor building. Therefore, the method (2) is preferably employed.

However, since water works as a moderator for neutron and a cooling medium for fuel rods, it has been said that the water and the fuel rods are arranged homogeneously as much as possible in the conventional boiling water reactors. The fuel rods and water in PWRs are arranged in substantially a homogeneous state. On the other hand, since BWRs are the direct cycle type, wherein steam is present in the center of the reactor core which is two phase flow, channel boxes are disposed to prevent cross flow of steam phase in the transverse direction, and cross shaped control rods are inserted into gaps between the channel boxes.

In case of high burnup fuels, since a water rod is disposed at the center of the fuel assembly, the fuel looks like non-homogeneity, but this non-homogeneity inevitably results from the structure of the channel boxes and cross-shaped control rods. Thus, the basic concept for aiming at the homogeneity is common to the PWRs and BWRs. As a result, in the ABWR reactor cores having about 155 mm of a fuel assembly lattice pitch to secure sufficient moderating effect of two-phase flow, the two phase flow occupies 40% or more of valuable space in the reactor core. Thus, a volume rate of the fuel material area is only 20%, the volume rate being a volume rate of fuel pellet area. The investigation for positively increasing weight of uranium, plutonium and minor actinides (hereinafter referred to as heavy metal weight density) has not been made.

The inventors of the present invention aimed at this point. They made the fuel assembly lattice into two regions of non-homogeneity comprising a tight fuel rod lattice region for cooling fuel rods and water (the saturated water includes sub-cool water) for moderating neutron. That is, an amount of the two phase flow cooling water including sub-cool water for cooling the fuel rods in the channel boxes is limited to the minimum amount necessary for cooling the fuel rods, whereby areas of unsaturated water and saturated water are increased and concentrated to the center and periphery of the fuel assembly lattice, thereby to obtain sufficient cooling effect. As a result, neutrons that are well moderated in the saturated water area are transported to the fuel rod lattice area by diffusion.

According to this structure, the heavy metal density which is defined as an active fuel length×the number of fuel assemblies×(fuel assembly lattice sectional area) at the time of fuel loading on the core per unit volume in the core can be increased by 10% or more, as explained in the examples. The fuel assembly lattice sectional area is defined as follows.

Figure 2A:
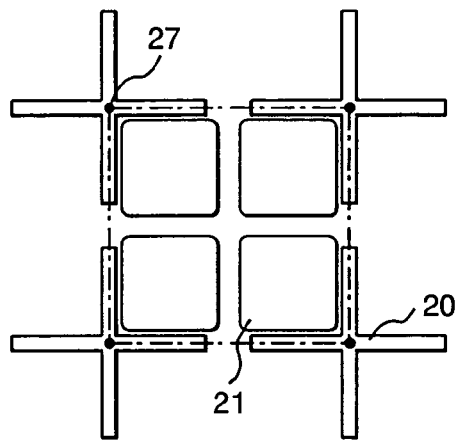
FIG. 2a is a drawing indicating the lateral cross sectional area of a fuel assembly lattice in a core into which cross-shape control rods are inserted at a rate of one control rod for every 4 fuel assemblies.

In case where the core comprises square shaped fuel assemblies and cross shaped control rods inserted between the fuel assemblies at a rate of one control rod per 4 fuel assemblies, the above-mentioned sectional area is the division obtained by dividing the square area (refer to FIG. 2a) by 4, the square having apexes of a square constituted by the center points of 4 adjoining cross shape control rods.

Figure 2B:
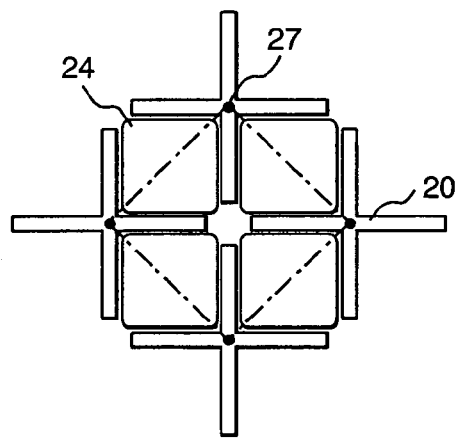
FIG. 2b is a drawing indicating the lateral cross sectional area of a fuel assembly lattice in a core into which the cross-shape control rods are inserted at a rate of one control rod for every 2 fuel assemblies.
Figure 2C:
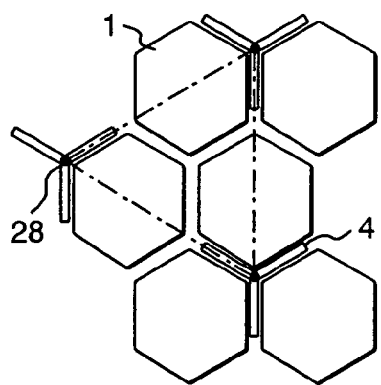
FIG. 2c is a drawing indicating the lateral cross sectional area of a fuel assembly lattice in a core where Y-type control rods are inserted between hexagonal fuel assemblies at a rate of one control rod for every three fuel assemblies.

In case where the core comprises square shape fuel assemblies and cross shape control rods inserted between the fuel assemblies at a rate of one control rod per 2 fuel assemblies, the above-mentioned sectional area is the division obtained by dividing the square area (refer to FIG. 2b) by 2, the square having apexes of a square constituted by the center points of 4 adjoining cross shape control rods. In case where the core comprises hexagonal fuel assemblies and Y-type control rods inserted between the fuel assemblies, the above-mentioned sectional area is the division obtained by dividing the triangle area (refer to FIG. 2c) by 1.5, the equilateral triangle having apexes of a triangle constituted by the center points of 3 adjoining Y-type control rods.

Figure 2D:
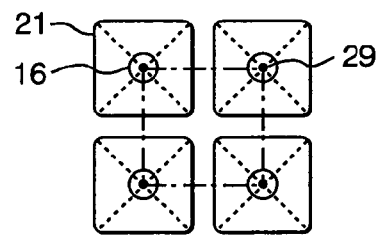
FIG. 2d is a drawing indicating the lateral cross sectional area of a square fuel assembly lattice in a core into which round control rods are inserted.
Figure 2E:
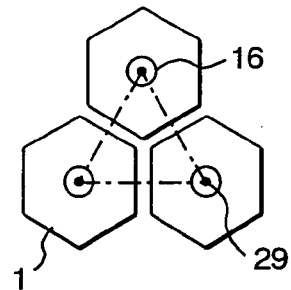
FIG. 2e is a drawing indicating the lateral-cross sectional area of a hexagonal fuel assembly lattice in a core into which round or hexagonal control rods are inserted.

In case where the core comprises square shape fuel assemblies and round shape control rods inserted into the channel box, the above-mentioned sectional area is the square area (refer to FIG. 2d), the square having apexes of a square constituted by the center points of 4 adjoining square shape fuel assemblies. In case where the core comprises hexagonal shape fuel assemblies and round or hexagonal shape control rods inserted into the channel box, the above-mentioned sectional area is the equilateral triangle area (refer to FIG. 2e) multiplied by 2, the triangle having apexes of a triangle constituted by the center points of 3 adjoining square shape fuel assemblies.

Figure 3:
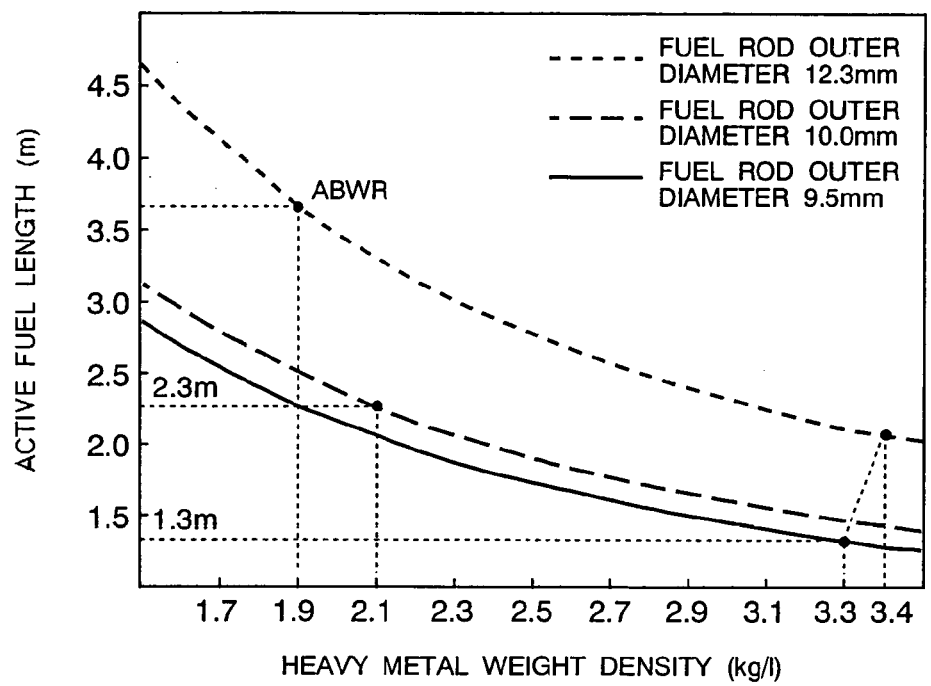
FIG. 3 is a characteristic graph showing relationship between heavy metal density and active fuel length at the constant average liner heat generation ratio.

In FIG. 3, there is shown the active fuel length necessary for making the same average linear heat generation ratio as that of ABWR as parameters of the fuel rod diameter and the concentration of the heavy metal contained in the core. As the fuel rod reduces its diameter, even a small heavy metal concentration makes the active fuel length shorter. Since the amount of heavy metals such as minor uranium, plutonium, actinides per one fuel rod can be made small, as the outer diameter of the fuel rod, it is possible to increase the number of fuel rods even at the same heavy metal density.

The diameter of the fuel rod actually used in the conventional BWRs is about 10 mm. It is necessary to make the heavy metal weight density to 2.1 kg/L or more, which is larger than about 1.9 kg/L of ABWR, so as to attain the fuel length of 2.3 m or less, which makes the reactor building height lower by one floor, without increasing the average linear heat generation ratio.

According to the present invention, the above target will be achieved, without losing thermal margin. When the active fuel length is enlarged to 3 m with the heavy metal weight density to 2.1 kg/L or more, the fuel loading amount can be increased keeping the advantages of short fuel length. Therefore, the continuous operation of the plant is increased to improve utilization rate, or fuel economy is improved by reduction of exchange of the number of fuels.

When a fuel rod of an outer diameter of 9.5 mm, which is employed by the current PWRs, is employed, and when the fuel rods are arranged in a triangle lattice from the viewpoints of productivity of fuel assemblies and thermal margin so as to attain the fuel rod gap of 0.7 mm, which is the necessary minimum value, the active fuel length can be shortened to 1.3 m (power density is increased to 140 kW/L) without increase of the average linear heat generation ratio. In this case, the heavy metal weight density becomes 3.3 kg/L, so that the continuous operation period and fuel economy can be almost equivalent to those of ABWR in the cores of the active fuel length of 2.3 m, which makes the reactor building height lower by one floor.

On the other hand, when the outer diameter of the fuel rod is larger than 9.5 mm at the fuel rod gap of 0.7 mm, the heavy metal weight density can be increased to 3.4 kg/L, while the advantage of the reduction in the active fuel length is reduced When the active fuel length is made as short as 1.0 m at the heavy metal weight density of 2.1 to 3.4 kg/L, the reactor building height will be lower by two floors. Furthermore, the continuous operation and fuel economy will be improved if the amount of the fuel loading on the above-mentioned core (1) is increased.

When the heavy metal weight density is made to 2.1 to 3.4 kg/L (this is equivalent to the heavy metal weight density of 2.8 to 4.5 kg/L at the time of fuel loading on the core, which is contained in the unit area of the channel box, and defined as (active fuel length)×(lateral sectional area of the channel box)), it is necessary to take into consideration the lowering of the reactor shutdown margin, which is legislated as a design parameter indicating whether the reactor has the capability of safe shutdown or not.

Figure 4:
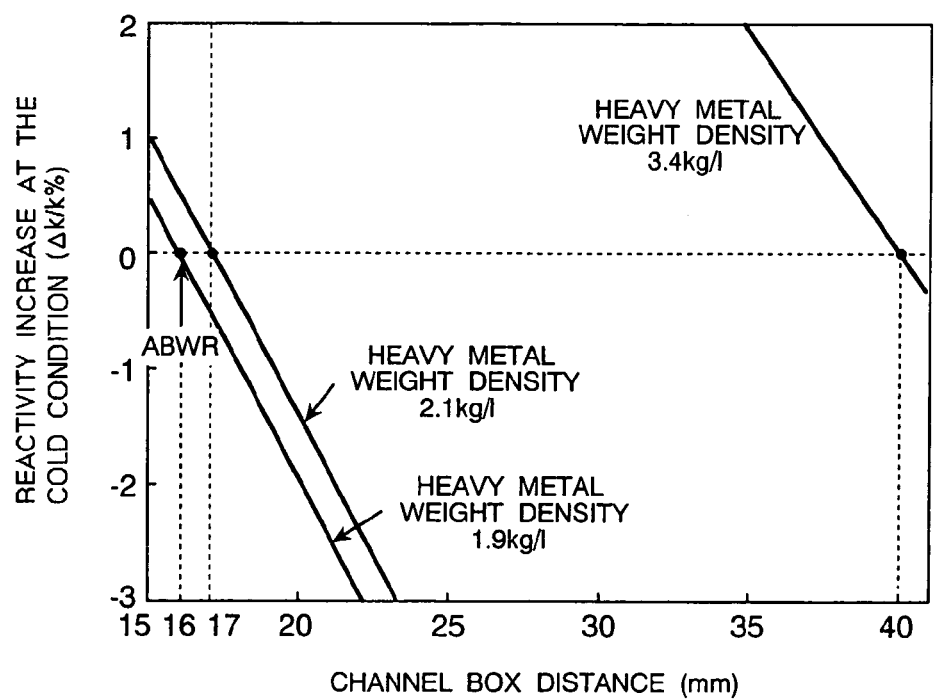
FIG. 4 is a characteristic graph showing relationship between reactivity increase at the cold condition and distance between channel boxes.

However, in the present invention, since the increased sub-cooled water and saturated water areas are arranged to be concentrated at the center and periphery of the fuel assembly, the structure is employed to control the decrease in reactivity increase at the cold condition, without increasing an effective water to fuel volume ratio. FIG. 4 shows the relationship between the reactivity increase at the cold condition and the average distance of channel boxes of the adjoining fuel assemblies facing each other, when the heavy metal weight densities are 2.1 kg/L and 3.4 kg/L.

Figure 5A:
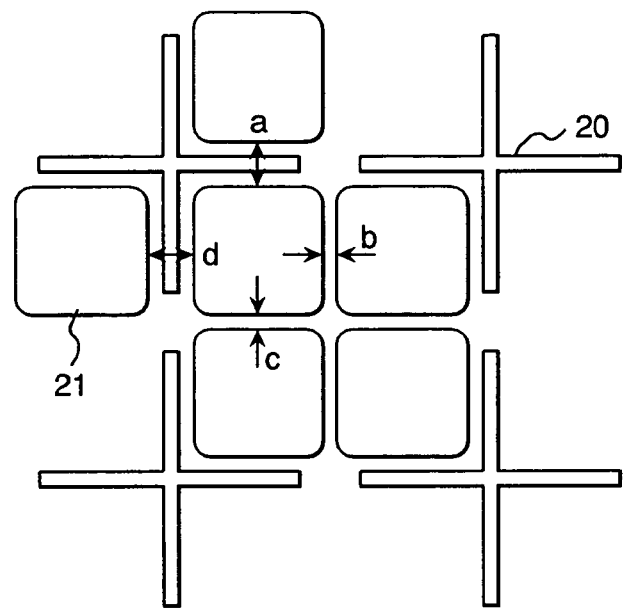
FIG. 5a is a drawing indicating a distance between channel boxes in a core on which square fuel assemblies are loaded.
Figure 5B:
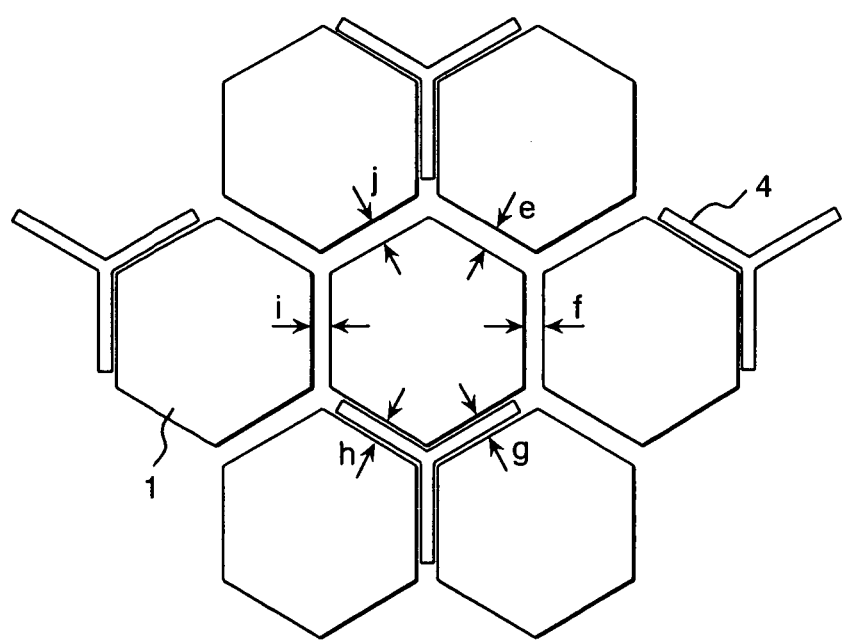
FIG. 5b is a drawing indicating a distance between channel boxes in a core where hexagonal fuel assemblies are loaded.

The average distances between the channel boxes, facing each other, of the adjoining fuel assemblies are, as shown in FIGS. 5a and 5b, the average values of the distances (a, b, c, d) between the channel boxes of the core constituted by the square shape fuel assemblies, in the four directions. In case of the core constituted by the hexagonal shape fuel assemblies, the average value of distance is the average value of channel box distances (e, f, g, h, i, g) in the 6 directions. When the average distance between the channel boxes of the adjoining fuel assemblies is set to be 17 to 40 mm, which is wider than 16 mm incase of ABWR, the reactivity increase at the cold condition is controlled to that of ABWR or less, even when fuel assemblies having the average fuel assemblies enrichment of 8 wt % are employed.

Further, since moderating of neutron drastically proceeds when the thickness of saturated water exceeds 19 mm, the width of gap water into which the control rod is inserted is made larger than that necessary for the control rods, and an area of the water rod at the center of the fuel assembly is enlarged. Neutron is moderated in the center and outside of the fuel assemblies; and the moderated neutron is supplied to the fuel lattice by diffusion. According to this concept, the two-phase flow in the fuel lattice is liberated from the role of neutron moderating; it is possible to limit the role of two phase flow in the fuel lattice to cooling of the fuel rods.

As a result, the volume rate of the two phase flow that has occupied 40% or more of the core area can be reduced to 18 to 39% (as for the channel box area, 24 to 52%); if the volume rate of gap water and water rod are increased a little bit, it is possible to increase, to a large extent, the volume rate of fuel material area, which plays a major role in generating nuclear fission energy, by 23 to 37% (as for the channel box area, 30 to 49%). Although the effects of increase in the average gap between the channel boxes are commonly expected regardless of shapes and sizes of the fuel assemblies, these effects were not aimed at, because there was a prepossession in the conventional fuel design of the BWR core that achieving two functions, i.e. neutron moderating and heat removal was necessary.

In the present invention that is based on a design concept for completely separate the functions of water, the effect of the concept could be utilized effectively. The volume rate of sub-cooled water and saturated water in the core areas is 26 to 38%.

The volume rate of sub-cooled water and saturated water in the guide rod into which the control rod is inserted and water rod in the core area is 4% or more, particularly, 6 to 9% (as for the channel box area, 5% or more, particularly 8 to 12%). The ratio of the volume rate of two phase flow including sub-cool water for cooling the fuel rods in the-core area and channel box area except for water in the gaps outside of the channel boxes, in the guide rod into which the control rod is inserted, and in the water rod to the volume rate of the fuel material area is 0.5 to 1.8. The ratio of the outer width of the channel box of the fuel assembly to the average fuel assembly lattice width is 0.80 to 0.89. In the present invention, the average fuel assembly lattice width is defined as a diagonal length of an equilateral square or an equilateral hexagon having the same area as the fuel assembly lattice area. The gap between the fuel rods is set to the necessary minimum value as 0.7 mm or more from the viewpoints of productivity of fuel assemblies and securing of thermal margin, and the maximum value in case of square lattice is set to 2.6 mm (in case of a triangle lattice, the value is 3.6 mm, which is equivalent to the heavy metal weight density of the square lattice of the fuel rod lattice).

Further, when on e or more of the water rod whose diameter is larger than the fuel rod and contains saturated water is disposed within the fuel assembly, it is possible to form sub-cooled water and saturated water areas in and outside of fuel assembly channel box. As a result, a sufficient neutron moderating effect is expected; and the reactivity increase at the cold condition can be controlled furthermore.

On the other hand, when such the wide channel box gaps are secured, the area of two-phase flow water for removing heat of the fuel rods becomes smaller than that of ABWR. In this case, there is a fear of influence on fuel heat removal. However, as describe in the a water breeder BWR invented by the present inventors (Japanese Patent Laid-open Hei 8-21890), it is known that the same heat removal performance as that of ABWR can be obtained when the flow rate per unit power of the fuel rods is the same as that of ABWR.

In one aspect of the present invention, since the fuel area is increased, the rate of two-phase flow area is decreased. However, the effective core length can be shortened, and cooling medium of an amount necessary for heat removal can be supplied, without increasing pressure drop; a power density can be increased to 50 kW/L or more, particularly 63 to 140 kW/L.

Furthermore, in a core constituted by large sized fuel assemblies wherein the ratio of the number of fuel assemblies loaded on the core to the control rod drive mechanisms is less than 3, the heavy metal weight density contained in the unit volume of the core area at the time of fuel loading can be increased by 20% larger (2.3 to 3.4 kg/L) than ABWR, as is explained in detail in examples. At this time, the volume rate of the fuel material area is 25 to 37% (as for the channel box area, 30 to 49%). The volume rate of the two-phase flow including sub-cooled water for cooling fuel rods in the channel box is 18 to 39% (as for the channel box area, 24 to 49%). The volume rate of sub-cooled water and saturated water areas is 23 to 38%.

The volume rate of sub-cooled water and saturated water in the guide rod into which the control rod is inserted and the water rod is 4% or more, particularly 7 to 9% (as for the channel box area, 5% or more, particularly 9 to 12%). The ratio of the volume of two phase flow including sub-cooled water for cooling the fuel rods in the core area and channel box except for water in the gaps outside of the channel boxes and, in the guide rod into which the control rod is inserted, and in the water rod to the volume of the fuel material area is 0.5 to 1.6. Since the reactor shutdown performance increases, the average fuel assembly lattice width can be enlarged. Thus, the ratio of the outer width of the channel box to the fuel assembly lattice width is 0.82 to 0.91. The fuel rod gap is 0.7 or more from the viewpoints of productivity of the fuel assembly and keeping of thermal margin.

In case of square lattice, the maximum value is 2.3 mm (in case of a triangle lattice, the value is 3.3 mm where the heavy metal weight density of fuel rod lattice cell is equivalent to that of the square lattice).

From the above, the thermal margin and safety are maintained in the same level as BWRs, which are now under operation; the height of the core is greatly reduced to lower the construction cost of the power plant, thereby achieving the first object of the present invention.

Further, the second object of the present invention is achieved by the following two functions.

In the fuel assembly according to the present invention, wherein the size of the channel box is smaller than the conventional ABWR fuel assembly and the heavy metal weight density is larger than the conventional ABWR fuel assembly, the heavy metal weight density per the unit volume in the area of the channel box can be made as large as 2.8 to 4.5 kg/L, while in case of ABWR, it is about 2.6 kg/L. Therefore, the ratio of water to fuel volume in the channel box becomes small, so that conversion of uranium 238 to plutonium can be increased. On the other hand, if the production of plutonium is increased, saturated water present in the gap between the channel boxes, which is wider than that in the conventional ABWR should be considered.

In order to remove the saturated water, a water removal rod and a follower disposed at the tip of the control rod are inserted into the saturated water area such as gaps between the channel boxes, whereby the conversion of uranium 238 to plutonium is increased. When the same uranium enrichment fuel is used, a higher burnup than the conventional fuel assembly is realized. This is the first function. Further, when the water removal rod is inserted, the ratio of water to fuel volume is freely controlled. Thus, the excess reactivity at the beginning of the cycle can be controlled without using burnable poisons. Accordingly, neutrons that were absorbed in the burnable poisons in the conventional fuel assemblies can be used to produce plutonium; then a further higher burnup is realized. This is the second function.

If the structure of the present invention is applied to the conventional reactor before the ABWR or to ABWR; in other words, if the active fuel length is increased from 2.3 m to 3.7 m, without changing the power per one fuel rod, it is possible to realize a core having a large fuel weight density, keeping the conventional core outer radius and height (the power density is 50 kW/L). In this case, since the active fuel length was increased, keeping the constant power density per one fuel rod, the average linear heat generation ratio becomes smaller, and the thermal margin can be maintained if the core flow amount is greatly reduced. As a result, the third object of the present invention is achieved to enlarge the continuous operation time of the plant and improve the utilization rate of the plant.

Further, the present invention makes the fuel assembly lattice non-homogeneous, which comprises the tight lattice area for cooling fuel rods and the neutron moderating area, thereby to improve the neutron moderating effect by concentrating the saturated water area to the center and periphery of the fuel assembly lattice. As a result, the fourth object of the present invention is achieved to decrease reactivity increase at the cold condition, to reduce the absolute value of the void coefficient, to improve the reactor shutdown performance, and to improve the transient and stability performance.

DETAILED DESCRIPTION OF THE PREFERRED EMBODIMENTS

In the following, the embodiments of the present invention will be explained with reference to drawings.

First Embodiment

Figure 6:
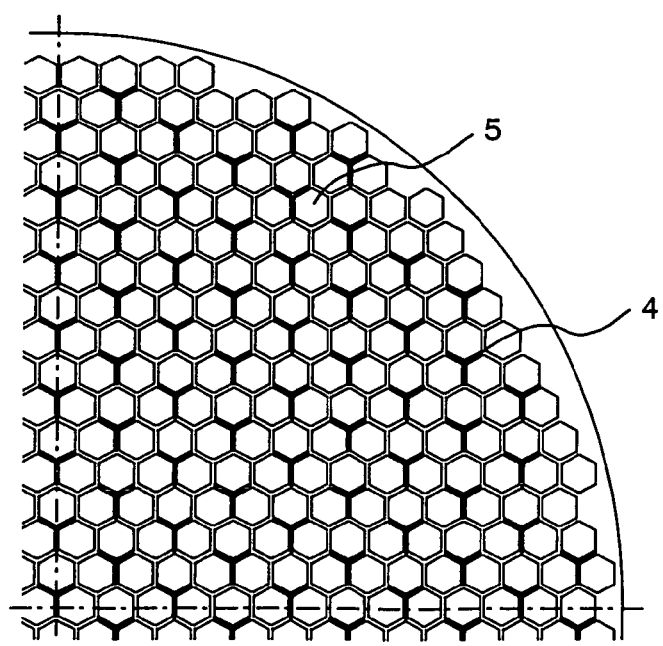
FIG. 6 is a cross sectional drawing of a quarter of a core where fuel assemblies are loaded shown in FIG. 1.

The first embodiment of the present invention is explained with reference to FIG. 1 and FIG. 6. FIG. 6 shows a lateral cross sectional view of the present invention having an electric power of 1356 MWe. Fuel assemblies of 720 and Y-type control rods of 223 at a rate of one control rod per 3 fuel assemblies are shown. FIG. 1 shows a cross sectional view of the fuel assembly lattice. The fuel assembly lattice is composed of channel boxes 1 of an equilateral hexagon shape including fuel rods 2, 6, 7 and a water rod 3, and Y-type control rod 4 disposed in the gap areas between the channel boxes and at the outside of the channel boxes. The fuel assembly has an equilateral hexagon shape, and the distance between the channel boxes is 22.5 mm.

Fuel rods 2 having a diameter of 9.5 mm are disposed in the channel box 1 with a distance of 1.8 mm in a triangle lattice to form an equilateral hexagon fuel assembly having 9 fuel rod rows. At the center of the fuel assembly, the water rod 3 is disposed in an area of three fuel rod rows, i.e. in an area of 19 fuel rod unit lattice cells. The number of the fuel rods in the channel box 1 is 198. Wings of the Y-type control rods 4 have absorber rods made of stainless steel tubes filled with B4C; an angle between the wings is 120 degrees. The corner fuel rods 6, which tend to increase a power, have an enrichment concentration of uranium oxide of 4.0 wt %, while other fuel rods have a uranium enrichment concentration of 4.9 wt %. The fuel rods 7 that adjoin the channel box and the water rod, which tend to increase a power at the beginning of the cycle like the fuel rods at the corners, have an uranium enrichment concentration of 4.9 wt % to which 4.5 wt % of burnable poisons are added so that the peaking of local power at the beginning of the cycle is suppressed.

According to the employment of this fuel arrangement, it is possible to increase the uranium enrichment average concentration of the lateral sectional area of the fuel assembly to 4.87 wt %. In the present embodiment, the fuel material of the uranium enrichment average concentration of the lateral sectional area of the fuel assembly of 4.87 wt % was constantly arranged in the axial direction of the fuel assembly.

When the fuel assemblies are loaded on the core shown in FIG. 6, the core outer radius is 2.9 m, the active fuel length is 194 cm, the power density is 83 kW/L. The volume rate of the two phase flow including sub-cooled water for cooling the fuel rods in the channel box is 27%, the volume rate of water in the water rod is 5%, the volume rate of water in the gaps between=channel boxes and in the water rod is 26%, the volume rate of the fuel material is 31%, and the volume ratio of the two phase flow cooling water to the volume rate of the fuel material is 0.88 in the reactor core area. The weight of uranium contained in the unit volume of the core area is 2.8 kg/L. The ratio of the outer width of the channel box to the fuel assembly lattice width is 0.89.

The volume rate of the two phase flow cooling water including sub-cooled water for cooling the fuel rods is 36%, the volume rate of water in the water rod is 7%, the volume rate of the fuel material is 41%, and the ratio of the volume rate of the two phase flow cooling water to the volume rate of the fuel material is 0.88 in the channel box area. A weight of uranium in the unit area of the channel box is 3.8 kg/L.

In the following, the functions of this embodiment are explained.

In this embodiment, the fuel rods having the diameter of 9.5 mm, which have been used in the boiling water reactors and pressurized water reactors are arranged in the tight fuel rod lattice with a gap of 1.8 mm to constitute the hexagonal fuel assembly, thereby to increase the total number of fuel rods. As a result, the uranium weight contained in a unit volume per the core is 2.8 kg/L, which is about 47% larger than 1.9 kg/L of ABWR; and the active fuel length is 1.94 m, which is about 1.8 m shorter than 3.7 m of ABWR. Thus, in a boiling water reactor of a power of 1356 MWe, which is the same as ABWR, and the core outer radius is 2.9 m, which is also the same as ABWR, the active fuel length is about 1.8 m shorter than that of ABWR; and the reactor building height can be about 10 m lower than that of ABWR.

Further, in this embodiment, the distance between the channel boxes is set to 22.5 mm, which is wider than 16 mm of ABWR, the reactivity increase at the cold condition can be suppressed and the reactor shutdown margin can be made 1.0% Δk or more. The void coefficient becomes $-6.0 \times 10^{-4}$ Δk/k % void by improving neutron moderating effect. The absolute number of the void coefficient of this embodiment is smaller than $-8 \times 10^{-4}$ Δk/k % void of ABWR. Further, in this embodiment, the fuel rods having the outer diameter of 9.5 mm are arranged in the triangle lattice with the gap of 1.8 mm, and the total number of fuel rods is increased to obtain the average linear heat generation ratio of 142 W/cm, which is about 17% lower than 172 W/cm of ABWR. Thus, MCPR of 1.3 or more is attained, thereby to achieve the same heat removal performance as that of ABWR.

Accordingly, by this embodiment, it is possible to realize the boiling water reactor that contributes to lowering of the height of the reactor and reduction of construction cost of power plants, keeping the same thermal margin and safety as the ABWR. Further, the reactivity increase at the cold condition and the absolute value of the void coefficient are reduced to improve the reactor shutdown performance and transient and stability performance, keeping the same thermal margin and safety as the ABWR with high burnup.

In this embodiment, although the structure, functions and advantages of the core of 1356 MWe have been described, the scale of the power is not limited to that. If the number of fuel assemblies is changed, the embodiment can be applied to other scale of reactors. This is the same as in other embodiments.

In this embodiment, the structure, functions and advantages of low enriched uranium fuel that is used in the conventional boiling water reactors are explained. However, the following fuels can be utilized in place of the low enriched fuels:

Mixed oxide fuels enriched with plutonium produced by spent fuel reprocessing, with depleted uranium obtained in production of enriched uranium for the boiling water reactor as a residual, or degraded uranium or low enriched uranium recovered by reprocessing of spent fuels, or natural uranium, mixed oxide fuels such as depleted uranium, degraded uranium, low enriched uranium or natural uranium enriched with reprocessed plutonium containing minor actinides obtained by reprocessing low decontamination reprocessing. This is the same as in the other embodiments.

In this embodiment, a uranium enrichment concentration or fissile plutonium of enrichment is distributed homogeneously in the axial direction of the fuel assembly. However, distribution of the uranium enrichment concentration or fissile plutonium of enrichment in the axial direction is not limited to that. Such fuel assemblies as having different uranium enriched concentrations, fissile plutonium enrichment in the axial direction, having blanket regions of depleted uranium or degraded uranium or natural uranium at the both ends perform the same functions as this embodiment. Further, fuel assemblies constituted by fuel rods having plural active fuel lengths can perform the same function as this embodiment. This is the same as in other embodiments.

Second Embodiment

The second embodiment of the present invention will be explained in the following. This embodiment increases, based on the structure of the embodiment 1, the plant utility by achieving a high burnup using a high enrichment concentration fuels.

Figure 7:
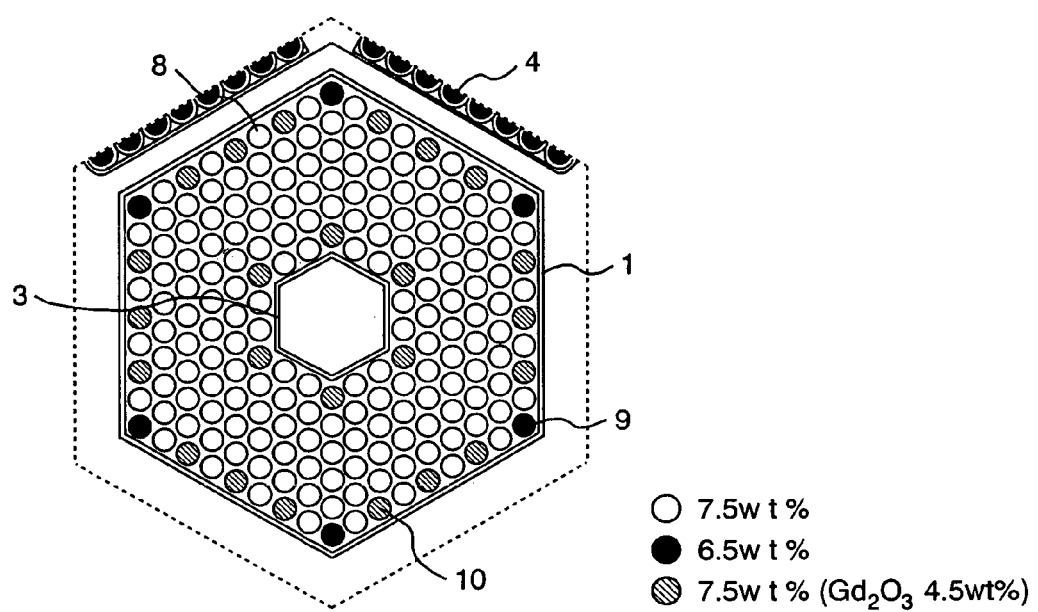
FIG. 7 is a cross sectional view of fuel assembly in the second embodiment.

In this example, the electric power of the core is 1356 MWe; the structure of the core is the same as shown in FIG. 6 in the first embodiment; there are 720 fuel assemblies; and 223 Y-type control rods for every three fuel assemblies are used. FIG. 7 shows a cross sectional view of the fuel assembly. The fuel assembly lattice is constituted by fuel rods 8, 9, 10, channel boxes 1 having a water rod 3 therein, Y-type control rods 4, disposed in gaps between the channel boxes and outside of the channel boxes. The fuel assembly lattice has an equilateral hexagon shape. The distance between the channel boxes is 39.0 mm. The fuel rods 2 having an outer diameter of 9.5 mm are arranged in the channel box 1 with a fuel rod gap of 1.8 mm in the triangle lattice to form an equilateral hexagon fuel assembly lattice of 9 fuel rods arranged in row.

A water rod 3 for the area of three rows of fuel rods, i. e. 19 fuel rod unit lattice cells is formed in the center of the fuel assembly. The number of the fuel rods in the channel box 1 is 198. Wings of the Y-type control rods 4 have absorber rods made of stainless steel tubes filled with $B_4C$; an angle between the wings is 120 degrees. The corner fuel rods 9, which tend to increase a power, have an enrichment concentration of uranium oxide of 6.5 wt %, while other fuel rods 8 have a concentration of 7.5 wt %.

The fuel rods 10 that adjoin the channel box and the water rod, which tend to increase a power at the beginning of cycle like the fuel rods at the corners, have an uranium enrichment concentration of 7.5 wt % to which 4.5 wt % of burnable poisons are added so that the peaking of localized power at the beginning of cycle is suppressed. According to employment of this fuel arrangement, it is possible to increase the uranium enrichment average concentration in the lateral sectional area of the fuel assembly to 7.47 wt %.

In the present embodiment, the fuel material of the uranium enrichment average concentration in the lateral sectional area of the fuel assembly of 7.47 wt % was constantly arranged in the axial direction of the fuel assembly. When the fuel assemblies are loaded on the core shown in FIG. 6, the outer core diameter is 3.2 m, the active fuel length is 194 cm, the power density is 71 kW/L. The volume rate of the two phase flow including sub-cooled water for cooling the fuel rods in the channel box is 23%, the volume rate of water in the water rod is 5%, the volume rate of water in the gaps between channel boxes outside and in the water rod is 26%, the volume rate of the fuel material is 31%, and the volume ratio of the two phase flow cooling water to the volume rate of the fuel material is 0.88 in the reactor core area.

The weight of uranium contained in the unit volume of the core area is 2.4 kg/L. The ratio of the outer width of the channel box to the fuel assembly lattice width is 0.82. The volume rate of the two phase flow cooling water including sub-cooled water for cooling the fuel rods is 36%, the volume rate of water in the water rod is 7%, and the ratio of the volume rate of the two phase flow cooling water to the volume rate of the fuel material is 0.88 in the channel box area. A weight of uranium in the unit area of the channel box is 3.8 kg/L.

In this embodiment, the average uranium enrichment concentration in the fuel assembly lateral sectional area is changed from 4.87% of Embodiment 1 to 7.47% to increase the burnup. This embodiment realizes the increased plant utilization, compared with the first embodiment.

In this embodiment, the weight of uranium contained in the unit area of the core area is 2.4 kg/L, which is about 26% larger than 1.9 kg/L of ABWR. As a result, the active fuel length becomes 1.94 m, which is about 1.8 m shorter than 3.7 m of ABWR. Further, when the distance between the channel boxes is set to 39.0 mm, which is wider than 16 mm of ABWR, it is possible to suppress the reactivity increase at the cold condition. In the embodiment, as same as in embodiment 1, fuel rods having outer diameter of 9.5 mm are arranged as a triangle lattice with a fuel rod gap of 1.8 mm so as to increase the total number. As a result, the average linear heat generation ratio is made 142 W/cm, which is about 17% smaller than 172 W/cm of ABWR. As a result, it is possible to attain MCPR of 1.3, which is almost the same heat removal performance as ABWR.

As having described, the height of the core is greatly reduced to contribute to realization of the boiling water reactor by which the construction cost of the power plant is greatly reduced, keeping the same thermal margin and safety as ABWR. Further, the reduction in the reactivity increase at the cold condition and in the absolute value of the void coefficient improves the reactor shutdown performance and transient and stability performance, keeping the same thermal margin and safety as the ABWR with high burnup.

Further, when the active fuel length of this embodiment is 381 cm, the reactor building height is equal to that of ABWR. When the number of fuel assemblies for replacement is 65 for each cycle, it is possible to constitute the reactor core having 4423 days of a super long-term average burnup days at the discharge burnup of 65 GWd/t. When the number of fuel assemblies for replacement is 313 for each cycle, it is possible to constitute the reactor core having a super long-term of 45 months of average burnup period at the discharge burnup of 48 GWd/t.

Third Embodiment

The third embodiment according to the present invention will be explained with reference to FIGS. 8 and 9. This embodiment differs from embodiments 1 and 2 in that the present invention is applied to a fuel assembly whose lateral cross sectional view is not the equilateral hexagon. The core has an electric power of 1356 MWe, and is constituted by 720 fuel assemblies, which is the same as Embodiment 1, and 223 Y-type control rods at a rate of one control; rod for every 3 fuel assemblies. (0089)

Figure 8A:
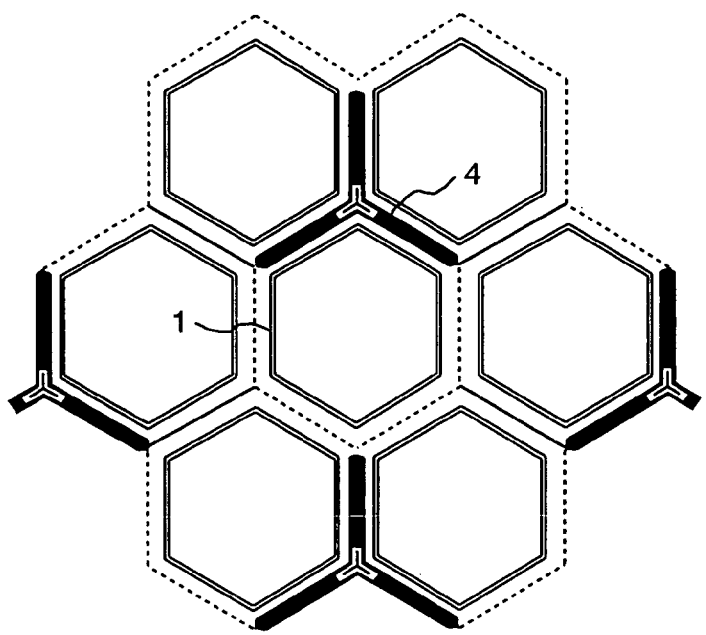
FIG. 8a is a lateral cross sectional view of a core.
Figure 8B:
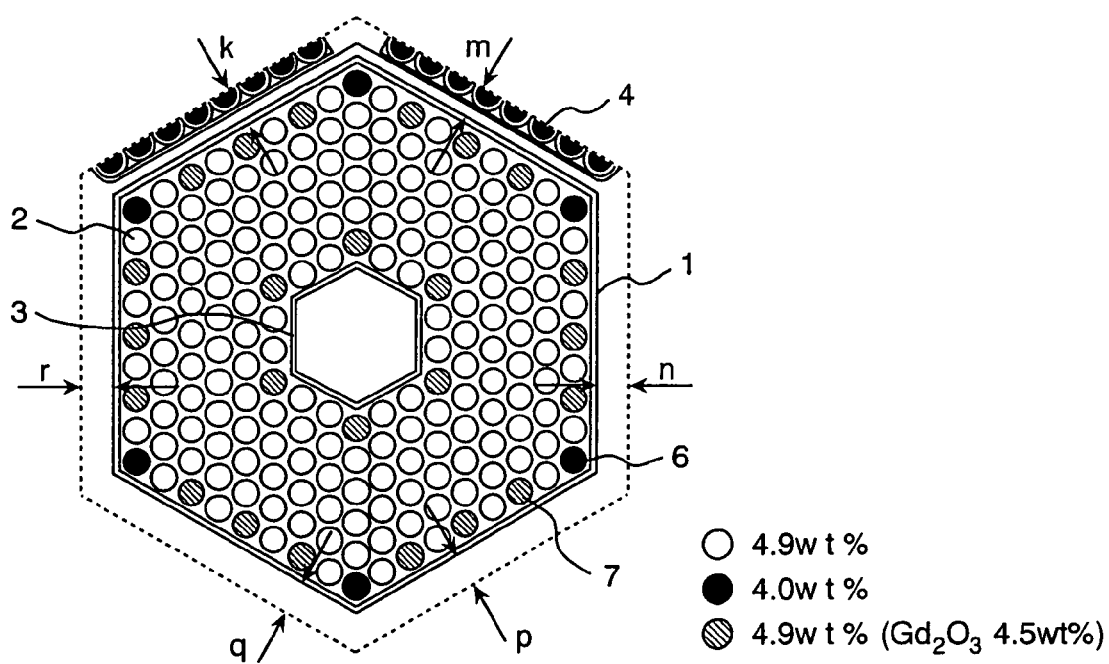

FIGS. 8a and 8b show an arrangement of 6 fuel assemblies and a cross sectional view of one of the fuel assemblies. The fuel assembly is constituted by fuel rods 2, 6, 7, an equilateral hexagon channel box 1 including a water rod 3 therein, and Y-type control rods 4 disposed in the gap between the channel boxes and outside of the channel box. The fuel assembly shown in FIG. 8 has a hexagonal shape of a long shape in longitude wherein, when the gaps between the six sides of the channel box 1 and the fuel assembly 4 are defined as k, m, n, p, q and r, the gaps k, m into which the Y-type control rod is inserted and gaps p, q at the opposite sides by way of the channel box are longer than the remaining gaps n, r.

The center of the channel box 1 and that of the fuel assembly lattice are the same. The gaps k and m, p and q are equal, and gaps n and r are equal. The distance between the two sides of the channel boxes 1 at the side where the Y-type control rod 4 is inserted is 24.1 mm, which is twice that of k, and the distances of the remaining 4 sides are 21.6 mm (k+n). The average distance between the channel boxes is 22.4 mm. The fuel rods 2 having a diameter of 9.5 mm are arranged with a gap of 1.8 mm between the fuel rods in the triangle lattice in the channel box 1 to constitute a equilateral hexagon fuel assembly with 9 rows of fuel rods.

A water rod 3 is located in the center of the fuel assembly, the area for the water rod being 19 fuel rod unit cells. The number of the fuel rods in the channel box is 198. Absorber rods made of stainless tubes filled with $B_4C$ are disposed in the wings of the Y-type control rods 4, and the dangle between the wings being 120 degrees.

Figure 9A:
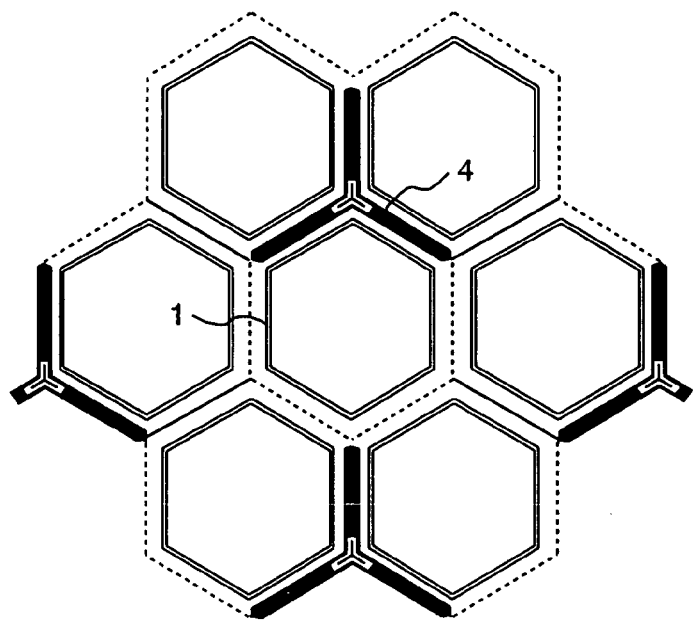
FIG. 9a is a lateral cross sectional view of a core.
Figure 9B:
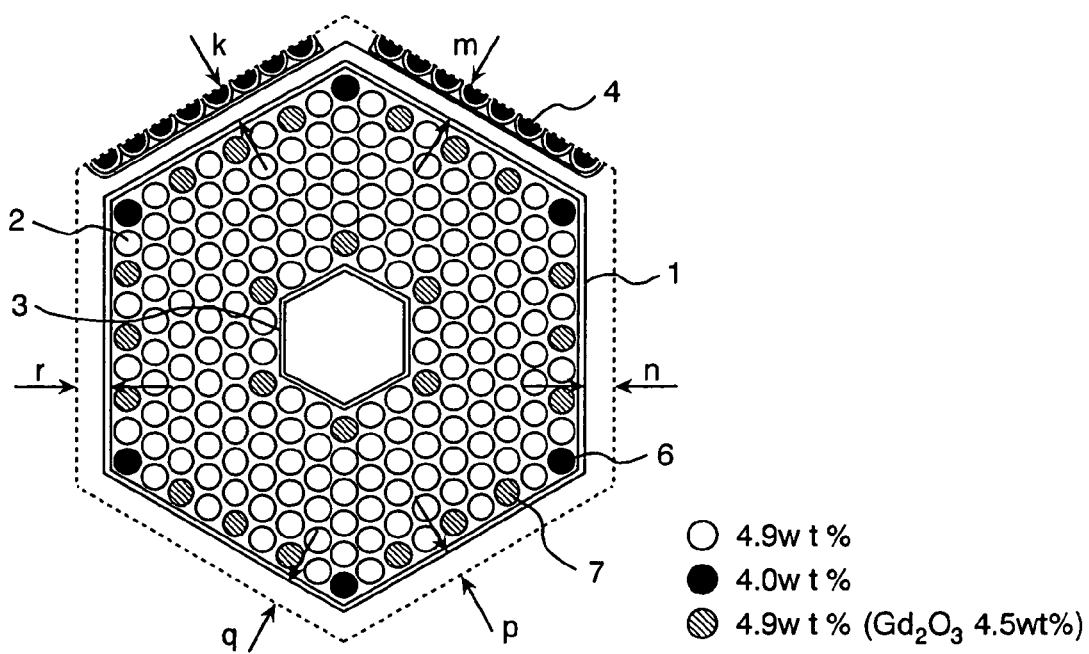

FIGS. 9a and 9b show another example of the fuel assembly structure and a cross sectional view of one of the fuel assemblies. There is an arrangement of 6 fuel assemblies. The fuel assembly lattice shown in FIG. 9b has a shape wherein the gaps k, m at the sides where the Y-type control rods 4 is inserted are longer than remaining 4 gaps n, p, q, r, thereby to form a longitude hexagon. The gaps k and m are equal, and the gaps n and p, q and r are equal. The distance between the channel boxes at the two sides where the control rod 4 is inserted 29.1 mm (twice of k), the distances of the remaining 4 sides are 19.1 mm (twice of n), and the average distance between the channel boxes is 22.4 mm. The arrangement and shape of the fuel rods 2, 6, 7 in the channel box 1 and the water rod 3 are the same as those in FIG. 8b.

When this fuel assembly is loaded on the core shown in FIG. 6, the core outer radius is 2.9 m, the active fuel length is 194 m, and the power density is 83 kW/L. The volume rate of the two phase flow cooling water including sub-cooled water for cooling the fuel rods in the core area in the channel box is 27%, the volume rate of water in the water rod is 5%, and the volume rate of the gap between the channel boxes outside of thereof to the volume of water in the water rod is 26%, the volume rate of the fuel material is 31%, and the ratio of the volume rate of the two phase flow cooling water to the volume rate of the fuel material is 0.88 in the reactor core area. The weight of uranium contained in a unit volume in the core area is 2.8 kg/L.

The ratio of the outer width of the channel box to the average fuel assembly lattice width obtained by making average of three lattice widths of the longitude hexagon shape fuel assembly is 0.89. The volume rate of the two phase flow cooling water including sub-cooled water for cooling the fuel rod in the channel box is 36%, the volume rate of water in the water rod is 7%, the volume rate of fuel material is 41%, and the ratio of the volume rate of the two phase flow cooling water to the volume rate of the fuel material is 0.88 in the channel box area. The amount of uranium contained in the unit volume in the channel box area is 3.8 kg/L.

The arrangement of the fuel assembly is the same as in embodiment 1, the fuel rods having 4.87 wt % of the average uranium enriched concentration of the fuel assembly being constantly along the axial direction thereof.

In this embodiment, as same as in embodiment 1, a boiling water reactor of which length of the fuel assembly is 1.94 m, which is about 1.8 m shorter than 3.7 m of the fuel assembly of ABWR, can be realized when the weight of uranium contained in the unit volume of the core area is 2.8 kg/L, which is about 47% larger than 1.9 kg/L of ABWR. Further, when the average distance between the channel boxes is set to 22.4 mm, which is larger than 16 mm of that of ABWR, the reactivity increase at the cold condition is suppressed, and the void coefficient becomes −6.0×10−4 Δk/k % void, the absolute value of which is smaller than that of ABWR so that the boiling water reactor having such the features is realized.

Further, in this embodiment, as same as in embodiment 1, when the fuel rods having the outer diameter of 9.5 mm are arranged in the triangle lattice with 1.8 mm gaps between fuel rods to increase the number of fuel rods, thereby lessening the average linear heat generation ratio of 142, which is about 17% smaller than 172 W/cm of ABWR, 1.3 or more of MCPR is attained, and the same heat performance removal as that of ABWR is secured.

From the above described reasons, the boiling water reactor is realized, thereby to contribute to lowering of reactor height and to reduction of construction cost of the power plant, keeping the same thermal margin and safety as those of ABWR. Further, the reactor shutdown performance and transient and stability which are the subjects in high burnup are improved by reducing the reactivity increase at the cold condition and the void coefficient, keeping the same thermal margin and safety as those of ABWR.

Fourth Embodiment

Figure 10:
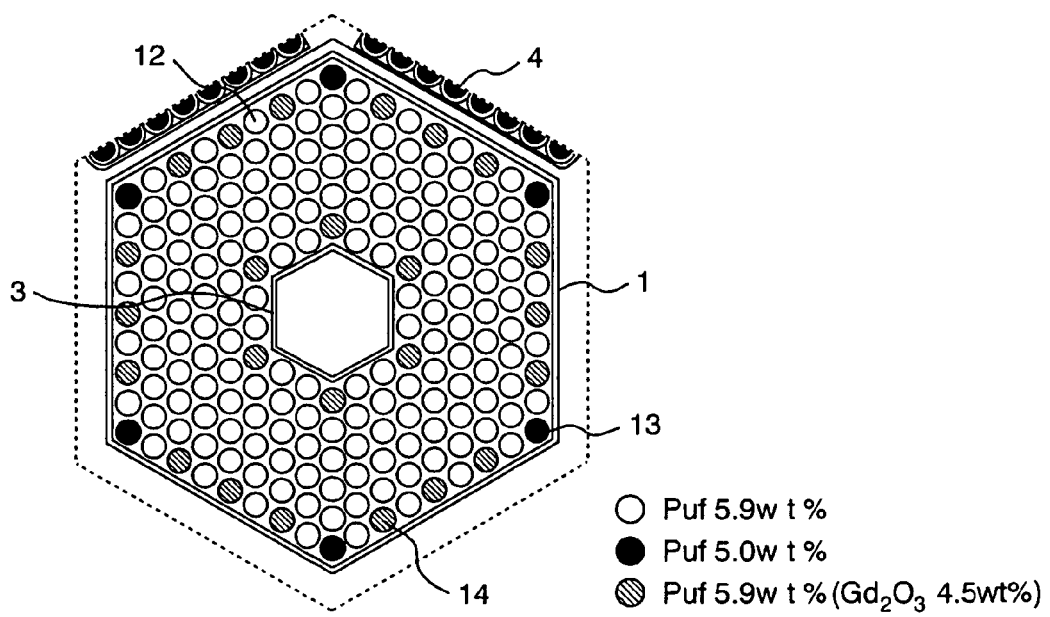
FIG. 10 is a lateral cross sectional view of a fuel assembly according to fourth embodiment.

The fourth embodiment of the present invention will be explained with reference to FIG. 10. This embodiment employs the mixed oxide fuel in which depleted uranium obtained as the residual in producing enriched uranium fuel is enriched with plutonium obtained by reprocessing the spent fuel.

The reactor of this embodiment is 1356 MW, and the lateral cross sectional view of the core is the same as FIG. 6 of first embodiment 1. FIG. 10 shows a cross sectional view of the fuel assembly lattice. The arrangement, shape and size of the channel box 1 in the fuel assembly lattice, fuel rods 12, 13, 14, the water rod 3, and the Y-type control rod 4 are the same as those of first embodiment. A fuel material enriched with a fissile plutonium of 5.0 wt % is used for the corner fuel rod 13 where the local fuel rod power becomes larger at the time of beginning of the cycle, and other fuel rods have a fuel material enriched with fissile plutonium of 5.9 wt %.

In the fuel rods 14 other than the fuel rod 13, the fuel rod 14 adjoining the channel box and water rod having a tendency of increasing the power at the beginning of the cycle, a fuel material containing 4.5 wt % of burnable poison enriched with 5.9 wt % of fissile plutonium of, to suppress the local power peaking. In this embodiment, the fuel material having the average fissile plutonium of enrichment 5.87 wt % in the fuel assembly lateral sectional area is arranged constantly in its axial direction.

The core outer radius of this embodiment is 2.9 m, the active fuel length 194 mm, the power density is 83 kW/L, and the total weight of uranium and plutonium contained in the core area is 2.8 kg/L. Further, the total weight of uranium and plutonium contained in the channel box area is 3.8 kg/L.

In this embodiment, the boiling water reactor of the active fuel length of 1.94 m, which is 1.8 m shorter than 3.7 m of ABWR is realized by making the total weight of 2.8 kg/L contained in the core area. When the channel box distance is 22.5 mm, which is wider than 16 mm of ABWR, it is possible to suppress the increase of the reactivity increase at the cold condition and to attain the reactor shutdown margin of 1.0% Δk or more.

Further, in this embodiment as same as in the first embodiment, the fuel rods having the outer diameter of 9.5 mm are arranged in the triangle lattice with a gap between the duel rod of 1.8 mm, so as to increase the number of fuel rods. As a result, the average linear heat generation ratio can be made 142 W/cm, which is about 17% smaller than 172 W/cm is attained to achieve MCPR of 1.3 or more.

From the above reason, the boiling water reactor that contributes to the reduction of the construction of the power plant, keeping the thermal margin and safety.

Fifth Embodiment

The fifth embodiment of the present invention will be explained with reference to FIGS. 11, 12. In this embodiment, a large diameter round control rod is arranged in the center of the fuel assembly, in place of the Y-type control rod, which is disposed between the channel boxes, on the basis of embodiment 1.

Figure 11:
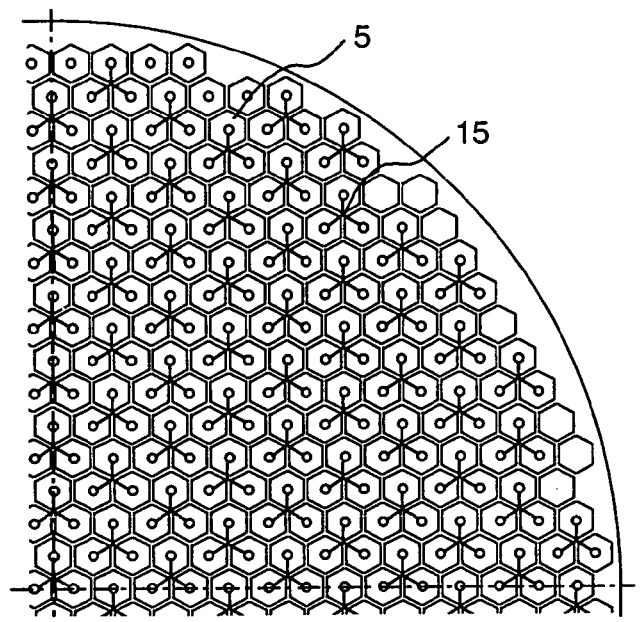
FIG. 11 is a lateral cross sectional view of a ¼ core according to fifth embodiment.
Figure 12:
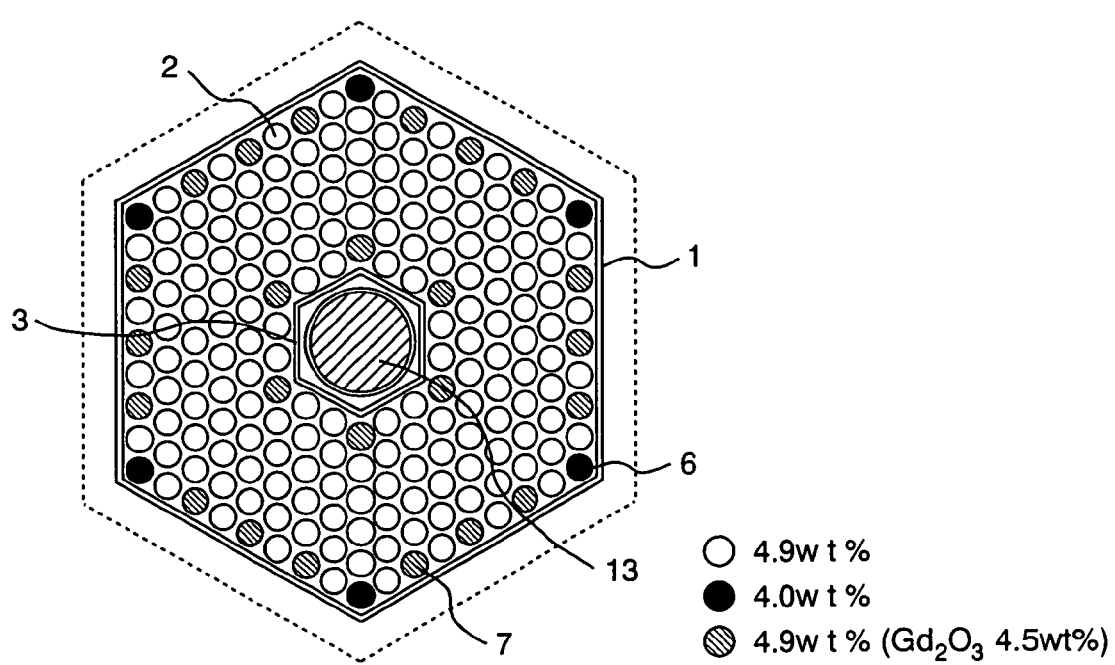
FIG. 12 is a lateral cross sectional view of a fuel assembly to be loaded on the core shown in FIG. 11.

In FIG. 11, a lateral cross sectional view of a quarter of the 1356 MWe power core according to the present embodiment. The core comprises 720 fuel assemblies 5, and 223 control drive mechanisms 15 for driving the large diameter round control rods inserted into the fuel assemblies 3. FIG. 12 shows a cross sectional view of the fuel assembly lattice.

The fuel assembly lattice is constituted by fuel rods 2, 6, 7, a water rod 3, a equilateral hexagon channel box 1 including a round control rod 16, and gaps between the channel boxes.

The distance between the channel boxes is 22.5 mm. The fuel rods 2 having the outer diameter of 9.5 mm are arranged in the triangle lattice with the distance between the fuel rods of 1.8 mm to constitute the equilateral hexagon lattice of 9 rows of fuel rods. In the center of the fuel rod, the water rod for three rows of fuel rods, i.e. 19 fuel rod unit lattice cells is disposed. The large diameter round control rod 16 is inserted into the water rod 3. The number of the fuel rods is 198.

The large diameter round control rod 16 is constituted by absorber rods of stainless tubes filled with $B_4C$. The core outer radius is 2.9 m, when the above fuel assemblies are loaded on the core as shown in FIG. 11, the active fuel length is 194 cm, and the power density is 83 kW/L. The volume rate of the two phase flow cooling water including sub-cooled water in for cooling the fuel rods in the channel box is 27%, the volume rate of the water in the water rod is 5%, the volume rate of the water in gaps between the channel boxes outside of the channel box is 26%, the volume rate of the fuel material is 31%, and the ratio of the volume rate of the two phase flow cooling water to the volume rate of the fuel material is 0.88 in the reactor core area.

The weight of uranium contained in the unit volume in the core area is 2.8 kg/L. The ratio of the outer width of the channel box to the fuel assembly lattice width is 0.89. The volume rate of the two phase flow cooling water including sub-cooled water for cooling the fuel rods is 36%, the volume rate of water in the water rod is 7%, the volume rate of the fuel material is 41%, and the ratio of the two phase flow cooling water to the volume rate of the fuel material is 0.88 in the channel box area. The weight of uranium contained in the unit volume contained in the channel box area is 3.8 kg/L.

The arrangement of the fuel material in the fuel assembly is the same as in embodiment 1. The average uranium concentration in the fuel assembly lateral sectional area is 4.87 wt %, the fuel material being distributed constantly in the axial direction thereof.

In this embodiment, a water rod disposed in the center of the fuel assembly is employed as a guide tube for a large diameter round control rod. AS the diameter of the control rod becomes large, the mechanical strength of the control rod is higher, thereby to suppress the bending or crash of the control rod at the time of insertion and withdrawal. Further, production of the control rods becomes easy and can reduce production cost by reducing the number of the control rods per the fuel assemblies.

In this embodiment, as same as in the first embodiment, a boiling water reactor having an active fuel length of 1.94 m, which is about 1.8 m shorter than 3.7 m of WABWR is realized by increasing the uranium weight in the unit volume in the core area to 2.8 kg/L, which is about 47% higher than 1.9 kg/L of ABWR. When the distance between the channel boxes is set to 22.5 mm, which is wider than 16 mm of ABWR, the reactivity increase at the cold condition is suppressed, and the void coefficient becomes $-6.0 \times 10^{-4}$ $\Delta k/k$ % void whose absolute value is smaller than that of ABWR.

Further, in this embodiment as same as in embodiment 1, the fuel rods having the outer diameter of 9.5 mm are arranged in the triangle lattice with the distance between the fuel rods of 1.8 mm to increase the total number of fuel rods and to lower the average linear heat generation ratio to 142 W/cm, which is about 17% lower than 172 W/cm of ABWR; it is possible to secure 1.3 or more of MCPR, which is almost the same as the heat removal performance.

Sixth Embodiment

The sixth embodiment according to the present invention will be explained with reference to FIGS. 13, 14. In this embodiment, the loading amount of the fuel is increased, on the basis of embodiment 5.

Figure 13:
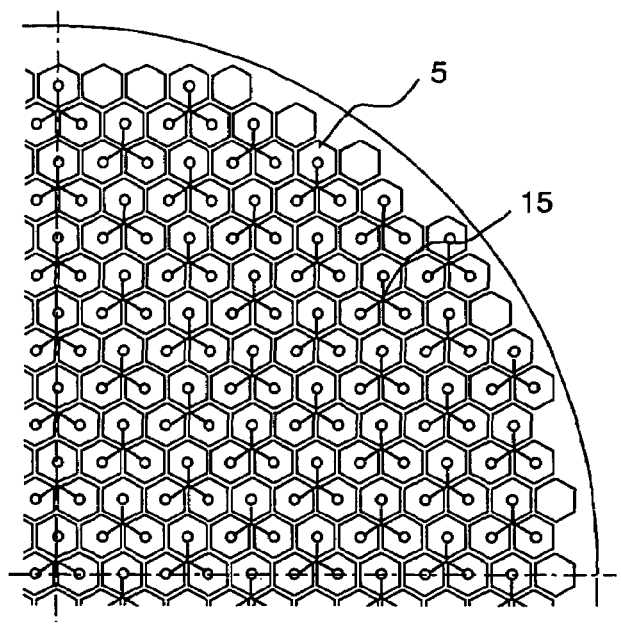
FIG. 13 is a lateral cross sectional view of a ¼ core according to sixth embodiment.
Figure 14:
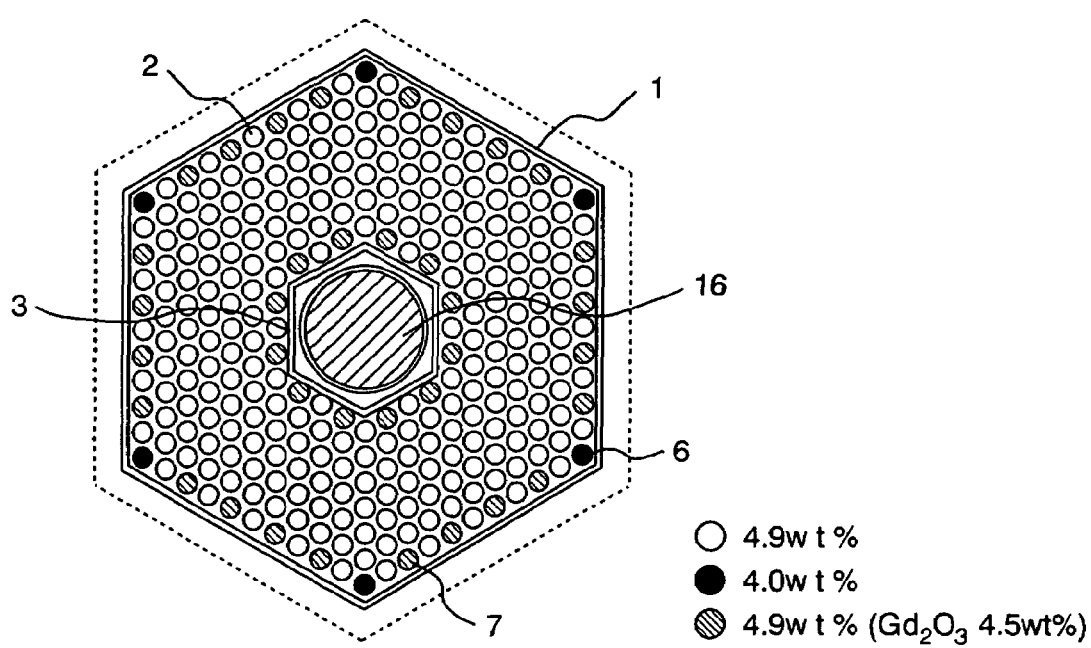
FIG. 14 is a lateral cross sectional view of a fuel assembly to be loaded on the core shown in FIG. 13.

FIG. 13 shows a lateral cross sectional view of the 1356 MWe according to this embodiment. There are shown 504 fuel assemblies 5, and 157 control drive mechanisms 15 for driving the control rods inserted into 3 fuel assemblies. FIG. 14 shows the cross sectional view of the fuel assembly lattice. The fuel assembly is constituted by fuel rods 2, 6, 7, a water rod 3, a channel box 1 including a large diameter round control rod 16, and gaps between the channel boxes.

The distance between the channel boxes is 22.5 mm. The fuel rods 2 having the outer diameter of 9.5 mm are arranged in the triangle lattice with the distance between the fuel rods of 1.7 mm, to constitute the equilateral hexagon fuel assembly. In the center area of the fuel assembly, the water rod 3 is disposed in the area for 4 rows of the fuel rods, i.e. 37 of the fuel rod unit lattice cells. The water rod receives the large diameter round rod shape control rod 16 when it is inserted.

The number of the fuel rods in the channel box 1 is 294. The large diameter round rod shape control rod 16 is constituted by an absorption stainless tube filled with $B_4C$. The fuel rod 6 containing 4.0 wt % of uranium concentration where the local power becomes large at the time of beginning of the cycle is arranged, and other fuel rods 2 are provided with the uranium concentration of 4.9 wt %. Further, the fuel rods 7 adjoining the channel boxes and the water rod, the power of which tends to become large are provided with the fuel material containing 4.9 wt % of the uranium concentration to which 4.5 wt % of the burnable poison is added. The average enriched uranium concentration in the fuel lateral sectional area is 4.88 wt %.

In this embodiment, the fuel material of the average enriched uranium concentration in the fuel lateral sectional area of 4.88 wt % is arranged constantly in the axial direction of the fuel assembly. The core outer radius when the fuel assemblies are loaded on the core shown in FIG. 13 is 2.9 m, the active fuel length is 194 cm, and the power density is 85 kW/L. The volume rate of the two phase flow cooling water including sub-cooled water for cooling the fuel rods in the channel box is 26%, the volume rate of water in the water rod is 7%, the volume rate of water in the gaps between the channel in the water rod is 25%, the volume rate of the fuel material is 32%, and the ratio of the volume rate of the two phase flow cooling water to the volume rate of the fuel material is 0.80 in the reactor core area.

The uranium weight contained in the unit volume in the core area is 3.0 kg/L. The ratio of the outer width of the channel box to the fuel assembly lattice width is 0.90.

The volume rate of the two phase flow cooling water for cooling the fuel rods including sub-cooled water in the channel box area is 33%, the volume rate of water in the water rod is 9%, the fuel volume rate is 42%, and the ratio of the volume rate of the two phase flow cooling water to the volume rate of the fuel material is 0.80 in the channel box area. The uranium weight contained in the unit volume in the channel box area is 3.9 kg/L.

In this embodiment, as same as in embodiment 5, employed are round control rods with a large diameter that utilize water rods disposed in the fuel assemblies as guide tubes. By employment of the large diameter control rods, mechanical strength of the control rods increases, and bending and crash of the control rods at the time of withdrawing and insertion can be prevented. Further, by decreasing the number of the fuel rods per one fuel assembly, the production of the control rods becomes easy and production cost can be saved.

In this embodiment, the uranium weight contained in the unit volume of the core area is 3.0 kg/L, and the active fuel length is 1.94 m, which is about 1.8 m shorter than 3.7 m of ABWR.

In this embodiment, the number of fuel rods per one fuel assembly is increased to enlarge it, and the number of the fuel assemblies is reduced to 504 from 720 of embodiment 1.

In this embodiment, with enlargement of the fuel assembly, the area occupied by the control rod is increased from 19 of fuel rod unit lattice cells to 37, thereby to attain almost the same control value as in embodiment 5. At the same time, the distance between the channel boxes is increased from 16 mm of ABWR to 22.5 mm, thereby to suppress the reactivity increase at the cold condition, and the boiling water reactor having the absolute value of the void coefficient, which is smaller than ABWR is realized.

Further, in this embodiment, the fuel rods having the outer diameter of 9.5 mm are arranged in the triangle lattice with the distance between the fuel rods of 1.7 mm to increase the total number of fuel rods so that the average linear heat generation ratio can be made 137 W/cm, which is about 20% lower than 172 W/cm of ABWR to secure MCPR of 1.3 or more. Accordingly, it is possible to attain the same heat removal performance as that of ABWR.

From the above-described reasons, the boiling water reactor that contributes to greatly reduce the height of the core and the construction cost of the power plant is realized, keeping the same heat removal performance and safety as those of ABWR. Furthermore, the reactivity increase at the cold condition and the absolute value of void coefficient are lowered to improve the reactor shutdown performance, which is the subject for the high burnup reactors and transient and stability performance, keeping the same thermal margin and safety as those of ABWRs now under operation.

Seventh Embodiment

The seventh embodiment according to the present invention will be explained with reference to FIGS. 15, 16. This embodiment increases the fuel loading quantity based on the structure of the first embodiment.

Figure 15:
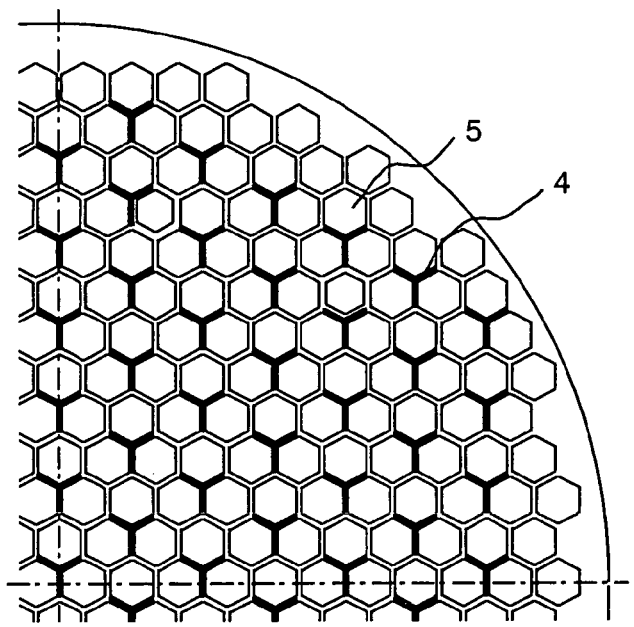
FIG. 15 is a lateral cross sectional view of a ¼ core according to seventh embodiment.
Figure 16:
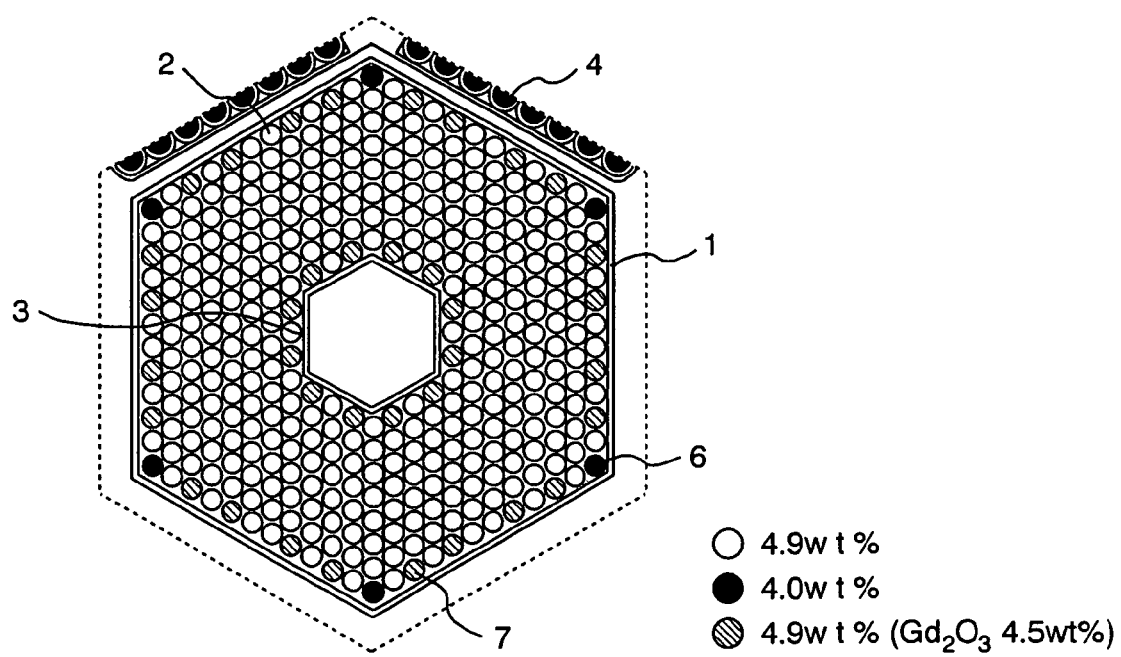
FIG. 16 is a lateral cross sectional view of a fuel assembly to be loaded on the core shown in FIG. 15.

FIG. 15 shows the lateral cross sectional view of the 1356 MWe electric power. There are shown 426 fuel assemblies 5, and 124 Y-type control rods 4 at a rate of one control rod for 3 fuel assemblies. FIG. 16 shows a cross sectional view of the fuel assembly. The fuel assembly is constituted by the fuel rods 2, 6, 7, the equilateral hexagon channel box 1 including the fuel assembly and the water rod 3, and the Y-type control rod 4 disposed in the gaps between the channel boxes and outside of the channel boxes.

The distance between the channel boxes is 26.8 mm. The fuel rods 2 having the outer diameter of 9.6 mm are arranged in the triangle lattice with the distance between the fuel rods of 1.4 mm in the channel box to constitute the equilateral hexagon fuel assembly with the 12 rows. In the center of the fuel assembly, the water rod 3 is formed in an area for 4 fuel rod rows, i.e. 37 fuel rod unit cells. The number of the fuel rods in the channel box is 360. The wings of the Y-type control rod 4 are provided with absorber rods of stainless tubes filled with B4C, the angle between the wings being 120 degrees. The fuel rods 6 at the corner of the fuel assembly where the local power becomes large at the beginning of the cycle contain a fuel material of 4.0% of uranium enrichment concentration, and other fuel rods contain a fuel material of 4.9% of uranium enrichment concentration.

The local power peaking at the beginning of the cycle is suppressed by arranging a fuel material for the fuel rods 6, which adjoin the channel boxes and the water rod, the fuel rods containing 4.9 wt % of uranium enrichment concentration to which 4.5 wt % of burnable poison is added.

The average uranium enrichment concentration in the lateral cross sectional area of the fuel assembly is 4.89%. In this example, the fuel material of 4.89 wt % of the average uranium enrichment concentration in the lateral cross sectional area of the fuel assembly is constantly arranged in the axial direction. When the fuel assemblies are loaded on the core shown in FIG. 15, the core outer radius is 2.9 m, the active fuel length is 194 m, and the power density is 85 kW/L.

The volume rate of the two phase flow cooling water including sub-cooled water for cooling the fuel rods in the channel boxes is 23%, the volume rate of water in the water rod is 6%, the volume rate of water in the gaps between the channel boxes and in the water rod is 26%, the volume rate of the fuel material is 34%, and the ratio of the volume rate of two phase flow cooling water to the volume rate of the fuel material is 0.69 in the reactor core area. The weight of uranium contained in the unit volume of the core area is 3.2 kg/L. The ratio of the outer width of the channel box to the fuel assembly lattice width is 0.89.

The volume rate of water including sub-cooled water for cooling the fuel rods in the area of the channel box is 31%, the volume rate of water in the water rod is 8%, the volume rate of the fuel material is 45%, and the ratio of the volume rate of two phase flow water to the volume rate of the fuel material is 0.69 in the channel box area. The uranium weight in the unit volume in the area of the channel box is 4.1 kg/L.

In this embodiment, when the uranium weight in the core area is 3.2 kg/L, the active fuel length is 1.94 m, which is about 1.8 m shorter than 3.7 m of ABWR.

In this embodiment, the fuel assembly is made in a large scale size by increasing the number of fuel rods per one fuel assembly, and the number of fuel assemblies loaded on the core is decreased from 720 to 426. In the embodiment, the distance between the channel boxes is 26.8 mm, which is wider than 16 mm of ABWR, thereby to suppress the increase in the reactivity increase at the cold condition, and to realize the boiling water reactor, which has a small absolute value of void coefficient, as well.

Further, in this embodiment, the fuel rods having the outer diameter of 9.6 mm are arranged in the triangle lattice with the distance between the fuel rods of 1.4 mm to increase the total number of fuel rods. As a result, the average linear heat generation ratio is 132 W/cm, which is about 23% smaller than 172 W/cm of ABWR, and it is possible to attain MCPR of 1.3 or more, which is the same heat removal performance as ABWR.

From the above reasons, the boiling water reactor is realized that contributes to reduction of height of the core and to reduction of construction cost of power plant, keeping the same thermal margin and safety as those of ABWR. Further, the reactivity increase at the cold condition and the absolute value of the void coefficient are decreased thereby to improve the reactor shutdown performance, transient and stability performance, which are the subjects for high burnup.

Eighth Embodiment

The eighth embodiment according to the present invention will be explained with reference to FIG. 17. This embodiment is concerned with a natural circulation reactor, which is based on the structure of the seventh embodiment.

This embodiment is concerned with a reactor of 518 MWe electric power, the lateral cross sectional view being the same as that of FIG. 15. FIG. 17 shows a cross sectional view of the fuel assembly lattice. The fuel assembly is constituted by fuel rods 2, 6, 7, a equilateral hexagon channel box 1 including a water rod 3, and a Y-type control rod 4 inserted into the gap areas between the channel boxes and disposed outside of the channel box. The distance between the channel boxes is 27.4 mm.

The fuel rods 2 having the outer diameter of 14.5 mm are arranged in the channel box so as to form a triangle lattice with 1.3 mm of a distance between the fuel rods, thereby to constitute the equilateral hexagon fuel assembly of 8 rows. The number of the fuel rods the channel box is 150. The wings of the Y-type control rod 4 are provided with absorber rods of stainless tubes filled with B4C, and the angle between the wings is 120 degrees. The fuel rods 6 at the corners where the power becomes large at the beginning of cycle contains 4.0 wt % of the uranium enrichment concentration, other fuel rods 2 contain a fuel material of 4.9 wt % of uranium enrichment concentration.

The fuel rods 7 that adjoin the channel boxes and the water rod where the power tends to large at the beginning of cycle use 4.9 wt % of uranium enrichment concentration to which 4.5 wt % of a burnable poison is added so as to suppress the local power peaking at the beginning of the cycle. The average uranium enrichment concentration in the lateral cross section of the fuel assembly is 4.86%. In this embodiment, fuel rods have 4.86% of the average uranium enrichment concentration in the cross section of the fuel assembly, the fuel rods being constantly arranged in the axial direction of the fuel assembly.

When the fuel assemblies are loaded on the core shown in FIG. 15, the core outer radius is 2.9 m, the active fuel length is 131 cm, and the power density is 53 kW/L. The volume rate of the two phase flow cooling water including sub-cooled water for cooling the fuel rods in the channel box is 18%, the volume rate of water in the water rod is 7%, the volume rate of water in the gaps between the channel boxes and in the water rod is 28%, the volume rate of the fuel material is 36%, and the ratio of the volume rate of the two phase flow cooling water to the volume rate of the fuel material is 0.50 in the reactor core area. The weight of uranium contained in the unit volume of the core area is 3.3 kg/L.

The ratio of the outer width of the channel box to the lattice width of the fuel assembly is 0.89. The volume rate of the two phase flow cooling water including sub-cooled water in the channel box area is 24%, the volume rate of water in the water rod is 9%, the volume rate of the fuel material is 48%, and the ratio of the volume rate of the two phase flow cooling water to the volume rate of the fuel material is 0.50 in the channel box area. The weight of uranium contained in the unit volume in the channel box area is 4.5 kg/L.

In this embodiment, when the weight of uranium contained in the core area is 3.3 kg/L, a boiling water reactor having the active fuel length being 1.31 m, which is about 2.4 m shorter than 3.7 m of ABWR, is realized.

In this embodiment, when the distance between the channel boxes is 27.4 mm, which is 16 mm wider than ABWR, it is possible to suppress the increase of the reactivity increase at the cold condition that leads to 1.0% Δk or more of the reactor shutdown margin. Further, in this embodiment, 1.3 or more of MCPR is secured by 518 MWe of the electric power, thereby to attain the same heat removal performance as that of ABWR.

From the above reasons, it is possible to realize the boiling water reactor that contributes to great reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

In this embodiment, when the weight of uranium contained in the unit volume of the core area is 3.3 kg/L to make the ctive fuel length 1.31 m, and to make the power as small as 518 MWe, the thermal margin is kept as small as that of ABWR, and the flow rate in the core can be reduced.

From the above reasons, the pressure drop of the core is reduced, and a boiling water reactor that is capable of natural circulation is realized.

Ninth Embodiment

The ninth embodiment according to the present invention will be explained with reference to FIG. 18. The present embodiment reduces the fuel cycle cost by extending the life of the fuel assemblies, based upon the structure of the first embodiment.

The present embodiment is concerned with a core of 1356 MWe of the electric power, the lateral cross sectional view is the same as FIG. 6 of the first embodiment.

Figure 18:
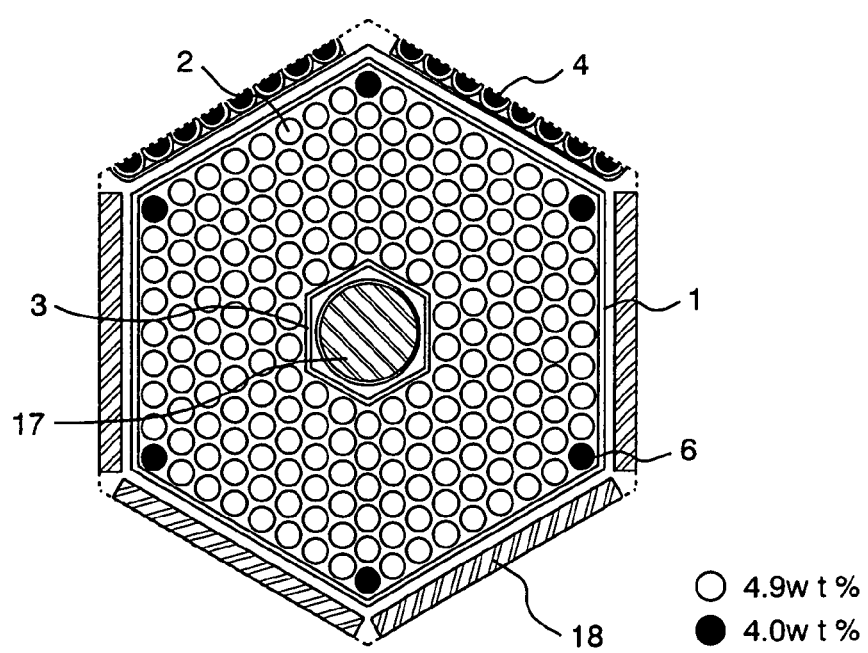
FIG. 18 is a lateral cross sectional view of a fuel assembly according to ninth embodiment.

FIG. 18 shows the cross sectional view of the fuel assembly. The fuel assembly is constituted by fuel rods 2, 6, an equilateral hexagon channel box including a water rod 3 and a water removal rod 17, a Y-type control rod 4 to be arranged in gaps between the channel boxes and disposed outside of the channel box, and a water removal plate 18. The distance between the channel boxes is 22.5 mm.

Fuel rods 2 having an outer diameter of 9.5 mm are arranged in the channel box 1 to form a triangle lattice with a fuel rod gap of 1.8 mm, thereby to constitute an equilateral hexagon fuel assembly with 9 rows of fuel rods. In the center area of the fuel assembly, a water rod 3 from which a water removal rod 17 is withdrawn during operation is disposed in the area for 3 rows of fuel rods, i.e. 19 of the fuel rod unit lattice cells. The number of fuel rods in the channel box is 198. The Y-type control rods 4 are disposed at two sides of 6 sides of the channel boxes.

The wings of the Y-type control rod have absorber rods of stainless tubes filled with B$_4$C. The angle between the wings is 120 degrees. At the tips of the Y-type control rod, a detachable water removal plate, which is capable of being withdrawn during operation, is disposed.

A water removal plate 18, which is detachable and capable of being withdrawn, is disposed in the gap area between the channel boxes facing the 4 sides of 6 sides of the channel box. A fuel material containing 4.0 wt % of uranium enrichment concentration for the fuel rods 6 at the corners where the power of the fuel rods becomes large at the time of beginning of cycle is arranged, and for the other fuel rods 2, a fuel material containing 4.9 wt % of uranium enrichment concentration is arranged. The average uranium enrichment concentration on the lateral cross sectional area is 4.87 wt %. In this embodiment, a fuel material of 4.87 wt % of the uranium enrichment concentration of the fuel assembly cross sectional area is constantly arranged in the axial direction of the fuel assembly.

The core outer radius is 2.9 m, when the fuel assemblies are loaded on the core shown in FIG. 6, the active fuel length is 194 cm, and the power density of 83 kW/L. The volume rate of two phase flow cooling water including sub-cooled water for cooling the fuel rods in the channel boxes is 27%, the volume rate of water in the water rod is 5%, the volume rate of water in gaps between the channel boxes and in the water rod is 26%, the volume rate of the fuel material is 31%, and the ratio of the volume rate of two phase flow cooling water to the volume rate of the fuel material is 0.88 in the reactor core area.

The weight of uranium contained in the core area is 2.8 kg/L. The outer width of the channel box to the lattice width of the fuel assembly is 0.89. The volume rate of the two-phase flow cooling water including sub-cooled water for cooling the fuel rods in the channel box area is 36%. The volume rate of water in the water rod is 7%. The volume rate of the fuel material is 41%. The ratio of the volume rate of two phase flow cooling water to the volume rate of the fuel material is 0.88 in the channel box area. The weight of uranium contained in the unit volume in the channel box area is 3.8 kg/L.

In this embodiment, when water present in gaps between the channel boxes and in the water rod is removed by the water removal rod or water removal plate, it is possible to realize a reactor in which the conversion of uranium 238 to plutonium is increased. Further, since the water to fuel volume ratio can be freely adjusted, there is no need to use burnable poison to lengthen the life of the fuel assembly, thereby to reduce a fuel cycle cost.

In this embodiment, as same as the first embodiment, when the weight of uranium contained in the unit volume is set to 2.8 kg/L, which is about 47% larger than 1.9 kg/L of ABWR, the boiling water reactor having the active fuel length having 1.94 m, which is about 1.8 m shorter than 3.7 m of ABWR. Further, when the distance between the channel boxes is made 22.5 mm, which is wider than 16 mm of ABWR, it is possible to suppress the increase of the reactivity increase at the cold condition.

Further, in this embodiment, as same as in embodiment 1, when the fuel rods having an outer diameter of 9.5 mm are arranged in the triangle lattice with a fuel rod distance of 1.8 mm, and when the number of fuel rods is increased to lower the average linear heat generation ratio to be 142 W/cm, which is about 17% smaller than 172 W/cm of ABWR. Thus, MCPR can be kept as 1.3 or more, thereby to attain the same the heat removal performance.

From the above reasons, it is possible to realize a boiling water reactor that contributes to great lowering of the height of the reactor and to reduction of construction of power plant.

Tenth Embodiment

Figure 19:
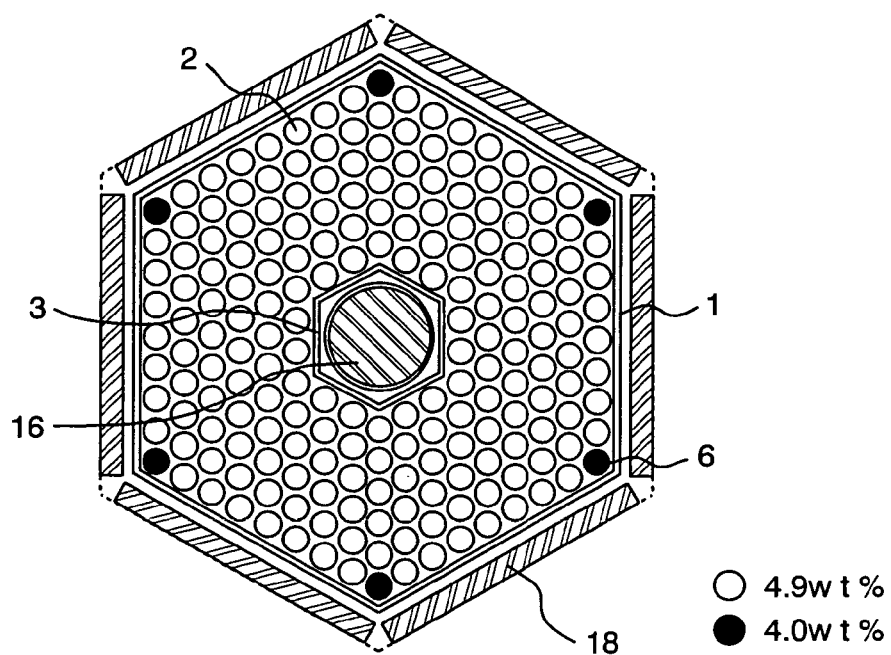
FIG. 19 is a lateral cross sectional view of a fuel assembly according to tenth embodiment.

The tenth embodiment will be explained with reference to FIG. 19. This embodiment is constituted based on the embodiment 1 to contribute toward extending the life of the fuel assemblies, thereby to reduce fuel cost.

This embodiment is concerned with a core of 1356 MWe, and the lateral cross sectional view is the same as embodiment 5 shown in FIG. 11.

FIG. 18 shows a cross sectional view of the fuel assembly lattice. The fuel assembly lattice is constituted by fuel rods 2, 6, a channel box 1 including a water rod 3 and a large diameter round control rod 16 and a water removal plate 18 disposed in the gaps between the channel boxes and outside of the channel box. The distance between the channel boxes is 22.5 mm.

The fuel rods 2 having an outer diameter of 9.5 mm are arranged in the channel box 1 in a triangle lattice with a distance of 1.8 mm between the fuel rods to constitute an equilateral hexagon fuel assembly with 9 rows of fuel rods. In the center of the fuel assembly, a water rod 3 into which a large diameter control rod 16 is inserted is disposed in an area of 3 rows of fuel rods, i.e. an area for 19 fuel rods.

The number of the fuel rods is 198. The large diameter control rod 16 is constituted by an absorber rod made of stainless tube filled with $B_4C$. At the tip of the large diameter control rod 16, there is disposed a detachable water removal rod, which is removable during the operation of the reactor. In the gap area between the channel boxes, a water removal plate 18 that is removable during operation of the reactor is disposed. The fuel rods 6 at the corners where power becomes large at the time of beginning of the cycle contain a fuel material whose enrichment concentration is 4.0 wt %, and other fuel rods 2 contain a fuel material whose enrichment concentration is 4.9 wt %.

The average uranium enrichment concentration in the lateral cross sectional area of the fuel assembly is 4.87 wt %. In this embodiment, the fuel material whose average uranium enrichment concentration in the lateral cross sectional area is 4.87 wt % is constantly arranged in the axial direction of the fuel assembly. The core outer radius is 2.9 m, when the above fuel assemblies are loaded on the core shown in FIG. 11, the active fuel length is 194 cm, and the power density is 83 kW/L.

The volume rate of two phase flow cooling water including sub-cooled water for cooling the fuel rods in the channel box is 27%, the volume rate of water in the water rod is 5%, the volume rate of water in the gaps between the channel boxes and in the water rod is 26%, the volume rate of the fuel material is 31%, and the ratio of the volume rate of two phase flow cooling water to the volume rate of the fuel material is 0.88 in the reactor core area. The weight of uranium contained in the unit volume of the core area is 2.8 kg/L.

The volume rate of the two phase flow cooling water including sub-cooled water for cooling the fuel rods in the channel box area is 36%, the volume rate of water in the water rod is 7%, the volume rate of the fuel material is 41%, and the ratio of the volume rate of two phase flow cooling water to the volume rate of the fuel material is 0.88 in the channel box area. The weight of uranium contained in the unit volume in the channel box area is 3.8 kg/L.

In this embodiment, as same as in embodiment 1, when the weight of uranium contained in the unit volume of the core area is 2.8 kg/L, which is about 47% larger than 1.9 kg/L of ABWR, a boiling water reactor is realized wherein the active fuel length becomes 1.94 m, which is about 1.8 m shorter than 3.7 m of ABWR. When the distance between the channel boxes is set to 22.5 mm, which is wider than 16 mm of ABWR, the reactivity increase at the cold condition is suppressed.

In this embodiment, as same as in embodiment 1, when fuel rods having an outer diameter of 9.5 mm are arranged in the triangle lattice with a gap between the fuel rods of 1.8 mm to increase the total number of fuel rods, thereby to lower the average linear heat generation ratio to 142 W/cm, which is about 17% lower than 172 W/cm of ABWR, it is possible to secure 1.3 or more of MCPR, which is same as that of ABWR.

From the above reasons, the height of the core can be lowered greatly to reduce the construction cost of the power plant, keeping the same thermal margin and safety as those of ABWR.

In this embodiment, as same as in embodiment 5, the water rod disposed in the fuel assembly is used as a guide tube for the large diameter control rod. When the diameter of the control rod is large, the mechanical strength of the control rod increases, and the bending or crush of the control rod can be suppressed at the time of insertion and withdrawal of the control rod.

Further, it is possible to make the production of control rods easy and reduce the production cost by reducing the number of the control rods per fuel assembly.

In this embodiment, as same as in embodiment 9, when water present in gaps between the channel boxes and in the water rod is removed by the water removal plate or water removal rod, a boiling water reactor which increases conversion of uranium 238 to plutonium is realized. Further, since the volume ratio of water to fuel material volume is freely controlled by insertion and withdrawal of the water removal rod, the burnable poison is not necessary, thereby to reduce the fuel cost.

Eleventh Embodiment

The eleventh embodiment according to the present invention will be explained with reference to FIG. 20. This embodiment, as same as embodiment 3, is the case where the lateral cross sectional area of the fuel assembly lattice is not equilateral hexagonal. The electric power is 1356 MWe, and the core is constituted by, as same as embodiment 1, 720 of fuel assemblies and 223 of Y-type control rods at a rate one for 3 fuel assemblies.

Figure 20:
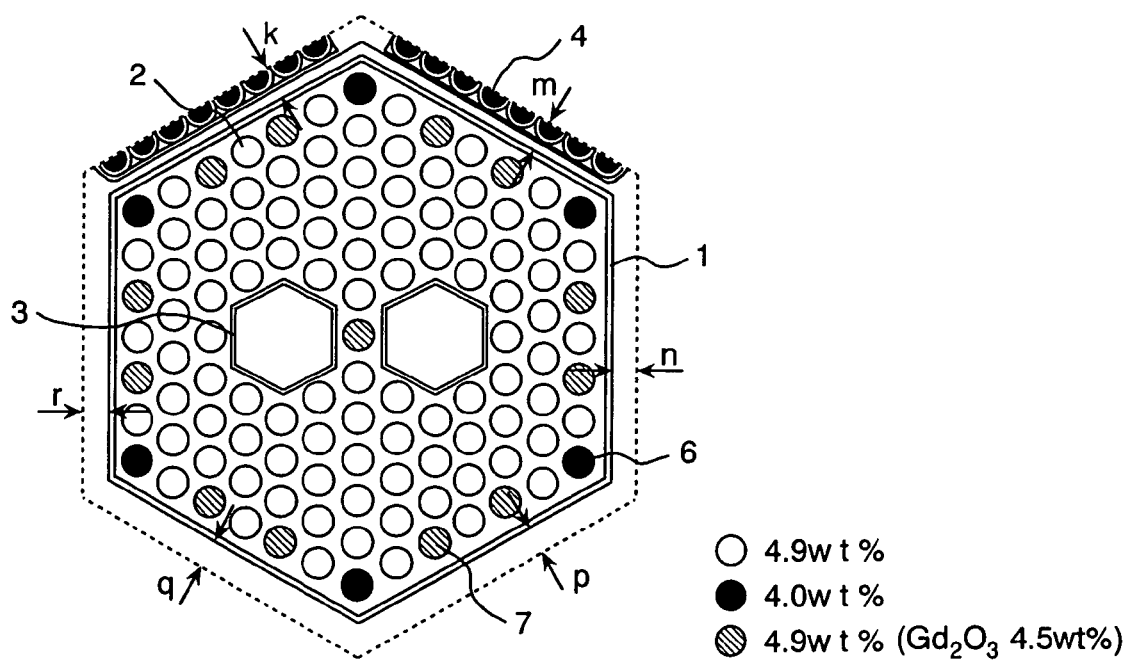
FIG. 20 is a lateral cross sectional view of a fuel assembly according to eleventh embodiment.

FIG. 20 shows a cross sectional view of the fuel assembly. The fuel assembly is constituted by fuel rods 2, 6, 7, an equilateral hexagon channel box 1 including water rods 3, and Y-type control rods 4. The fuel assembly lattice shown in FIG. 20 has a longitude hexagon shape wherein the gaps k, m into which the Y-type control rods are inserted and the gaps p, q on the opposite side are longer than the remaining two gaps n, r, when the distances between 6 sides of the channel box and the fuel assembly lattice are defined as k, m, n, p, q, and r.

The center of the channel box 1 and the center of the fuel assembly are the same. The gaps k, m, p and q are equal, and gaps n and r are equal. The distance between the channel boxes at the two sides where the Y-type control rods are inserted are 20.8 mm, which is twice that of k, and the distances of the remaining 4 sides are 18.3 mm (k+n), and the average distance between the channel boxes is 19.1 mm. The fuel rods 2 having an outer diameter of 11.2 mm are arranged in the channel box 1 in the triangle lattice with a gap of 3.7 mm between the fuel rods to constitute an equilateral hexagon fuel assembly with 7 rows of fuel rods.

In the center of the fuel assembly, two water rods 3 are disposed for the areas of 2 rows of fuel rods, i.e. 7 fuel rod lattice cells. The number of the fuel rods in the channel box is 113. The wings of the Y-type control rods 4 are provided with absorber rods made of stainless tubes filled with $B_4C$. The angle between the wings is 120 degrees. A fuel material of 4.0 wt % of the uranium enrichment concentration is arranged for the fuel rods 6 at corners where fuel power is large at the beginning of the cycle.

Further, a fuel material of 4.9 wt % of the uranium enrichment concentration to which 4.5 wt % of a burnable poison is added is arranged for the fuel rods 7 that adjoin the channel boxes and the water rods where the power at the beginning of the cycle tends to become large, thereby to suppress the local power peaking at the beginning of the cycle. The average uranium enrichment concentration of the fuel assembly cross sectional area is 4.85 wt %. In this embodiment, the fuel material having 4.85 wt % of the average uranium enrichment concentration is arranged constantly in the axial direction of the fuel assembly.

When the fuel assemblies are loaded on the core shown in FIG. 8, the core outer radius is 2.9 m, the active fuel length is 266 cm, and the power density is 61 kw/L. The volume rate of the two phase flow cooling water including sub-cooled water for cooling the fuel rods in the channel box is 38%, the volume rate of water in the water rods is 5%, the volume rate of water in gaps between the channel boxes and in the water rods is 24%, the volume rate of the fuel material is 24%, and the ratio of the volume rate of the two phase flow cooling water to the volume rate of the fuel material is 1.61 in the reactor core area. The weight of uranium contained in the unit volume of the core area is 2.2 kg/L.

The ration of the outer width of the channel box to the average width of the fuel assembly lattice is 0.90, the average width being obtained by averaging 3 lattices of the longitude hexagonal fuel assemblies. The volume rate of the two phase flow cooling water including sub-cooled water for cooling the fuel rod in the channel box area is 50%, the volume rate of water in the water rods is 7%, the volume rate of the fuel material is 31%, and the ratio of the volume rate of the two phase flow cooling water to the volume rate of the fuel material is 1.61 in the channel box area. The weight of uranium contained in the unit volume in the channel box area is 2.9 kg/L.

In this embodiment, when the weight of uranium contained in the unit volume in the core area is increase to 2.2 kg/L, which is about 16% larger than 1.9 kg/L of ABWR, a boiling water reactor having 2.66 m of an active fuel length, which is about 1.0 m shorter than 3.7 m of ABWR is realized. When the distance between the channel boxes is 19.1 mm, which is wider than 16 mm of ABWR, the reactivity increase at the cold condition is suppressed and a boiling water reactor having the small absolute value of a void coefficient is realized.

In this embodiment, when the active fuel length is made short such as 2.66 m, which is shorter than 3.7 m of ABWR, the core flow amount is increased to attain MCPR of 1.3 or more, thereby to secure the same heat removal performance as ABWR.

From the above reasons, it is possible to realize the boiling water reactor that contributes to great reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

Twelfth Embodiment

The twelfth embodiment according to the present invention is explained with reference to FIG. 21. The present embodiment is concerned with a large scaled fuel assembly and core having a further lower height than the embodiment 1.

This embodiment is concerned with a core of a power of 1356 MWe, which comprises 720 of fuel assemblies and 223 of Y-type control rods at a rate of one for 3 fuel assemblies.

Figure 21:
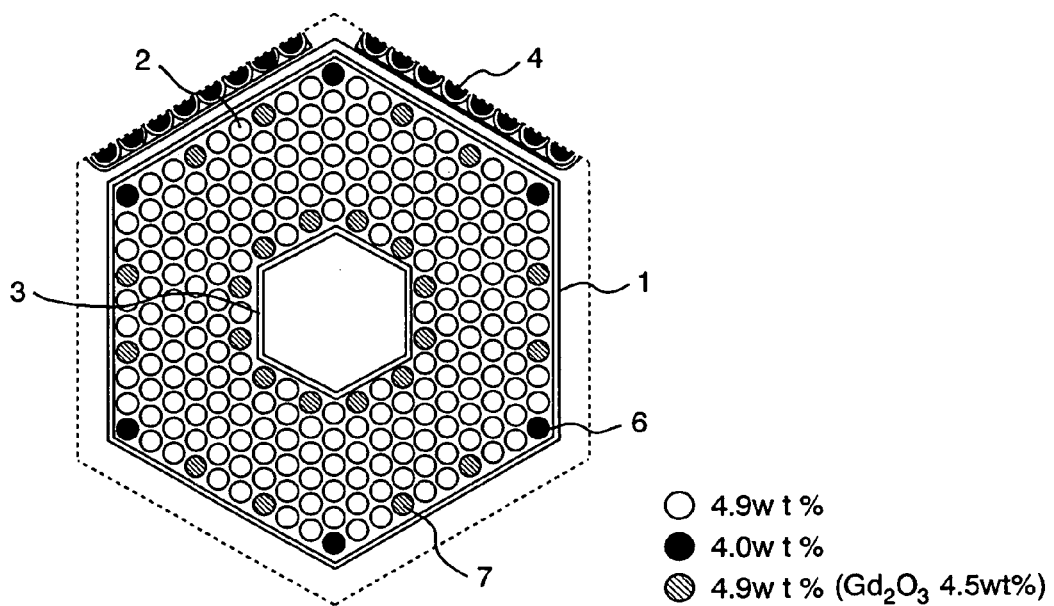
FIG. 21 is a lateral cross sectional view of a fuel assembly according to twelfth embodiment.

FIG. 21 shows a cross sectional view of the fuel assembly lattice. The fuel assembly lattice comprises fuel rods 2, 6, 7, a channel box 1 including a water rod 33, and Y-type control rods 4 arranged in gaps between the channel boxes and outside of the channel box. The distance between the channel boxes is 27.4 mm. Fuel rods 2 having an outer diameter of 10.0 mm are arranged in the channel box 1 in the triangle lattice with a gap between the fuel rods of 1.8 mm, thereby to constitute an equilateral hexagon fuel assembly lattice with 10 rows of fuel rods. In the center of the fuel assembly, there is disposed a water rod 3 for 4 rows of fuel rods, i.e. 37 of fuel rod unit lattice cells. The number of fuel rods in the channel box area is 234.

The wings of the Y-type control rods 4 are provided with absorber rods of stainless tubes filled with $B_4C$. The angle between the wings is 120 degrees. A fuel material containing 4.0 wt % of uranium enrichment concentration for the fuel rods 6 at the corners where the power of the fuel rods becomes large at the time of beginning of the cycle is arranged, and for the other fuel rods 2, a fuel material containing 4.9 wt % of uranium enrichment concentration is arranged.

Further, a fuel material of 4.9 wt % of the uranium enrichment concentration to which 4.5 wt % of a burnable poison is added is arranged for the fuel rods 7 that adjoin the channel boxes and the water rods where the power at the beginning of the cycle tends to become large, thereby to suppress the local power peaking at the beginning of the cycle.

The average uranium enrichment concentration on the lateral cross sectional area is 4.88 wt %. In this embodiment, the fuel material of 4.88 wt % of the uranium enrichment concentration of the fuel assembly cross sectional area is constantly arranged in the axial direction of the fuel assembly.

The core outer radius is 3.4 m, when the fuel assemblies are loaded on the core, the active fuel length is 150 cm, and the power density of 79 kW/L. The volume rate of the two phase flow cooling water including sub-cooled water for cooling the fuel rods in the channel boxes is 25%, the volume rate of water in the water rod is 8%, the volume rate of water in gaps between the channel boxes and in the water rod is 30%, the volume rate of the fuel material is 29%, and the ratio of the volume rate of two phase flow cooling water to the volume rate of the fuel material is 0.84 in the reactor core area.

The weight of uranium contained in the core area is 2.7 kg/L. The outer width of the channel box to the lattice width of the fuel assembly is 0.88. The volume rate of the two phase flow cooling water including sub-cooled water for cooling the fuel rods in the channel box area is 33 W. The volume rate of water in the water rod is 11%. The volume rate of the fuel material is 40%. The ratio of the volume rate of two phase flow cooling water to the volume rate of the fuel material is 0.84 in the channel box area. The weight of uranium contained in the unit volume in the channel box area is 3.7 kg/L.

In this embodiment, the fuel rods having the outer diameter of 10.0 mm are arranged in the tight triangle lattice with the 1.8 mm gap between the fuel rods to increase the total number of fuel rods so that the weight of uranium in the unit volume of the core area is 2.7 kg/L, which is about 42% larger than 1.9 kg/L of ABWR, and the fuel assembly lattice is enlarged so that the outer diameter of the core is 3.4 m and the active fuel length is 1.5 m, which is about 2.0 m shorter than 3.7 m of ABWR, thereby to realize a boiling water reactor whose reactor building height can be lowered by two floors.

In this embodiment, when the distance between the channel boxes is 27.4 mm, which is larger than 16 mm of ABWR, the reactivity increase at the cold condition can be suppressed and the reactor shutdown margin can be 1.0% Δk or more.

From the above reasons, it is possible to realize a boiling water reactor of 1356 MWe power by lowering the reactivity increase at the cold condition and the absolute value of the void coefficient. Further, in this embodiment, the fuel rods having the outer diameter of 10.0 mm are arranged in the triangle lattice to increase the total number of fuel rods so that the average linear heat generation ratio becomes 155 W/cm, which is about 10% lower than 172 W/cm of ABWR and MCPR is kept to 1.3 or more, which is the same as that of ABWR.

From the above reasons, it is possible to realize the boiling water reactor that contributes to great reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

Thirteenth Embodiment

The thirteenth embodiment according to the present invention will be explained in the following. This embodiment enlarges the fuel assembly and core to further lower the height of the core than that of embodiment 1.

This embodiment is concerned with a core of 1356 MWe, as same as embodiment 1 shown n FIG. 6, comprising 720 of fuel assemblies, and 223 of Y-type control rods at a rate of one for every 3 fuel assemblies. Although the channel boxes, fuel rods, water rod, arrangement of Y-type control rods, and structure are the same as in embodiment 1, the outer diameter of the fuel rods is 12.3 mm, and the distance between the fuel rods is 1.3 mm. When the fuel assemblies are loaded on the core, the core outer radius is 3.8 m, the active fuel length is 110 cm, and the power density is 85 kW/L.

The volume rate of the two phase flow cooling water including sub-cooled water for cooling the fuel rods in the channel boxes is 19%, the volume rate of water in the water rod is 8%, the volume rate of water in gaps between the channel boxes and in the water rod is 29%, the volume rate of the fuel material is 35%, and the ratio of the volume rate of two phase flow cooling water to the volume rate of the fuel material is 0.55 in the reactor core area.

The weight of uranium contained in the core area is 3.2 kg/L. The outer width of the outer width of the channel box to the lattice width of the fuel assembly is 0.89. The volume rate of the two-phase flow cooling water including sub-cooled water for cooling the fuel rods in the channel box area is 25%. The volume rate of water in the water rod is 11%. The volume rate of the fuel material is 46%. The ratio of the volume rate of two-phase flow cooling water to the volume rate of the fuel material is 0.55 in the channel box area. The weight of uranium contained in the unit volume in the channel box area is 4.2 kg/L.

The arrangement of the fuel material in the fuel assemblies is the same as in embodiment 12, and the fuel material having an average uranium enrichment concentration of 4.88 wt % is distributed constantly in the axial direction of the fuel assemblies.

In this embodiment, the fuel rods having the outer diameter of 12.3 mm are arranged in the tight triangle lattice with the 1.3 mm gap between the fuel rods to increase the total number of fuel rods so that the weight of uranium in the unit volume of the core area is 3.2 kg/L, which is about 68% larger than 1.9 kg/L of ABWR, and the fuel assembly lattice is enlarged so that the outer diameter of the core is 3.8 m and the active fuel length is 1.1 m, which is about 2.6 m shorter than 3.7 m of ABWR, thereby to realize a boiling water reactor whose reactor building height can be lowered by three floors.

In this embodiment, when the distance between the channel boxes is 27.4 mm, which is larger than 16 mm of ABWR, the reactivity increase at the cold condition can be suppressed and the reactor shutdown margin can be 1.0% Δk or more.

From the above reasons, it is possible to realize a boiling water reactor of 1356 MWe power by lowering the reactivity increase at the cold condition and the absolute value of the void coefficient. Further, in this embodiment, when the active fuel length is made short such as 1.1 m, which is shorter than 3.7 m of ABWR, the core flow amount is increased to attain MCPR of 1.3 or more, thereby to secure the same heat removal performance as ABWR.

From the above reasons, it is possible to realize the boiling water reactor that contributes to great reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

Fourteenth Embodiment

The fourteenth embodiment according to the present invention will be explained in the following. This embodiment enlarges the fuel assembly and core to further lower the height of the core than that of embodiment 1.

This embodiment is concerned with a core of a power of 1356 MWe, which comprises 720 of fuel assemblies and 223 of Y-type control rods at a rate of one for 3 fuel assemblies.

Although the channel boxes, fuel rods, water rod, arrangement of Y-type control rods, and structure are the same as in embodiment 12, shown in FIG. 21, the distance between the channel boxes is 32.0 mm, the outer diameter of the fuel rods is 9.3 mm, and the distance between the fuel rods is 1.3 mm. When the fuel assemblies are loaded on the core, the core outer radius is 3.2 m, the active fuel length is 100 cm, and the power density is 137 kW/L.

The volume rate of the two phase flow cooling water including sub-cooled water for cooling the fuel rods in the channel boxes is 20%, the volume rate of water in the water rod is 8%, the volume rate of water in gaps between the channel boxes and in the water rod is 35%, the volume rate of the fuel material is 29%, and the ratio of the volume rate of two phase flow cooling water to the volume rate of the fuel material is 0.68 in the reactor core area. The weight of uranium contained in the core area is 2.7 kg/L. The outer width of the outer width of the channel box to the lattice width of the fuel assembly is 0.85. The volume rate of the two-phase flow cooling water including sub-cooled water for cooling the fuel rods in the channel box area is 29%.

The volume rate of water in the water rod is 11%. The volume rate of the fuel material is 43%. The ratio of the volume rate of two-phase flow cooling water to the volume rate of the fuel material is 0.68 in the channel box area. The weight of uranium contained in the unit volume in the channel box area is 4.0 kg/L. The arrangement of the fuel material in the fuel assemblies is the same as in embodiment 12, and the fuel material having an average uranium enrichment concentration of 4.88 wt % is distributed constantly in the axial direction of the fuel assemblies.

In this embodiment, the fuel rods having the outer diameter of 9.3 mm are arranged in the tight triangle lattice with the 1.3 mm gap between the fuel rods to increase the total number of fuel rods so that the weight of uranium in the unit volume of the core area is 2.7 kg/L, which is about 42% larger than 1.9 kg/L of ABWR, and the fuel assembly lattice is enlarged so that the core outer radius is 3.2 m and the active fuel length is 1.0 m, which is shorter than 3.7 m of ABWR, thereby to realize a boiling water reactor whose reactor building height can be lowered by three floors.

In this embodiment, when the active fuel length is made short such as 1.0 m, which is shorter than 3.7 m of ABWR, the core flow amount is increased to attain MCPR of 1.3 or more, thereby to secure the same heat removal performance as ABWR.

From the above reasons, it is possible to realize the boiling water reactor that contributes to great reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

Fifteenth Embodiment

The fifteenth embodiment according to the present invention will be explained with reference to FIG. 22. This embodiment makes the active fuel length longer than the embodiment 1 to realize the increased plant utilization rate.

The lateral cross sectional area of this embodiment is the same as FIG. 6 of embodiment 1. FIG. 22 shows a cross sectional view of the fuel assembly lattice. The fuel assembly lattice comprises fuel rods 2, 6, 7, a channel box 1 including a water rod 33, and Y-type control rods 4 arranged in gaps between the channel boxes and outside of the channel box.

The distance between the channel boxes is 27.4 mm. Fuel rods 2 having an outer diameter of 10.2 mm are arranged in the channel box 1 in the triangle lattice with a gap between the fuel rods of 2.2 mm, thereby to constitute an equilateral hexagon fuel assembly lattice with 8 rows of fuel rods. In the center of the fuel assembly, there is disposed a water rod 3 for 3 rows of fuel rods, i.e. 19 of fuel rod unit lattice cells.

The number of fuel rods in the channel box area is 150. The wings of the Y-type control rods 4 are provided with absorber rods of stainless tubes filled with $B_4C$. The angle between the wings is 120 degrees. A fuel material containing 4.0 wt % of uranium enrichment concentration for the fuel rods 6 at the corners where the power of the fuel rods becomes large at the time of beginning of cycle is arranged, and for the other fuel rods 2, a fuel material containing 4.9 wt % of uranium enrichment concentration is arranged.

Further, a fuel material of 4.9 wt % of the uranium enrichment concentration to which 4.5 wt % of a burnable poison is added is arranged for the fuel rods 7 that adjoin the channel boxes and the water rods where the power at the beginning of the cycle tends to become large, thereby to suppress the local power peaking at the beginning of the cycle. The average uranium enrichment concentration of the fuel assembly cross sectional area is 4.86 wt %. In this embodiment, the fuel material having 4.86 wt % of the average uranium enrichment concentration is arranged constantly in the axial direction of the fuel assembly.

The core outer radius is 2.9 m, when the fuel assemblies are loaded on the core, the active fuel length is 223 cm, and the power density of 72 kW/L.

The volume rate of the two phase flow cooling water including sub-cooled water for cooling the fuel rods in the channel boxes is 27%, the volume rate of water in the water rod is 6%, the volume rate of water in gaps between the channel boxes and in the water rod is 32%, the volume rate of the fuel material is 27%, and the ratio of the volume rate of two phase flow cooling water to the volume rate of the fuel material is 1.01 in the reactor core area. The weight of uranium contained in the core area is 2.5 kg/L.

The outer width of the channel box to the lattice width of the fuel assembly is 0.86. The volume rate of the two phase flow cooling water including sub-cooled water for cooling the fuel rods in the channel box area is 39, the volume rate of water in the water rod is 8%, the volume rate of the fuel material is 38%, and the ratio of the volume rate of two phase flow cooling water to the volume rate of the fuel material is 1.01 in the channel box area. The weight of uranium contained in the unit volume in the channel box area is 3.5 kg/L.

In this embodiment, the fuel rods having the outer diameter of 10.2 mm are arranged in the tight triangle lattice with the 2.2 mm gap between the fuel rods to increase the total number of fuel rods so that the weight of uranium in the unit volume of the core area is 2.5 g/L, which is about 32% larger than 1.9 kg/L of ABWR, and it is possible to realize a boiling water reactor having the active fuel length is 2.23 m, which is about 1.5 m shorter than 3.7 m of ABWR.

In this embodiment, when the distance between the channel boxes is 27.4 mm, which is larger than 16 mm of ABWR, the reactivity increase at the cold condition can be suppressed and the reactor shutdown margin can be made 1.0% Δk or more. A boiling water reactor having a smaller void coefficient than that of ABWR can be realized.

Further, in this embodiment, the fuel rods having the outer diameter of 10.2 mm are arranged in the triangle lattice to increase the total number of fuel rods so that the average linear heat generation ratio becomes 163 W/cm, which is about 5% lower than 172 W/cm of ABWR and MCPR is kept to 1.3 or more, which is the same as that of ABWR.

From the above reasons, it is possible to realize the boiling water reactor that contributes to great reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

In this embodiment, when the height of the core is made higher than that of embodiment 1, the higher burnup than embodiment 1 can be possible so that the utilization rate of the plant will increase. Accordingly, the boiling water reactor has the increased plant utility rate, thereby to reduce the electric generation cost, keeping the same thermal margin and safety as those of ABWR.

Sixteenth Embodiment

The sixteenth embodiment according to the present invention will be explained in the following. In this embodiment, the active fuel length is further elongated to realize the increase of the plant utility rate by high burnup.

Figure 22:
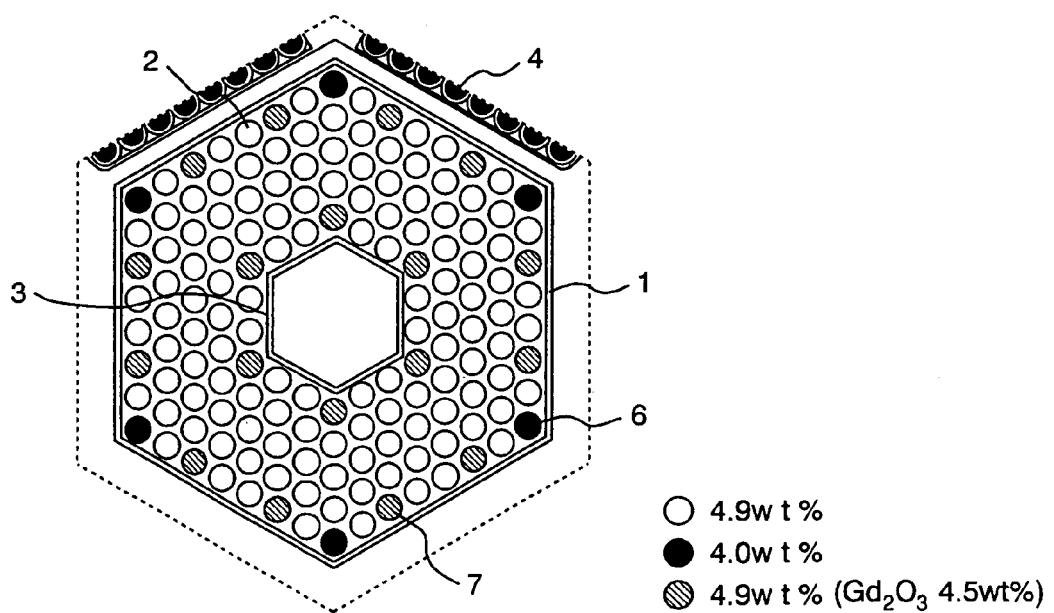
FIG. 22 is a lateral cross sectional view of a fuel assembly according to fifteenth embodiment.

This embodiment is concerned with a core of 1356 MWe, wherein the core lateral cross sectional view is the same as embodiment 1 shown in FIG. 6, and the fuel assembly is the same as embodiment 15 shown in FIG. 22.

In this embodiment, the fuel rods having the outer diameter of 10.2 mm are arranged in the tight triangle lattice with the 2.2 mm gap between the fuel rods to increase the total number of fuel rods so that the weight of uranium in the unit volume of the core area is 2.5 kg/L, which is about 32% larger than 1.9 kg/L of ABWR, and the active fuel length is 2.85 m, which is about 0.9 m shorter than 3.7 m of ABWR, thereby to realize a boiling water reactor.

In this embodiment, when the distance between the channel boxes is 27.4 mm, which is larger than 16 mm of ABWR, the reactivity increase at the cold condition can be suppressed and the reactor shutdown margin can be made 1.0% Δk or more. A boiling water reactor having a smaller void coefficient than that of ABWR can be realized. Further, in this embodiment, the fuel rods having the outer diameter of 10.2 mm are arranged in the triangle lattice with the fuel rod distance of 2.2 mm to increase the total number of fuel rods so that the average inear heat generation ratio becomes 128 W/cm, which is about 26% lower than 172 W/cm of ABWR and MCPR is kept to 1.3 or more, which is the same as that of ABWR.

From the above reasons, it is possible to realize the boiling water reactor that contributes to reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

In this embodiment, the higher burnup than the embodiment 15 is possible, and the plant utility rate can be increased, by increasing the height of the core, which is higher than that of the embodiment 15. Accordingly, in this embodiment, when the continuous operation time is elongated, the plant utility rate is increased and the electric generation cost can be lowered, keeping the same thermal margin and safety as those of ABWR.

Seventeenth Embodiment

The seventeenth embodiment according to the present invention will be described with reference to FIGS. 23, 24. Although the present embodiment is concerned with the ABWR core, the same advantages will be expected when the present invention is applied the core before ABWR.

Figure 23:
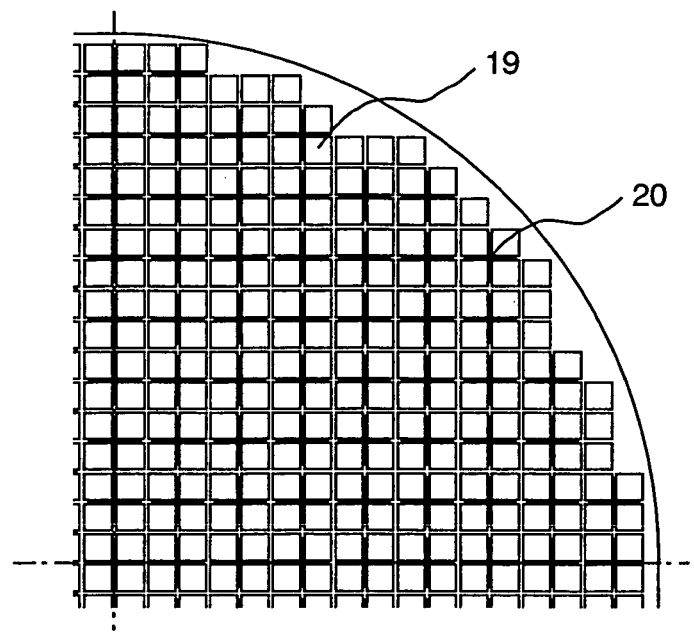
FIG. 23 is a lateral cross sectional view of a ¼ core according to seventeenth embodiment.
Figure 24:
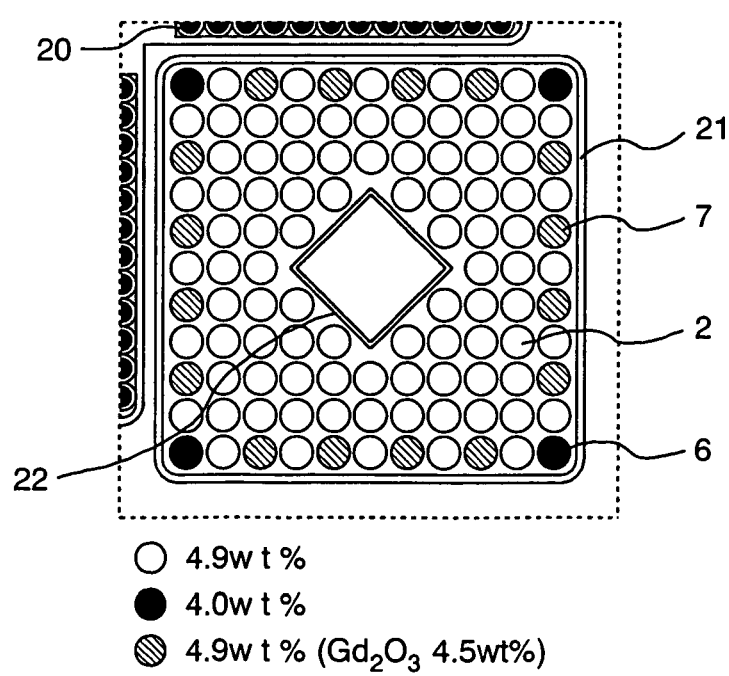
FIG. 24 is a lateral cross sectional view of a fuel assembly to be loaded on the core shown in FIG. 23.

FIG. 23 shows the lateral cross sectional view of a quarter of the 1356 MWe electric power core. There are shown 872 fuel assemblies 19, and 205 cross-shaped control rods 20 at a rate of one control rod for 4 fuel assemblies. FIG. 24 shows a cross sectional view of the fuel assembly. The fuel assembly is constituted by the fuel rods 2, 6, 7, the channel box 21 including the fuel assembly and the water rod 22, and the cross-shaped control rod 20 disposed in the gaps between the channel boxes and outside of the channel boxes. The distance between the channel boxes is 21.8 mm.

The fuel rods 2 having the outer diameter of 10.2 mm are arranged in the square lattice with a fuel rod pitch of 11.5 mm to constitute the square fuel assembly with the 11 rows. In the center of the fuel assembly, the water rod 22 is formed in an area for 13 fuel rod unit cells. The number of the fuel rods in the channel box is 108.

The wings of the cross-shaped control rod 20 are provided with absorber rods of stainless tubes filled with B4C. The fuel rods 6 at the corner of the fuel assembly where the local power becomes large at the beginning of the cycle contain a fuel material of 4.0% of uranium enrichment concentration, and other fuel rods contain a fuel material of 4.9% of uranium enrichment concentration. The local power peaking at the beginning of the cycle is suppressed by arranging a fuel material for the fuel rods 6, which adjoin the channel boxes and the water rod, the fuel rods containing 4.9 wt % of uranium enrichment concentration to which 4.5 wt % of burnable poison is added.

The average uranium enrichment concentration in the lateral cross sectional area of the fuel assembly is 4.87%. In this example, the fuel material of 4.87 wt % of the average uranium enrichment concentration in the lateral cross sectional area of the fuel assembly is constantly arranged in the axial direction. When the fuel assemblies are loaded on the core shown in FIG. 23, the core outer radius is 2.7 m, the active fuel length is 371 cm, which is the same as ABWR. The power density is 51 kW/L.

The volume rate of the two phase flow cooling water including sub-cooled water for cooling the fuel rods in the channel boxes is 26%, the volume rate of water in the water rod is 5%, the volume rate of water in the gaps between the channel boxes and in the water rod is 31%, the volume rate of the fuel material is 27%, and the ratio of the volume rate of two phase flow cooling water to the volume rate of the fuel material is 0.95 in the reactor core area. The weight of uranium contained in the unit volume of the core area is 2.5 kg/L. The ratio of the outer width of the channel box to the fuel assembly lattice width is 0.86.

The volume rate of water including sub-cooled water for cooling the fuel rods in the area of the channel box is 38%, the volume rate of water in the water rod is 7%, the volume rate of the fuel material is 40%, and the ratio of the volume rate of two phase flow water to the volume rate of the fuel material is 0.95 in the channel box area. The uranium weight in the unit volume in the area of the channel box is 3.7 kg/L.

In this embodiment, by arranging the fuel rods having the outer diameter of 10.2 mm in the square lattice with a fuel rod pitch of 11.5 mm for the fuel assembly lattice of ABWR, it is possible to realize a boiling water reactor having 2.5 kg/L of a uranium weight for the average of the core, contained in the unit volume, which is 32% larger than about 1.9 of ABWR.

From the above reasons, in this embodiment, the boiling water reactor of the power of 1356 MWe whose core outer radius and the active fuel length are the same as ABWR has a continuous operation of 27 months at the discharge burnup of 55 GWd/t. In this embodiment, when the channel box distance is set to 21.8 mm, which is wider than 16 mm of ABWR, it is possible to suppress the reactivity increase at the cold condition and to secure the reactor shutdown margin of 1.0% Δk or more, keeping the small absolute value of void coefficient.

From the above reasons, it is possible to keep the same thermal margin as that of ABWR in the boiling water reactor having the same power of 1356 MWe, the core outer radius and the active fuel length. Accordingly, keeping the same thermal margin and safety as those of ABWR, the reactor can contribute to reduction of electric generation cost by increasing the continuous operation time of the plant.

Further, it is possible to improve the reactor shutdown performance and transient and stability performance that are subject for the high burnup, by lowering the reactivity increase at the cold condition and the absolute value of the void coefficient.

Eighteenth Embodiment

The eighteenth embodiment according to the present invention will be explained in the following. This embodiment is a further modification of embodiment 17. The application of this embodiment to BWR cores of the type before ABWR will bring about the same advantages.

The power of the core of this embodiment is 1356 MWe, and the lateral cross sectional area is the same as embodiment 17 shown in FIG. 23. The channel boxes in the fuel assemblies, fuel rods, water rod, arrangement of the cross-shaped control rods, and contour are the same as those in embodiment shown in FIG. 24, but the outer diameter of the fuel rods in this embodiment is 9.4 mm. The arrangement of fuel material in the fuel assemblies is the same as in embodiment 17. The uranium enrichment concentration in the average cross sectional area of the fuel assembly is 4.87 wt %.

In this embodiment, a fuel material having 4.87 wt % of the average cross sectional area of the fuel assembly is distributed constantly in the axial direction of the fuel assembly. When the fuel assemblies are loaded on the core shown in FIG. 23, the core outer radius is 2.7 m, the active fuel length is 371 cm, which is the same as in ABWR. The power density is 51 kW/L.

The volume rate of the two phase flow cooling water including sub-cooled water for cooling the fuel rods in the channel box is 32%, the volume rate of water in the water rod is 5%, the volume rate of water in gaps between the channel boxes and in the water rod is 31%, the volume rate of fuel material is 23%, and the ratio of the volume rate of the two phase flow cooling water to the volume rate of the fuel material is 1.41 in the reactor core area.

The weight of uranium contained in the unit volume in the core area is 2.1 kg/L. The ratio of the outer width of the channel box to the fuel assembly lattice width is 0.86. The volume rate of the two phase flow cooling water including sub-cooled water for cooling the fuel rods is 47%, the volume rate of water in the water rod is 7%, the volume rate of fuel material is 33%, and the ratio of the volume rate of the two phase flow cooling water to the volume rate of the fuel material is 1.41 in the channel box area. The weight of uranium contained in the unit volume in the channel box area is 3.1 kg/L.

In this embodiment, when the fuel rods having 9.4 mm of the outer diameter are arranged in a square lattice with 11.5 mm of fuel rod pitch, a boiling water reactor is realized, wherein an core average uranium weight contained in a unit volume is 2.1 kg/L, which is increase by about 11% of 1.9 kg/L of ABWR.

From the above reasons, in the boiling water reactor having a power of 1356 MWe and the active fuel length, which are the same as in ABWR, the continuous operation period cab be about two years at the discharge burnup of 55 GWd/t.

In this embodiment, when the distance between the channel boxes is 21.8 mm, which is wider than 16 mm of ABWR, it is possible to suppress the increase in the reactivity increase at the cold condition to obtain the reactor shutdown of 1.0% Δk or more, and the reactor has a smaller void coefficient than ABWR.

In this embodiment, when the fuel rods having an outer diameter of 9.4 mm are arranged in a square lattice with a fuel rod pitch of 11.5 mm to increase the total number of fuel rods, the average linear heat generation ratio becomes 112 W/cm, which is about 35% smaller than 172 W/cm of ABWR, and MCPR becomes 1.3 or more, thereby to secure the same thermal removal performance as that of ABWR.

From the above reasons, the boiling water reactor having the power of 1356 MWe, the core outer radius and active fuel length, which are the same as in ABWR, will have the same thermal margin as that of ABWR. Accordingly, the reactor core of this embodiment contributes to increase in the plant utility rate and reduction of electric generation cost by increasing the period of continuous operation of the plant, keeping the same thermal margin and safety as those in ABWR.

Further, it is possible to improve the rector shutdown performance and transient and stability that are the subject at the time of high burnup, by lowering the reactivity increase at the cold condition and the absolute value of void coefficient.

Nineteenth Embodiment

The nineteenth embodiment according to the present invention will be explained in the following. This embodiment is a further modification of embodiment 17. This embodiment will be applied to the conventional BWRs before ABWR to achieve the same advantages.

This embodiment is concerned with a core of the power of 1356 MWe, the lateral cross sectional area of which is same as in the embodiment 17 shown in FIG. 23. The channel boxes in the fuel assemblies, fuel rods, water rod, arrangement of the cross-shaped control rods, and contours are the same as those in embodiment 17, but the outer diameter of the fuel rods in this embodiment is 9.5 mm. The arrangement of fuel material in the fuel assemblies is the same as in embodiment 17.

The uranium enrichment concentration in the average cross sectional area of the fuel assembly is 4.87 wt %. In this embodiment, a fuel material having 4.87 wt % of the average cross sectional area of the fuel assembly is distributed constantly in the axial direction of the fuel assembly. When the fuel assemblies are loaded on the core shown in FIG. 23, the core outer radius is 2.7 m, the active fuel length is 371 cm, which is the same as in ABWR. The power density is 51 kW/L. The volume rate of the two phase flow cooling water including sub-cooled water for cooling the fuel rods in the channel box is 31%, the volume rate of water in the water rod is 5%, the volume rate of water in gaps between the channel boxes and in the water rod is 31%, the volume rate of fuel material is 23%, and the ratio of the volume rate of the two phase flow cooling water to the volume rate of the fuel material is 1.36 in the reactor core area.

The weight of uranium contained in the unit volume in the core area is 2.14 kg/L. The ratio of the outer width of the channel box to the fuel assembly lattice width is 0.86. The volume rate of the two phase flow cooling water including sub-cooled water for cooling the fuel rods is 46%, the volume rate of water in the water rod is 7%, the volume rate of fuel material is 34%, and the ratio of the volume rate of the two phase flow cooling water to the volume rate of the fuel material is 1.36 in the channel box area. The weight of uranium contained in the unit volume in the channel box area is 3.14 kg/L.

In this embodiment, the fuel rods having the outer diameter of 9.5 mm are arranged in the square lattice with the 11.5 mm fuel rod pitch so that the weight of uranium in the unit volume of the core area is 2.14 kg/L, which is about 13% larger than 1.9 kg/L of ABWR.

From the above reasons, in the boiling water reactor having a power of 1356 MWe and the active fuel length, which are the same as in ABWR, the continuous operation period cab be about two years at the discharge burnup of 55 GWd/t.

In this embodiment, when the distance between the channel boxes is 21.8 mm, which is larger than 16 mm of ABWR, the reactivity increase at the cold condition can be suppressed and the reactor shutdown margin can be made 1.0% Δk or more. A boiling water reactor having a smaller absolute value of void coefficient than that of ABWR can be realized.

Further, in this embodiment, the fuel rods having the outer diameter of 9.5 mm are arranged in the square lattice with a fuel rod pitch of 11.5 mm to increase the total number of fuel rods so that the average linear heat generation ratio becomes 112 W/cm, which is about 35% lower than 172 W/cm of ABWR and MCPR is kept to 1.3 or more, which is the same as that of ABWR.

From the above reasons, it is possible to keep the same thermal margin as that of ABWR in the boiling water reactor whose power is 1356 MWe and the same core outer. Accordingly, keeping the same thermal margin and safety as those of ABWR, the reactor can contribute to reduction of electric generation cost by increasing the continuous operation time of the plant.

Further, it is possible to improve the reactor shutdown performance and transient and stability performance that are subject for the high burnup, by lowering the reactivity increase at the cold condition and the absolute value of the void coefficient.

Twentieth Embodiment

Figure 25:
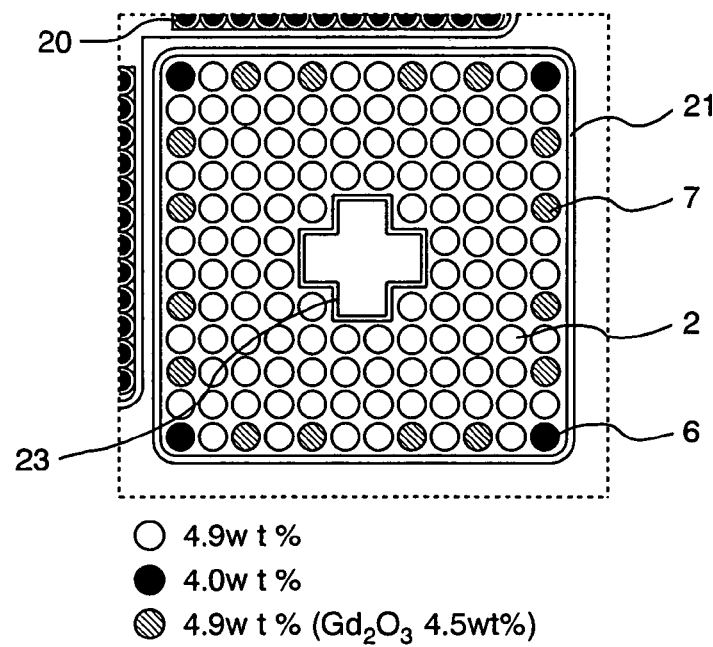
FIG. 25 is a lateral cross sectional view of a fuel assembly according to twentieth embodiment.

The twentieth embodiment according to the present invention will be explained in the following with reference to FIG. 25. This embodiment reduced the average linear heat generation ratio, based upon the embodiment 17.

Figure 17:
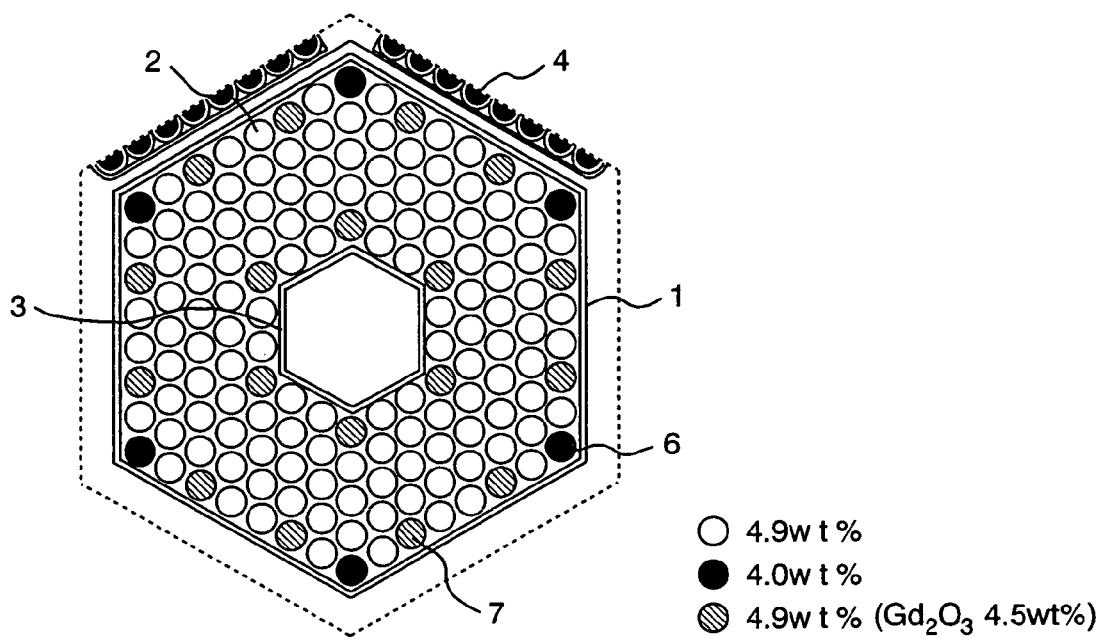
FIG. 17 is a lateral cross sectional view of a fuel assembly according to eighth embodiment.

The core of this embodiment has an electric power of 1356 MWe, the lateral cross sectional area of which is the same as that of embodiment 17 shown in FIG. 17. FIG. 25 shows a cross sectional view of the fuel assembly lattice. The fuel assembly is constituted by the fuel rods 2, 6, 7, the channel box 21 including the fuel assembly and the water rod 23, and the cross-shaped control rod 20 disposed in the gaps between the channel boxes and outside of the channel boxes. The distance between the channel boxes is 21.8 mm.

The fuel rods 2 having the outer diameter of 9.3 mm are arranged in the square lattice with a fuel rod pitch of 10.6 mm to constitute the square fuel assembly with the 12 rows. In the center of the fuel assembly, the water rod 23 is formed in an area for 12 fuel rod unit cells. The number of the fuel rods in the channel box is 132.

The wings of the cross-shaped control rod 20 are provided with absorber rods of stainless tubes filled with $B_4C$. The fuel rods 6 at the corner of the fuel assembly where the local power becomes large at the beginning of the cycle contain a fuel material of 4.0% of uranium enrichment concentration, and other fuel rods 2 contain a fuel material of 4.9% of uranium enrichment concentration. The local power peaking at the beginning of the cycle is suppressed by arranging a fuel material for the fuel rods 7 other than the fuel rods 6, the fuel rods 7 adjoining the channel boxes and the water rod and having a tendency of a large power at the beginning of cycle, the fuel rods containing 4.9 wt % of uranium enrichment concentration to which 4.5 wt % of burnable poison is added. The average uranium enrichment concentration in the lateral cross sectional area of the fuel assembly is 4.87%.

In this example, the fuel material of 4.87 wt % of the average uranium enrichment concentration in the lateral cross sectional area of the fuel assembly is constantly arranged in the axial direction. When the fuel assemblies are loaded on the core shown in FIG. 23, the core outer radius is 2.7 m, the active fuel length is 371 cm, which is the same as ABWR.

The power density is 51 kW/L. The volume rate of the two phase flow cooling water including sub-cooled water for cooling the fuel rods in the channel boxes is 27%, the volume rate of water in the water rod is 4%, the volume rate of water in the gaps between the channel boxes and in the water rod is 30%, the volume rate of the fuel material is 27%, and the ratio of the volume rate of two phase flow cooling water to the volume rate of the fuel material is 0.98 in the reactor core area. The weight of uranium contained in the unit volume of the core area is 2.5 kg/L.

The ratio of the outer width of the channel box to the fuel assembly lattice width is 0.86. The volume rate of water including sub-cooled water for cooling the fuel rods in the area of the channel box is 39%, the volume rate of water in the water rod is 6%, the volume rate of the fuel material is 40%, and the ratio of the volume rate of two phase flow water to the volume rate of the fuel material is 0.98 in the channel box area. The uranium weight in the unit volume in the area of the channel box is 3.7 kg/L.

In this embodiment, by arranging the fuel rods having the outer diameter of 9.3 mm in the square lattice with a fuel rod pitch of 10.6 mm for the fuel assembly lattice of ABWR, it is possible to realize a boiling water reactor having 2.5 kg/L of a uranium weight for the average of the core, contained in the unit volume, which is 32% larger than about 1.9 of ABWR.

From the above reasons, in this embodiment, the boiling water reactor of the power of 1356 MWe whose core outer radius and the active fuel length are the same as ABWR has a continuous operation of 27 months at the discharge burnup of 55 GWd/t.

In this embodiment, when the channel box distance is set to 21.8 mm, which is wider than 16 mm of ABWR, it is possible to suppress the reactivity increase at the cold condition and to secure the reactor shutdown margin of 1.0% $\Delta k$ or more, keeping the small absolute value of void coefficient. Further, in this embodiment, since the fuel rods having the outer diameter of 9.3 mm are arranged in the square lattice with the fuel rod pitch of 10.6 mm in the ABWR core, the total number of fuel rods is increased to attain the average linear heat generation ratio of 92 W/cm, which is about 47% smaller than 172 W/cm of ABWR, and to secure 1.3 or more of MCPR, thereby to secure the same heat removal as that of ABWR.

From the above reasons, it is possible to keep the same thermal margin as that of ABWR in the boiling water reactor having the same power of 1356 MWe, the radius of core outer radius and the active fuel length as those of ABWR. Accordingly, keeping the same thermal margin and safety as those of ABWR, the reactor can contribute to reduction of electric generation cost by increasing the continuous operation time period of the plant.

Further, it is possible to improve the reactor shutdown performance and transient and stability performance that are subject for the high burnup, by lowering the reactivity increase at the cold condition and the absolute value of the void coefficient.

Twenty-First Embodiment

Figure 26:
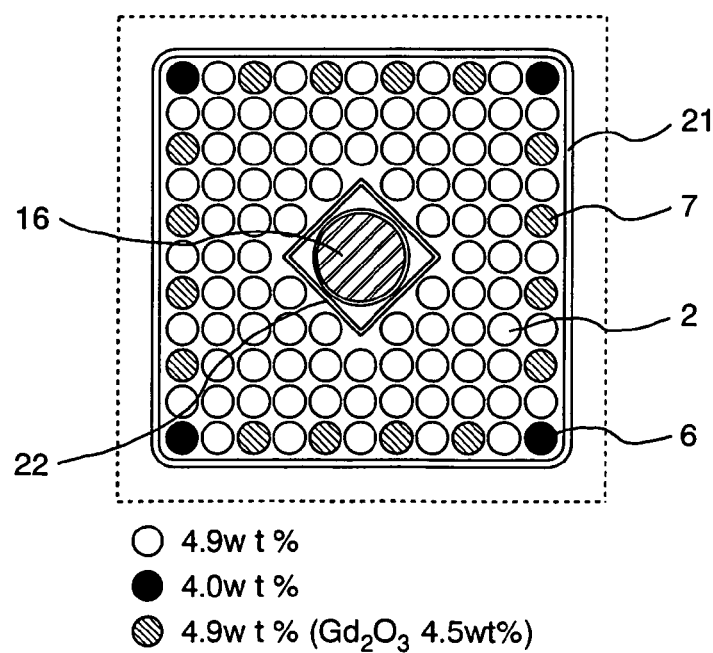
FIG. 26 is a lateral cross sectional view of a fuel assembly according to twenty-first embodiment.

The twenty-first embodiment according to the present invention will be explained with reference to FIG. 26. This embodiment employs, based upon the embodiment 17, large-diameter round control rods in the center of the fuel assembly in place of the cross shaped control rods, which are arranged in the gaps between the channel boxes.

The embodiment is concerned with a core of 1356 MWe, the lateral cross sectional area being the same as FIG. 23. The fuel assembly lattice is constituted by fuel rods 2, 6, 7, a channel box including a water rod and the large diameter round control rods 16, and gaps between the channel boxes. The channel box distance is 21.8 mm. The fuel rods 2 having the outer diameter of 10.2 mm are arranged in the square lattice of 11 rows of fuel rods in the channel box 21 with a fuel rod pitch of 11.5 mm. In the area of 13 fuel rod unit lattice of the center of the fuel assembly, a water rod 22 where the control rod is inserted is disposed. The number of the fuel rods in the channel box 21 is 108.

The large diameter round control rod 16 is absorber rods made of stainless tubes filled with $B_4C$. For the fuel rods 6 at the corners where the local power at the beginning of the cycle becomes large, a fuel material of a uranium enrichment concentration of 4.0% is arranged, and for other fuel rods, a fuel material of a uranium enrichment concentration of 4.9% is arranged.

The local power peaking at the beginning of cycle is suppressed by arranging a fuel material for the fuel rods 7 other than the fuel rods 6, the fuel rods 7 adjoining the channel boxes and the water rod and having a tendency of a large power at the beginning of cycle, the fuel rods containing 4.9 wt % of uranium enrichment concentration to which 4.5 wt % of burnable poison is added. The average uranium enrichment concentration in the lateral cross sectional area of the fuel assembly is 4.87%. In this embodiment, the fuel material of 4.87 wt % of the average uranium enrichment concentration in the lateral cross sectional area of the fuel assembly is constantly arranged in the axial direction.

When the fuel assemblies are loaded on the core shown in FIG. 23, the core outer radius is 2.7 m, the active fuel length is 371 cm, which is the same as ABWR. The power density is 51 kW/L. The volume rate of the two phase flow cooling water including sub-cooled water for cooling the fuel rods in the channel boxes in the core area is 26%, the volume rate of water in the water rod is 5%, the volume rate of water in the gaps between the channel boxes and in the water rod is 31%, the volume rate of the fuel material is 27%, and the ratio of the volume rate of two phase flow cooling water to the volume rate of the fuel material is 0.95 in the reactor core area.

The weight of uranium contained in the unit volume of the core area is 2.5 kg/L. The ratio of the outer width of the channel box to the fuel assembly lattice width is 0.86. The volume rate of water including sub-cooled water for cooling the fuel rods in the area of the channel box is 38%, the volume rate of water in the water rod is 7%, the volume rate of the fuel material is 40%, and the ratio of the volume rate of two phase flow water to the volume rate of the fuel material is 0.95 in the channel box area. The uranium weight in the unit volume in the area of the channel box is 3.7 kg/L.

In this embodiment, the large diameter round control rods are employed wherein the water rods are used as guide rubes for the control rods. By enlarging the diameter of the control rods, the mechanical strength of the control rods increases, thereby to prevent bending or crash of the control rods at the time of insertion and withdrawal.

Further, by reducing the number of the control rods, per fuel assemblies, the production of the control rods becomes easy and production cost can be reduced.

In this embodiment, as same as embodiment 17, the fuel rods having the outer diameter of 10.2 mm are arranged in the square lattice with the 11.5 mm fuel rod pitch so that the weight of uranium in the unit volume of the core area is 2.14 kg/L, which is about 32% larger than 1.9 kg/L of ABWR. From the above reasons, in this embodiment, the boiling water reactor of the power of 1356 MWe whose core outer radius and the active fuel length are the same as ABWR has a continuous operation of 27 months at the discharge burnup of 55 GWd/t. In this embodiment, as same as embodiment 17, when the channel box distance is set to 21.8 mm, which is wider than 16 mm of ABWR, it is possible to suppress the reactivity increase at the cold condition and to secure the reactor shutdown margin of 1.0% Δk or more, keeping the small absolute value of void coefficient.

Further, in this embodiment, since the fuel rods having the outer diameter of 10.2 mm are arranged in the square lattice with the fuel rod pitch of 11.5 mm in the ABWR core, the total number of fuel rods is increased to attain the average linear heat generation ratio of 112 W/cm, which is about 35% smaller than 172 W/cm of ABWR, and to secure 1.3 or more of MCPR, thereby to secure the same heat removal performance as that of ABWR.

Accordingly, keeping the same thermal margin and safety as those of ABWR, the reactor can contribute to reduction of electric generation cost by increasing the continuous operation time of the plant. Further, it is possible to improve the reactor shutdown performance and transient and stability performance that are subject for the high burnup, by lowering the reactivity increase at the cold condition and the absolute value of the void coefficient.

Twenty-Second Embodiment

Figure 27:
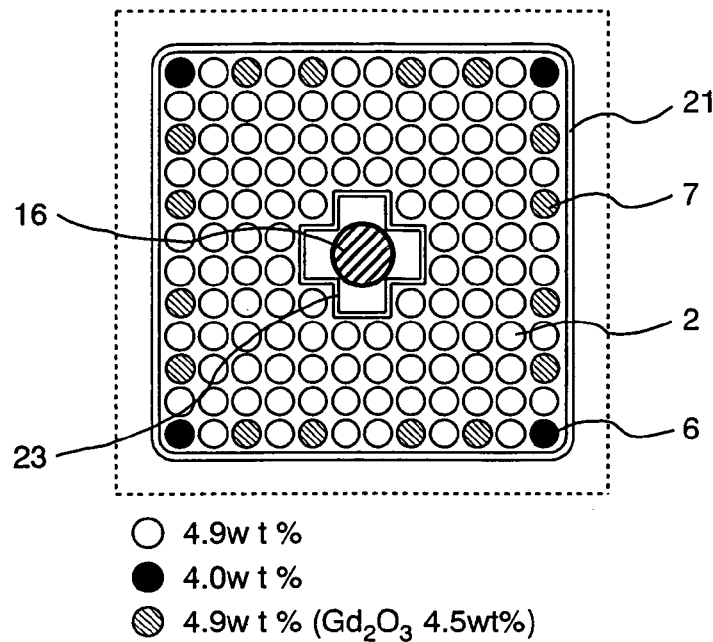
FIG. 27 is a lateral cross sectional view of a fuel assembly according to twenty-second embodiment.

The twenty-second embodiment according to the present invention will be explained with reference to FIG. 27. This embodiment, based upon embodiment 20, employs a large diameter round control rod in the center of the fuel assembly in place of the cross control rod disposed in the gap between the channel boxes.

The core of this embodiment has an electric power of 1356 MWe, the lateral cross sectional area of which is the same as that of embodiment 17 shown in FIG. 23. FIG. 27 shows a cross sectional view of the fuel assembly lattice. The fuel assembly is constituted by the fuel rods 2, 6, 7, the channel box 21 including the fuel assembly and the water rod 23, and the large diameter control rods 16 disposed in the gaps between the channel boxes 21. The distance between the channel boxes is 21.8 mm.

The fuel rods 2 having the outer diameter of 9.3 mm are arranged in the square lattice with a fuel rod pitch of 10.6 mm to constitute the square fuel assembly with the 12 rows.

In the center of the fuel assembly, the water rod 23 is formed in an area for 12 fuel rod unit cells. The number of the fuel rods in the channel box is 132.

The wings of the large diameter control rods 16 are provided with absorber rods of stainless tubes filled with $B_4C$. The fuel rods 6 at the corners of the fuel assembly where the local power becomes large at the beginning of the cycle contain a fuel material of 4.0% of uranium enrichment concentration, and other fuel rods 2 contain a fuel material of 4.9% of uranium enrichment concentration. The local power peaking at the beginning of the cycle is suppressed by arranging a fuel material for the fuel rods 7 other than the fuel rods 6, the fuel rods 7 adjoining the channel boxes and the water rod and having a tendency of a large power at the beginning of cycle, the fuel rods containing 4.9 wt % of uranium enrichment concentration to which 4.5 wt % of burnable poison is added. The average uranium enrichment concentration in the lateral cross sectional area of the fuel assembly is 4.87%.

In this example, the fuel material of 4.87 wt % of the average uranium enrichment concentration in the lateral cross sectional area of the fuel assembly is constantly arranged in the axial direction. When the fuel assemblies are loaded on the core shown in FIG. 23, the core outer radius is 2.7 m, the active fuel length is 371 cm, which is the same as ABWR. The power density is 51 kW/L.

The volume rate of the two phase flow cooling water including sub-cooled water for cooling the fuel rods in the channel boxes is 27%, the volume rate of water in the water rod is 4%, the volume rate of water in the gaps between the channel boxes and in the water rod is 30%, the volume rate of the fuel material is 27%, and the ratio of the volume rate of two phase flow cooling water to the volume rate of the fuel material is 0.98 in the reactor core area. The weight of uranium contained in the unit volume of the core area is 2.5 kg/L.

The ratio of the outer width of the channel box to the fuel assembly lattice width is 0.86. The volume rate of water including sub-cooled water for cooling the fuel rods in the area of the channel box is 39%, the volume rate of water in the water rod is 6%, the volume rate of the fuel material is 40%, and the ratio of the volume rate of two phase flow water to the volume rate of the fuel material is 0.98 in the channel box area. The uranium weight in the unit volume in the area of the channel box is 3.7 kg/L.

This embodiment employs the large diameter control rod which uses the water rod as a guide tube therefor. By enlarging the diameter of the control rod, the mechanical strength of the control rod increases, and it is possible to prevent bending and crash of the control rods when inserted or withdrawn.

Further, by decreasing the number of the control rods per fuel assembly, the production of the control rods becomes easy and the production cost can be lowered.

In this embodiment, as same as embodiment 20, by arranging the fuel rods having the outer diameter of 9.3 mm in the square lattice with a fuel rod pitch of 10.6 mm for the fuel assembly lattice of ABWR, it is possible to realize a boiling water reactor having 2.5 kg/L of a uranium weight, for the core average, contained in the unit volume, which is 32% larger than about 1.9 of ABWR.

From the above reasons, in this embodiment, the boiling water reactor of the power of 1356 MWe whose core outer radius and the active fuel length are the same as ABWR has a continuous operation of 27 months at the discharge burnup of 55 GWd/t. In this embodiment, as same as embodiment 17, when the channel box distance is set to 21.8 mm, which is wider than 16 mm of ABWR, it is possible to suppress the reactivity increase at the cold condition and to secure the reactor shutdown margin of 1.0% Δk or more, keeping the small absolute value of void coefficient.

Further, in this embodiment, since the fuel rods having the outer diameter of 9.3 mm are arranged in the square lattice with the fuel rod pitch of 10.6 mm in the ABWR core, the total number of fuel rods is increased to attain the average linear heat generation ratio of 92 W/cm, which is about 47% smaller than 172 W/cm of ABWR, and to secure 1.3 or more of MCPR, thereby to secure the same heat removal performance as that of ABWR.

Accordingly, keeping the same thermal margin and safety as those of ABWR, the reactor can contribute to reduction of electric generation cost by increasing the continuous operation time of the plant. Further, it is possible to improve the reactor shutdown performance and transient and stability performance that are subject for the high burnup, by lowering the reactivity increase at the cold condition and the absolute value of the void coefficient.

Twenty-Third Embodiment

The twenty-third embodiment according to the present invention will be explained in the following. The present embodiment shortens the active fuel length shorter than that in embodiment 17.

The present embodiment is concerned with a core of power of 1356 MWe, the lateral cross sectional area being the same as that of embodiment 17 shown in FIG. 23 and the fuel assembly lattice being the same as embodiment 17 shown in FIG. 22.

In this embodiment, by arranging the fuel rods having the outer diameter of 10.2 mm in the square lattice with a fuel rod pitch of 11.5 mm for the fuel assembly lattice of ABWR, it is possible to realize a boiling water reactor having 2.5 kg/L of a uranium weight for the average of the core, contained in the unit volume, which is 32% larger than about 1.9 of ABWR. Thus, it is possible to realize a boiling water reactor having the active fuel length of 2.36 m, which is about 1.4 m shorter than 3.7 m of ABWR.

In this embodiment, when the channel box distance is set to 21.8 mm, which is wider than 16 mm of ABWR, it is possible to realize a boiling water reactor by shortening the active fuel length to 2.36 m, which is shorter than that of ABWR. A reactivity increase at the cold condition is suppressed to secure the reactor shutdown margin of 1.0% Δk or more, nd as well as to secure the small absolute value of void coefficient so that, the core flow rate increases and it is possible to secure 1.3 or more of MCPR, thereby to secure the same heat removal performance as that of ABWR.

From the above reasons, it is possible to realize the boiling water reactor that contributes to great reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

Twenty-Fourth Embodiment

The twenty-fourth embodiment according to the present invention will be explained with reference to FIG. 28. This embodiment reduces, based upon embodiment 23, the fuel cycle cost by enlarging the life of the fuel assembly.

The core of this embodiment has an electric power of 1356 MWe, the lateral cross sectional area of which is the same as that of embodiment 17 shown in FIG. 23. FIG. 28 shows a cross sectional view of the fuel assembly lattice. The fuel assembly is constituted by the fuel rods 2, 6, 7, the channel box 21 including the fuel assembly, the water rod 23, a water removal rod 17, cross-shape control rods 20 disposed in the gaps between the channel boxes 21, and a water removal plate 18.

The distance between the channel boxes is 21.8 mm. The fuel rods 2 having the outer diameter of 10.2 mm are arranged in the square lattice with a fuel rod pitch of 11.5 mm to constitute the square fuel assembly with the 11 rows. In the center of the fuel assembly, the water rod 22 is formed in an area for 13 fuel rod unit cells. The number of the fuel rods in the channel box is 108.

The wings of the cross-shape control rods 20 are provided with absorber rods of stainless tubes filled with $B_4C$. The cross-shape control rod 20 is provided with at its tip the water removal plate, which is detachable and capable of being withdrawn during operation. In the gaps of the channel box 21 where the cross-shape control rod is not located, a water removal plate 18, which is capable of being withdrawn.

The fuel rods 6 at the corners of the fuel assembly where the local power becomes large at the beginning of the cycle contain a fuel material of 4.0% of uranium enrichment concentration, and other fuel rods 2 contain a fuel material of 4.9% of uranium enrichment concentration. The local power peaking at the beginning of cycle is suppressed by arranging a fuel material for the fuel rods 7 other than the fuel rods 6, the fuel rods 7 adjoining the channel boxes and the water rod and having a tendency of a large power at the beginning of the cycle, the fuel rods containing 4.9 wt % of uranium enrichment concentration to which 4.5 wt % of burnable poison is added.

The average uranium enrichment concentration in the lateral cross sectional area of the fuel assembly is 4.87%. In this example, the fuel material of 4.87 wt % of the average uranium enrichment concentration in the lateral cross sectional area of the fuel assembly is constantly arranged in the axial direction. When the fuel assemblies are loaded on the core shown in FIG. 23, the core outer radius is 2.7 m, the active fuel length is 236 cm. The power density is 79 kW/L.

The volume rate of the two phase flow cooling water including sub-cooled water for cooling the fuel rods in the channel boxes is 26%, the volume rate of water in the water rod is 5%, the volume rate of water in the gaps between the channel boxes and in the water rod is 31%, the volume rate of the fuel material is 27%, and the ratio of the volume rate of two phase flow cooling water to the volume rate of the fuel material is 0.95 in the reactor core area. The weight of uranium contained in the unit volume of the core area is 2.5 kg/L.

The ratio of the outer width of the channel box to the fuel assembly lattice width is 0.86. The volume rate of water including sub-cooled water for cooling the fuel rods in the area of the channel box is 38%, the volume rate of water in the water rod is 7%, the volume rate of the fuel material is 40%, and the ratio of the volume rate of two phase flow water to the volume rate of the fuel material is 0.95 in the channel box area. The uranium weight in the unit volume in the area of the channel box is 3.7 kg/L.

In this embodiment, as same as in embodiment 23, by arranging the fuel rods having the outer diameter of 10.2 mm in the square lattice with a fuel rod pitch of 11.6 mm for the fuel assembly lattice of ABWR, it is possible to realize a boiling water reactor having 2.5 kg/L of a uranium weight for the average of the core, contained in the unit volume, which is 32% larger than about 1.9 of ABWR.

When the channel box distance is set to 21.8 mm, which is wider than 16 mm of ABWR, it is possible to suppress the reactivity increase at the cold condition and to secure the reactor shutdown margin of 1.0% Δk or more, keeping the small absolute value of void coefficient. In this embodiment, when the active fuel length is shortened to 2.36 m, which is shorter than 3.7 m of ABWR to increase the core flow amount, it is possible to attain 1.3 or more of MCPR, thereby to secure the same heat removal as that of ABWR.

From the above reasons, it is possible to realize the boiling water reactor that contributes to great reduction of the height of the core and reduction of the construction cost of the power plant, keeping the same thermal margin and safety as those of ABWR.

Further, it is possible to improve the reactor shutdown performance and transient and stability performance that are subject for the high burnup, by lowering the reactivity increase at the cold condition and the absolute value of the void coefficient.

In this embodiment, when water present in gaps between the channel boxes and in the water rod is removed by the water removal rod or water removal plate, it is possible to realize a reactor in which the conversion of uranium 238 to plutonium is increased. Further, since the water to fuel volume ratio can be freely adjusted by insertion and withdrawal of the water removal rod or water removal plate, there is no need to use burnable poison to lengthen the life of the fuel assembly, thereby to reduce a fuel cycle cost.

Twenty-Fifth Embodiment

The twenty-fifth embodiment according to the present invention will be explained with reference to FIGS. 29, 30.

Figure 29:
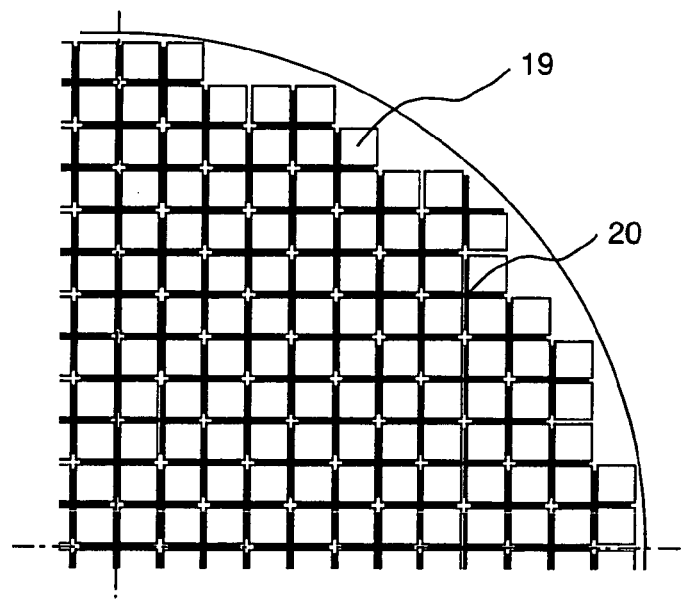
FIG. 29 is a lateral cross sectional view of a ¼ core according to twenty-fifth embodiment.

FIG. 29 shows a lateral cross sectional view of a quarter of the core of 1356 MWe to which the present embodiment is applied. There are shown 424 of fuel assemblies, and 197 of cross-shape control rods at a rate of one for every 2 fuel assemblies.

Figure 30:
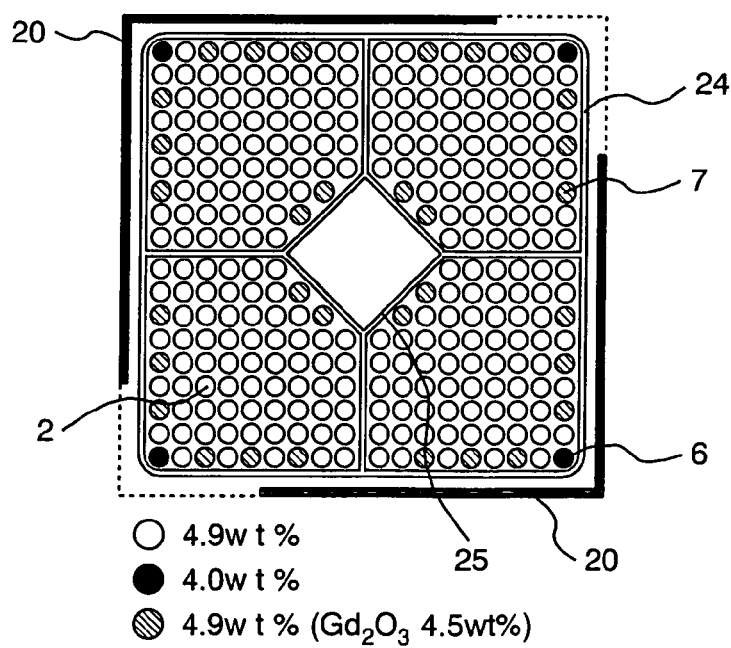
FIG. 30 is a lateral cross sectional view of a fuel assembly to be loaded on the core shown in FIG. 29.

FIG. 30 shows a cross sectional view of the fuel assembly lattice. The fuel assembly is constituted by the fuel rods 2, 6, 7, a channel box 24 partitioned by separating plates into 4 sections, and the cross-shaped control rod 20 disposed in the gaps between the channel boxes and outside of the channel boxes. The distance between the channel boxes is 22.5 mm. There are arranged fuel rods 2 having an outer diameter of 10.0 mm at a fuel rod pitch of 11.3 mm in the 4 sections of the channel box 24 to constitute a square lattice with 9 rows.

In the center of the fuel assembly, a water rod 25 partitioned by plates is disposed. The number of the fuel rods is 300. The wings of the cross-shaped control rod 20 are provided with absorber rods of stainless tubes filled with $B_4C$. The fuel rods 6 at the corner of the fuel assembly where the local power becomes large at the beginning of yhe cycle contain a fuel material of 4.0% of uranium enrichment concentration, and other fuel rods 2 contain a fuel material of 4.9% of uranium enrichment concentration.

The local power peaking at the beginning of cycle is suppressed by arranging a fuel material for the fuel rods 7 other than the fuel rods 6, the fuel rods 7 adjoining the channel boxes and the water rod and having a tendency of a large power at the beginning of the cycle. The average uranium enrichment concentration in the lateral cross sectional area of the fuel assembly is 4.89%.

In this example, the fuel material of 4.89 wt % of the average uranium enrichment concentration in the lateral cross sectional area of the fuel assembly is constantly arranged in the axial direction. When the fuel assemblies are loaded on the core shown in FIG. 29, the core outer radius is 2.9 m, the active fuel length is 217 cm. The power density is 79 kW/L. The volume rate of the two phase flow cooling water including sub-cooled water for cooling the fuel rods in the channel boxes is 29%, the volume rate of water in the water rod is 5%, the volume rate of water in the gaps between the channel boxes and in the water rod is 24%, the volume rate of the fuel material is 32%, and the ratio of the volume rate of two phase flow cooling water to the volume rate of the fuel material is 0.92 in the reactor core area.

The weight of uranium contained in the unit volume of the core area is 2.9 kg/L. The ratio of the outer width of the channel box to the fuel assembly lattice width is 0.90. The volume rate of water including sub-cooled water for cooling the fuel rods in the area of the channel box is 37%, the volume rate of water in the water rod is 7%, the volume rate of the fuel material is 40%, and the ratio of the volume rate of two phase flow water to the volume rate of the fuel material is 0.92 in the channel box area. The uranium weight in the unit volume in the area of the channel box is 3.7 kg/L.

In this embodiment, by arranging fuel rods having an outer diameter of 10.0 mm in a square lattice, with a fuel rod pitch of 11.3 mm, the uranium weight contained in the unit volume can be increased to 2.9 kg/L, which is 53% larger than 1.9 kg/L of ABWR, so that a boiling water reactor having an active fuel length of 2.17 m, which is about 1.5 m shorter than that of ABWR is realized.

In this embodiment, when the channel box distance is set to 22.5 mm, which is wider than 16 mm of ABWR, it is possible to realize a boiling water reactor that keeps the small absolute value of void coefficient by suppressing the reactivity increase at the cold condition and securing the reactor shutdown margin of 1.0% Δk or more. Further, in this embodiment, by shortening the active fuel length to 2.17 m, which is shorter than that of ABWR, the core flow rate increases and it is possible to secure 1.3 or more of MCPR, thereby to secure the same heat removal performance as that of ABWR.

From the above reasons, it is possible to realize the boiling water reactor that contributes to great reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

The Twenty-Sixth Embodiment

The twenty-sixth embodiment according to the present invention will be explained in the following. This embodiment enlarges a plant utility rate by achieving a high degree of burnup, using a highly enriched fuel material, based upon embodiment 25.

The present embodiment is concerned with a reactor of 1356 MWe, the core of which has the same structure as that of embodiment 25 shown in FIG. 29; there are 424 of fuel assemblies and 197 of cross-shape control rods arranged at a rate of one for every 2 fuel assemblies.

Figure 31:
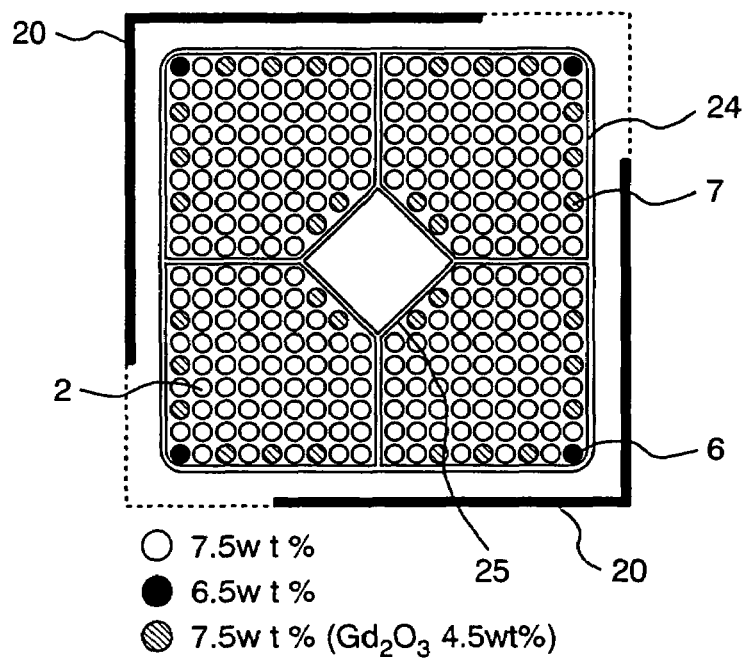
FIG. 31 is a lateral cross sectional view of a fuel assembly according to twenty-sixth embodiment.

FIG. 31 shows a cross sectional view of the fuel assembly lattice. The fuel assembly is constituted by the fuel rods 8, 9, 10, a channel box 24 partitioned by separating plates into 4 sections, and the cross-shaped control rod 20 disposed in the gaps between the channel boxes and outside of the channel boxes. The distance between the channel boxes is 39.0 mm.

There are arranged fuel rods 8 having an outer diameter of 10.0 mm at a fuel rod pitch of 11.3 mm in the 4 sections of the channel box 24 to constitute a square lattice with 9 rows. In the center of the fuel assembly, a water rod 25 partitioned by plates is disposed. The number of the fuel rods is 300. The wings of the cross-shaped control rod 20 are provided with absorber rods of stainless tubes filled with B$_4$C.

The fuel rods 9 at the corner of the fuel assembly where the local power becomes large at the beginning of the cycle contain a fuel material of 6.5% of uranium enrichment concentration, and other fuel rods 8 contain a fuel material of 7.5% of uranium enrichment concentration to which 4.5 wt % of a burnable poison is added. The local power peaking at the beginning of cycle is suppressed by arranging a fuel material for the fuel rods 10 other than the fuel rods 9, the fuel rods 10 adjoining the channel boxes and the water rod and having a tendency of a large power at the beginning of cycle. The average uranium enrichment concentration in the lateral cross sectional area of the fuel assembly is 7.49%. In this example, the fuel material of 7.49 wt % of the average uranium enrichment concentration in the lateral cross sectional area of the fuel assembly is constantly arranged in the axial direction.

When the fuel assemblies are loaded on the core, the core outer radius is 2.9 m, the active fuel length is 217 cm. The power density is 69 kW/L. The volume rate of the two phase flow cooling water including sub-cooled water for cooling the fuel rods in the channel boxes is 25%, the volume rate of water in the water rod is 5%, the volume rate of water in the gaps between the channel boxes and in the water rod is 34%, the volume rate of the fuel material is 27%, and the ratio of the volume rate of two phase flow cooling water to the volume rate of the fuel material is 0.92 in the reactor core area.

The weight of uranium contained in the unit volume of the core area is 2.5 kg/L. The ratio of the outer width of the channel box to the fuel assembly lattice width is 0.84. The volume rate of water including sub-cooled water for cooling the fuel rods in the area of the channel box is 37%, the volume rate of water in the water rod is 7%, the volume rate of the fuel material is 40%, and the ratio of the volume rate of two phase flow water to the volume rate of the fuel material is 0.92 in the channel box area. The uranium weight in the unit volume in the area of the channel box is 3.7 kg/L.

In this embodiment, the average uranium enrichment concentration in the lateral cross sectional area of the fuel assembly is increased from 4.89 wt % to 7.49 wt % to increase the discharge burnup, a boiling water reactor with a higher plant utility rate than that of embodiment 25 is realized.

In this embodiment, by arranging fuel rods having an outer diameter of 10.0 mm in a square lattice, with a fuel rod pitch of 11.3 mm, the uranium weight contained in the unit volume can be increased to 2.5 kg/L, which is about 32% larger than 1.9 kg/L of ABWR, so that a boiling water reactor having an active fuel length of 2.17 m, which is about 1.5 m shorter than that of ABWR is realized.

When the channel box distance is set to 39.0 mm, which is wider than 16 mm of ABWR, it is possible to realize a boiling water reactor that keeps the small absolute value of void coefficient by suppressing the reactivity increase at the cold condition and securing the reactor shutdown margin of 1.0% Δk or more. Further, in this embodiment, as same as embodiment 25, the fuel rods having the outer diameter of 10.0 mm are arranged in the square lattice with a fuel rod pitch of 11.3 mm to increase the total number of fuel rods. As a result, the average linear heat generation ratio can be made 142 W/cm, which is about 17% lower than 172 W/cm of ABWR to attain MCPR of 1.3 or more. Thus, the same heat removal performance as that of ABWR is secured.

From the above reasons, it is possible to realize the boiling water reactor that contributes to great reduction of the height of the core and reduction of the construction cost of the power plant, keeping the same thermal margin and safety as those of ABWR. Further, it is possible to improve the reactor shutdown performance and transient and stability performance that are subject for the high burnup, by lowering the reactivity increase at the cold condition and the absolute value of the void coefficient.

Twenty-Seventh Embodiment

The twenty-seventh embodiment according to the present invention will be explained with reference to FIG. 32. This embodiment reduces, based upon embodiment 25, the fuel cycle cost by enlarging the life of the fuel assembly.

This embodiment is concerned with a reactor of electric power of 1356 MWe, the lateral cross sectional area being the same as that of embodiment 25 shown in FIG. 29.

Figure 32:
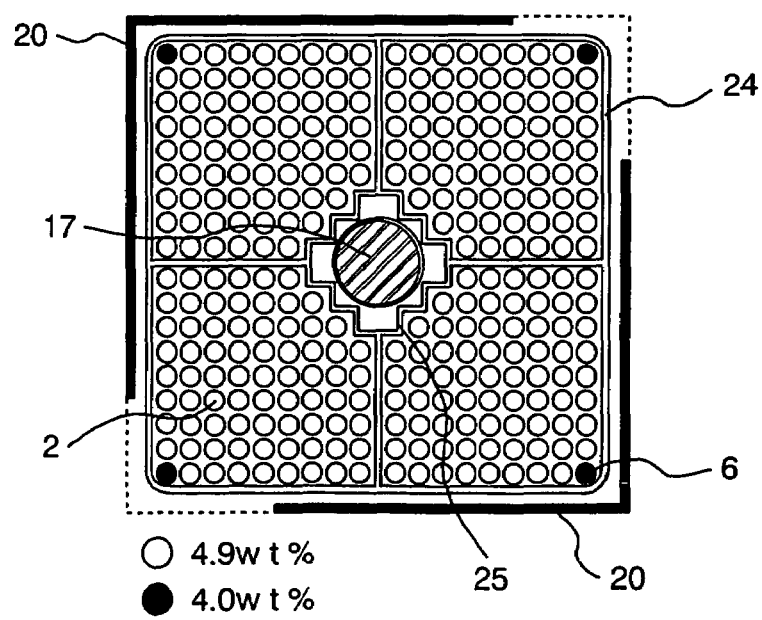
FIG. 32 is a lateral cross sectional view of a fuel assembly according to twenty-seventh embodiment.

FIG. 32 shows a cross sectional view of the fuel assembly lattice. The fuel assembly is constituted by the fuel rods 2, 6, a water removal rod 17, a channel box 24 partitioned by separating plates into 4 sections, and the cross-shaped control rods 20 disposed in the gaps between the channel boxes and outside of the channel boxes. The distance between the channel boxes is 22.5 mm. There are arranged fuel rods 2 having an outer diameter of 10.0 mm at a fuel rod pitch of 11.3 mm in the 4 sections of the channel box 24 to constitute a square lattice with 9 rows.

In the center of the fuel assembly, a water rod 25 partitioned by plates is disposed. The water removal rod 17 is inserted into the water rod. The number of the fuel rods is 300. The wings of the cross-shaped control rod 20 are provided with absorber rods of stainless tubes filled with B$_4$C. The cross-shape control rods have their tips water removal plates which are detachable and capable of being withdrawn during operation.

The fuel rods 6 at the corner of the fuel assembly where the local power becomes large at the beginning of the cycle contain a fuel material of 4.0% of uranium enrichment concentration, and other fuel rods 2 contain a fuel material of 4.9% of uranium enrichment concentration. The average uranium enrichment concentration in the fuel assembly is 4.89 wt %. In this embodiment, the fuel material of the average uranium enrichment concentration of 4.89 wt % is arranged constantly in the axial direction of the fuel assembly.

Figure 28:
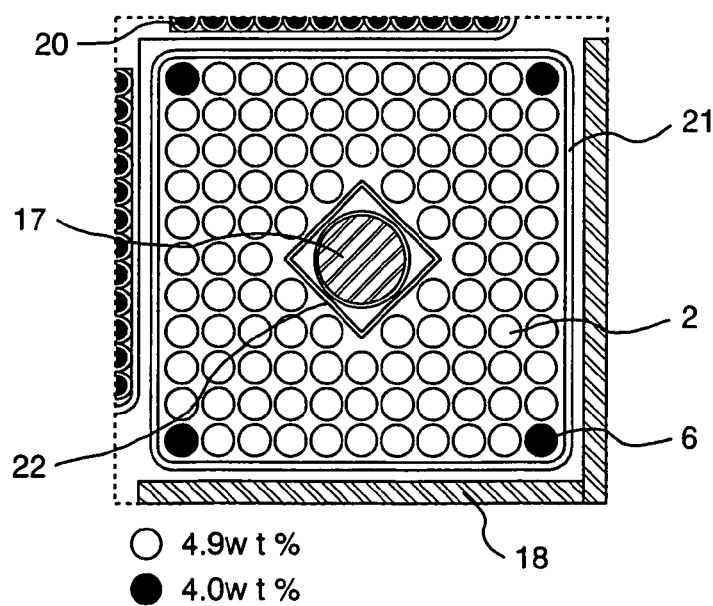
FIG. 28 is a lateral cross sectional view of a fuel assembly according to twenty-fourth embodiment.

When the fuel assemblies are loaded on the core shown in FIG. 28, the core outer radius is 2.9 m, the active fuel length is 217 cm. The power density is 79 kW/L. The volume rate of the two phase flow cooling water including sub-cooled water for cooling the fuel rods in the channel boxes is 29%, the volume rate of water in the water rod is 5%, the volume rate of water in the in the water rod is 24%, the volume rate of the fuel material is 32%, and the ratio of the volume rate of two phase flow cooling water to the volume rate of the fuel material is 0.92 in the reactor core area.

The weight of uranium contained in the unit volume of the core area is 2.9 kg/L. The ratio of the outer width of the channel box to the fuel assembly lattice width is 0.90. The volume rate of water including sub-cooled water for cooling the fuel rods in the area of the channel box is 37%, the volume rate of water in the water rod is 7%, the volume rate of the fuel material is 40%, and the ratio of the volume rate of two phase flow water to the volume rate of the fuel material is 0.92 in the channel box area. The uranium weight in the unit volume in the area of the channel box is 3.7 kg/L.

In this embodiment, as same as in embodiment 25, by arranging the fuel rods having the outer diameter of 10.0 mm in the square lattice with a fuel rod pitch of 11.3 mm, it is possible to realize a boiling water reactor having 2.9 kg/L of a uranium weight for the average of the core, contained in the unit volume, which is 53% larger than about 1.9 of ABWR. When the channel box distance is set to 22.5 mm, which is wider than 16 mm of ABWR, it is possible to suppress the reactivity increase at the cold condition and to secure the reactor shutdown margin of 1.0% Δk or more, keeping the small absolute value of void coefficient.

In this embodiment, as same as in the embodiment 25, when the fuel rods having an outer diameter of 10.0 mm are arranged in the square lattice to increase the total number of fuel rods and to lower the average linear heat generation ratio to 142 W/cm, which is about 17% lower the 172 W/cm of ABWR, it is possible to attain 1.3 or more of MCPR, thereby to secure the same heat removal as that of ABWR.

From the above reasons, it is possible to realize the boiling water reactor that contributes to great reduction of the height of the core and reduction of the construction cost of the power plant, keeping the same thermal margin and safety as those of ABWR. In this embodiment, when water present in gaps between the channel boxes and in the water rod is removed by the water removal rod or water removal plate, it is possible to realize a reactor in which the conversion of uranium 238 to plutonium is increased.

Further, since the water to fuel volume ratio can be freely adjusted by insertion and withdrawal of the water removal rod or water removal plate, there is no need to use burnable poison to lengthen the life of the fuel assembly, thereby to reduce a fuel cycle cost.

Twenty-Eighth Embodiment

The twenty-eighth embodiment according to the present invention will be explained in the following. The present embodiment aims at increasing in the utility of plant by hig burnup wherein the active fuel length is made longer than the embodiment 25. The present embodiment relates to a reactor of a power of 1356 MWe; the lateral cross sectional area is the same as that of embodiment 25 shown in FIG. 29, and the fuel assembly lattice is the same as that of embodiment 25 shown in FIG. 30. In this embodiment, the active fuel length is 371 cm, which is the same as that of ABWR. In this embodiment, by arranging fuel rods having an outer diameter of 10.0 mm in a square lattice with a fuel rod pitch of 11.3 mm, the uranium weight contained in the unit volume can be increased to 2.9 kg/L, which is 53% larger than 1.9 kg/L of ABWR.

From the above reasons, in this embodiment, in a boiling water reactor having a power of 1356 MWe and an active fuel length, which are the same as those of ABWR, the continuous operation period can be extended to 30 months at the discharge burnup of 50 GWd/t. Further, in this embodiment, when the channel box distance is set to 22.5 mm, which is wider than 16 mm of ABWR, it is possible to suppress the reactivity increase at the cold condition and to secure the reactor shutdown margin of 1.0% Δk or more.

Further, in this embodiment, since the fuel rods having the outer diameter of 10.0 mm are arranged in the square lattice with the fuel rod pitch of 11.3 mm in the ABWR core, the total number of fuel rods is increased to attain the average linear heat generation ratio of 83 W/cm, which is about 52% smaller than 172 W/cm of ABWR, and to secure 1.3 or more of MCPR, thereby to secure the same heat removal performance as that of ABWR.

Accordingly, keeping the same thermal margin and safety as those of ABWR, the reactor can contribute to reduction of electric generation cost by increasing the continuous operation time period of the plant. Further, it is possible to improve the reactor shutdown performance and transient and stability performance that are subject for the high burnup.

Twenty-Ninth Embodiment

Figure 33:
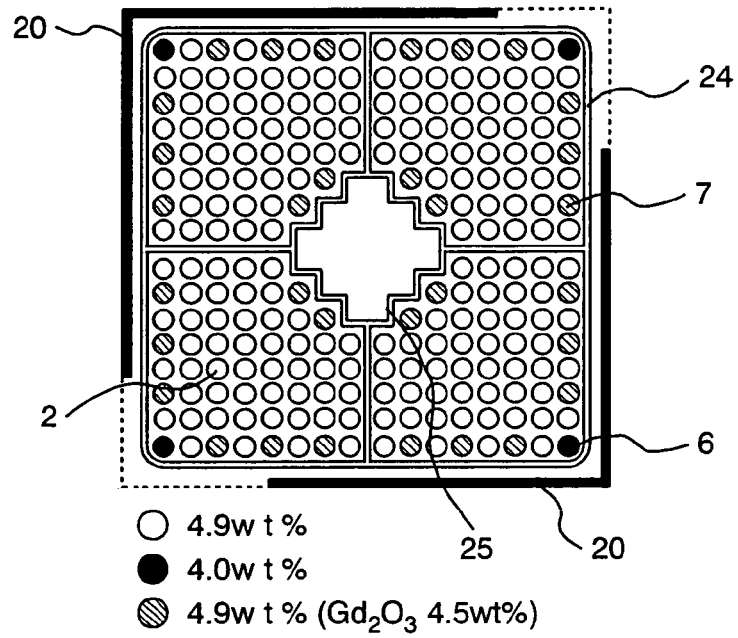
FIG. 33 is a lateral cross sectional view of a fuel assembly according to twenty-ninth embodiment.

The twenty-ninth embodiment according to the present invention will be explained with reference to FIG. 33. The present embodiment increases electric power, based upon embodiment 25.

This embodiment relates to a reactor of a power of 1700 MWe; the lateral cross sectional area is the same as that of embodiment 25 shown in FIG. 29. FIG. 33 shows a cross sectional view of the fuel assembly lattice. The fuel assembly is constituted by the fuel rods 2, 6, 7, a channel box 24 partitioned by separating plates into 4 sections, and the cross-shaped control rod 20 disposed in the gaps between the channel boxes and outside of the channel boxes. The distance between the channel boxes is 22.5 mm.

There are arranged fuel rods 2 having an outer diameter of 10.1 mm at a fuel rod pitch of 22.5 mm in the 4 sections of the channel box 24 to constitute a square lattice with 8 rows. In the center of the fuel assembly, a water rod 25 partitioned by plates is disposed. The number of the fuel rods is 232. The wings of the cross-shaped control rod 20 are provided with absorber rods of stainless tubes filled with $B_4C$.

The fuel rods 6 at the corner of the fuel assembly where the local power becomes large at the beginning of the cycle contain a fuel material of 4.0% of uranium enrichment concentration, and other fuel rods 2 contain a fuel material of 4.9% of uranium enrichment concentration. The local power peaking at the beginning of the cycle is suppressed by arranging a fuel material for the fuel rods 7 other than the fuel rods 6, the fuel rods 7 adjoining the channel boxes and the water rod and having a tendency of a large power at the beginning of the cycle. The average uranium enrichment concentration in the lateral cross sectional area of the fuel assembly is 4.88%. In this embodiment, the fuel material of 4.88 wt % of the average uranium enrichment concentration in the lateral cross sectional area of the fuel assembly is constantly arranged in the axial direction.

When the fuel assemblies are loaded on the core shown in FIG. 29, the core outer radius is 2.9 m, the active fuel length is 371 cm. The power density is 58 kW/L. The volume rate of the two phase flow cooling water including sub-cooled water for cooling the fuel rods in the channel boxes is 37%, the volume rate of water in the water rod is 7%, the volume rate of water in the gaps between the channel boxes and in the water rod is 25%, the volume rate of the fuel material is 25%, and the ratio of the volume rate of two phase flow cooling water to the volume rate of the fuel material is 1.48 in the reactor core area.

The weight of uranium contained in the unit volume of the core area is 2.3 kg/L. The ratio of the outer width of the channel box to the fuel assembly lattice width is 0.90. The volume rate of water including sub-cooled water for cooling the fuel rods in the area of the channel box is 47%, the volume rate of water in the water rod is 8%, the volume rate of the fuel material is 32%, and the ratio of the volume rate of two phase flow water to the volume rate of the fuel material is 1.48 in the channel box area. The uranium weight in the unit volume in the area of the channel box is 2.9 kg/L.

In this embodiment, by arranging fuel rods having an outer diameter of 10.1 mm in a square lattice with a fuel rod pitch of 12.5 mm, it is possible to realize a boiling water reactor wherein the uranium weight contained in the unit volume at the core average is 2.3 kg/L, which is about 21% larger than about 1.9 kg/L of ABWR. As a result, in the reactor of 1700 MWe and the active fuel length, which are same as ABWR, the continuous operation time period can be 20 months at 55 GWd/t of the withdrawal.

In this embodiment, when the channel box distance is set to 22.5 mm, which is wider than 16 mm of ABWR, it is possible to suppress the reactivity increase at the cold condition and to secure the reactor shutdown margin of 1.0% Δk or more, keeping the small absolute value of void coefficient. Further, in this embodiment, since the fuel rods having the outer diameter of 10.1 mm are arranged in the square lattice with the fuel rod pitch of 12.5 mm in the ABWR core, the total number of fuel rods is increased to attain the average linear heat generation ratio of 136 W/cm, which is about 21% smaller than 172 W/cm of ABWR, and to secure 1.3 or more of MCPR, thereby to secure the same heat removal performance as that of ABWR.

Accordingly, keeping the same thermal margin and safety as those of ABWR, the reactor can contribute to reduction of electric generation cost by increasing the continuous operation time period of the plant. Further, it is possible to improve the reactor shutdown performance and transient and stability performance that are subject for the high burnup, by lowering the reactivity increase at the cold condition and the absolute value of the void coefficient.

Thirtieth Embodiment

The thirtieth embodiment according to the present invention will be explained with reference to FIG. 34. This embodiment is a modification of embodiment 25 of electric power of 1356 MWe, and the lateral cross sectional area is the same as that of embodiment 25 shown in FIG. 29.

Figure 34:
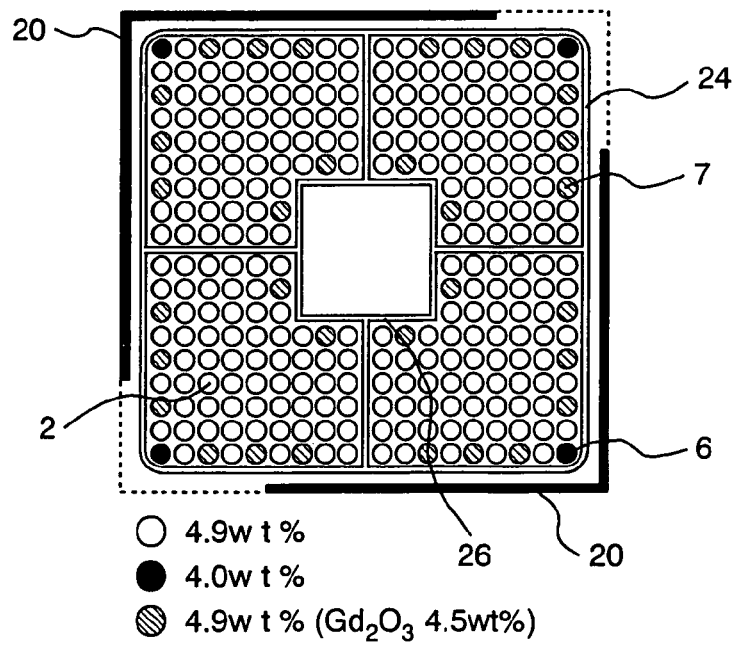
FIG. 34 is a lateral cross sectional view of a fuel assembly according to thirtieth embodiment.

FIG. 34 shows a cross sectional view of the fuel assembly lattice. The fuel assembly is constituted by the fuel rods 2, 6, 7, a channel box 24 partitioned by separating plates into 4 sections, and the cross-shaped control rod 20 disposed in the gaps between the channel boxes and outside of the channel boxes. The distance between the channel boxes is 22.5 mm.

There are arranged fuel rods 2 having an outer diameter of 10.0 mm at a fuel rod pitch of 11.3 mm in the 4 sections of the channel box 24 to constitute a square lattice with 9 rows. In the center of the fuel assembly, a water rod 25 partitioned by plates is disposed. The number of the fuel rods is 288. The wings of the cross-shaped control rod 20 are provided with absorber rods of stainless tubes filled with $B_4C$. The fuel rods 6 at the corner of the fuel assembly where the local power becomes large at the beginning of the cycle contain a fuel material of 4.0% of uranium enrichment concentration, and other fuel rods 2 contain a fuel material of 4.9% of uranium enrichment concentration, the fuel material for the fuel rods being added with 4.5% of a burnable poison.

The local power peaking at the beginning of the cycle is suppressed by arranging a fuel material for the fuel rods 7 other than the fuel rods 6, the fuel rods 7 adjoining the channel boxes and the water rod and having a tendency of a large power at the beginning of the cycle. The average uranium enrichment concentration in the lateral cross sectional area of the fuel assembly is 4.89%. In this example, the fuel material of 4.89 wt % of the average uranium enrichment concentration in the lateral cross sectional area of the fuel assembly is constantly arranged in the axial direction.

When the fuel assemblies are loaded on the core shown in FIG. 29, the core outer radius is 2.9 m, the active fuel length is 217 cm. The power density is 79 kW/L. The volume rate of the two phase flow cooling water including sub-cooled water for cooling the fuel rods in the channel boxes is 28%, the volume rate of water in the water rod is 8%, the volume rate of water in the gaps between the channel boxes and in the water rod is 27%, the volume rate of the fuel material is 30%, and the ratio of the volume rate of two phase flow cooling water to the volume rate of the fuel material is 0.90 in the reactor core area. The weight of uranium contained in the unit volume of the core area is 2.8 kg/L.

The ratio of the outer width of the channel box to the fuel assembly lattice width is 0.90. The volume rate of water including sub-cooled water for cooling the fuel rods in the area of the channel box is 35%, the volume rate of water in the water rod is 10%, the volume rate of the fuel material is 39%, and the ratio of the volume rate of two phase flow water to the volume rate of the fuel material is 0.92 in the channel box area. The uranium weight in the unit volume in the area of the channel box is 3.6 kg/L.

In this embodiment, by arranging fuel rods having an outer diameter of 10.0 mm in a square lattice with a fuel rod pitch of 11.3 mm, it is possible to realize a boiling water reactor wherein the uranium weight contained in the unit volume at the core average is 2.8 kg/L, which is about 47% larger than about 1.9 kg/L of ABWR. As same as embodiment 25, when the distance between the channel boxes is set to 22.5 mm, it is possible to suppress the increase of the reactivity increase at the cold condition and to secure the reactor shutdown margin of 1.0% Δk or more, keeping the small absolute value of void coefficient.

In this embodiment, the fuel rods having the outer diameter of 10.0 mm are arranged in the square lattice with the fuel rod pitch of 11.3 mm to increase the total number of duel rods, thereby to lower the average linear heat generation ratio to 148 W/cm, which is about 14% smaller than 172 of ABWR. As a result, the MCPR of i.3 or more is attained and the same heat removal performance as that of ABWR is attained.

From the above reasons, it is possible to realize the boiling water reactor that contributes to great reduction of the height of the core and reduction of the construction cost of the power plant, keeping the same thermal margin and safety as those of ABWR.

Further, it is possible to improve the reactor shutdown performance and transient and stability performance that are subject for the high burnup, by lowering the reactivity increase at the cold condition and the absolute value of the void coefficient.

Thirty-First Embodiment

The thirty-first embodiment according to the present invention will be explained with reference to FIG. 35 and FIG. 36. This embodiment employs part-length fuel rods for the fuel assembly in the twentieth embodiment. The fuel assembly lattice shown in FIG. 35 comprises fuel rods 2, 6, 7, a channel box including the fuel rods and a water rod 23, and cross-shaped control rods 20 inserted into gaps between the channel boxes and disposed outside of the channel box. The distance between the channel boxes is 19.2 mm.

Figures 36A, 36B:
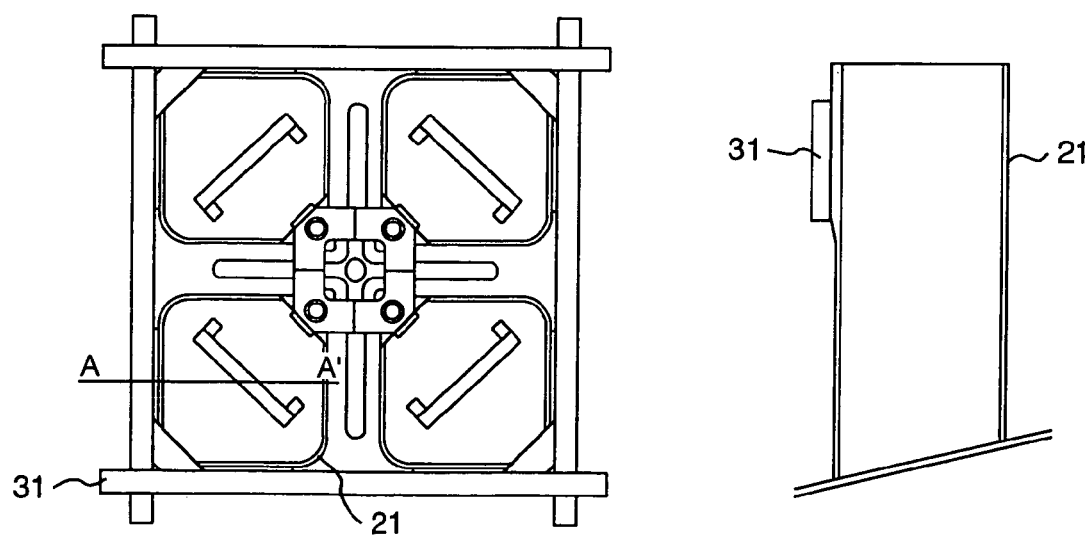

The channel box distance is larger than that of the conventional fuel assemblies; the channel box outer width at the top end of the fuel assembly is larger than the other part, as shown in FIG. 36, so as to make the gaps between the lattice plate at the top of the core equal to that of the conventional ones. This structure is not only limited to this embodiment, but also applied to other embodiments.

In the channel box 21, fuel rods 2 having an outer diameter of 9.3 mm are arranged in a square lattice with a fuel rod pitch of 10.8 mm to constitute a square fuel assembly with 12 rows of fuel rods. The fuel rods 30 are part-length fuel rods.

In the center of the fuel assembly, the water rod 23 for 12 of fuel rod unit lattice cells is disposed. The number of the fuel rods in the channel box 21 in the lower region where the part-length fuel rods are present is 132, and in the upper region where the pert-length fuel rods are not present, the number of the fuel rods is 116. The wings of the cross-shaped control rods 20 have absorber rods made of stainless tube that are filled with $B_4C$.

A fuel material having a uranium enrichment concentration of 4.0 wt % is arranged in the fuel rods at the corners where the fuel rod output at the beginning of burnup becomes large, and a fuel material having a uranium enrichment concentration of 4.9 wt % is arranged in the other fuel rods.

The average uranium enrichment concentration in the cross sectional area of the fuel assembly is 4.87 wt %.

When the fuel assemblies are loaded on the core shown in FIG. 23, the core outer diameter is 2.7 m, the active fuel length is 381 cm, and the power density is 49 W/L. A volume rate of two-phase flow cooling water including sub-cooled water for cooling the fuel rods is 31%, the volume rate of water in the rod is 5%, the volume rate of the water in the gaps between the channel boxes outside of the channel box and water in the water rod is 28%, a volume rate of the fuel material is 26%, and a ratio of the volume rate of the two-phase flow water to the fuel material volume rate is 1.19.

An amount of uranium contained in the unit volume of the core area is 2.4 kg/L. The ratio of the outer width of the channel box to the fuel assembly lattice width is 0.88. The volume rate of the two-phase flow cooling water including sub-cooled water for cooling the fuel rods in the channel box area is 43%, the volume rate of water in the water rod is 7%, the volume rate of the fuel material is 36%, and the ratio of the two-phase flow cooling water to the volume rate of the fuel material is 1.19.

The weight of uranium contained in the unit volume of the channel box area is 3.3 kg/L. When the fuel assembly shown in FIG. 35 is employed, and when the number of replacement of fuel rods is 108 for each cycle, it is possible to constitute the reactor core having 3017 days of a super long-term average burning days at the discharge burnup of 63 Gd/t. When, the distance between the channel boxes is 19.2 mm, which is larger than 16 mm of ABWR, and when the part-length fuel rods are employed, it is possible to suppress the increase of the reactivity at the cold condition, and to acquire the reactor shutdown margin of 1.0% Δk or more, thereby realizing the boiling water reactor having a smaller absolute value of the void coefficient than ABWR.

When fuel rods having an outer diameter of 9.3 mm are arranged in a square lattice with a fuel rod pitch of 10.8 mm to increase the number of the fuel rods, thereby decreasing the average linear heat generation ratio to 95 W/cm, which is about 45% smaller than 172 W/cm of ABWR, it is possible to acquire MCPR of 1.3 or more, which leads to the same heat removal performance as that of ABWR.

From the above reasons, it is possible to keep the same thermal margin as that of ABWR, in the boiling water reactor having the same power of 1356 MWe, and the same core outer radius of the core and the same active fuel length as those of ABWR. Accordingly, in this embodiment, by increasing the continuous operation term of the plant, it is possible to realize a boiling water reactor wherein the utility rate of the plant increases to contribute to reduction of the electricity generation cost, keeping the same thermal margin and safety as those of ABWR.

Further, it is possible to improve the reactor shutdown margin, and the transient and stability performance by reducing the reactivity increase at the cold condition and the absolute value of the void coefficient.

Thirty-Second Embodiment

Figure 37:
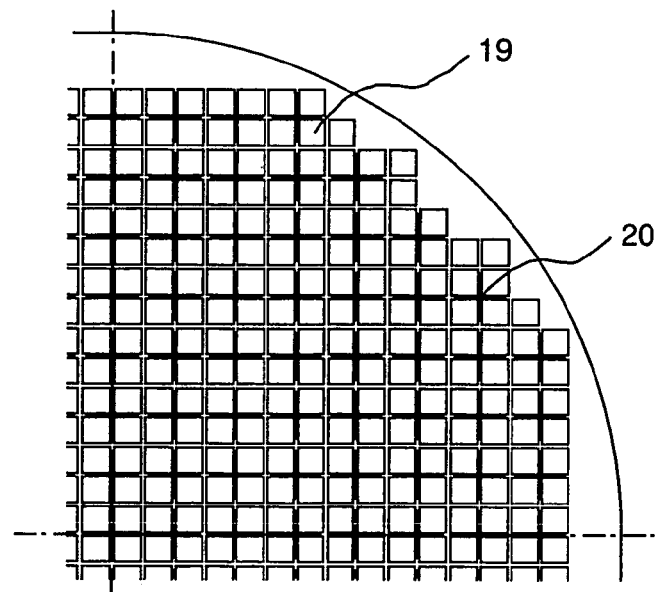
FIG. 37 is a lateral cross sectional view of a quarter of the core, where the fuel assemblies shown in FIG. 35 are loaded on the core.

The thirty-second embodiment and other embodiments according to the present invention will be explained with reference to FIGS. 37 to 41. These embodiments are examples of application of the structure to a BWR/5 core. FIG. 37 shows a quarter of a lateral cross sectional view of a core of an electric power of 1100 MWe according to the present embodiment.

There are shown a quarter of 764 fuel assemblies 19, and a quarter of 185 control rods 20 at a rate of one for every 4 fuel assemblies. Although the arrangement and contours of channel boxes, fuel rods, water rod, cross-shaped control rods and part-length fuel rods are the same as in the thirty-first embodiment shown in FIG. 35, the channel box distance is 16.7 mm in this embodiment. The core outer radius is 2.6 m and the active fuel length is 381 mm, when the fuel assemblies are loaded on the core shown in FIG. 37.

The power density is 49 kW/L. A volume rate of two-phase flow cooling water including sub-cooled water for cooling the fuel rods is 32%, the volume rate of water in the rod is 5%, the volume rate of the water in the gaps between the channel boxes outside of the channel box and water in the water rod is 26%, a volume rate of the fuel material is 27%, and a ratio of the volume rate of the two-phase flow water to the fuel material volume rate is 1.19. An amount of uranium contained in the unit volume of the core area is 2.4 kg/L. The ratio of the outer width of the channel box to the fuel assembly lattice width is 0.89.

The volume rate of the two-phase flow cooling water including sub-cooled water for cooling the fuel rods in the channel box area is 43%, the volume rate of water in the water rod is 7%, the volume rate of the fuel material is 36%, and the ratio of the two-phase flow cooling water to the volume rate of the fuel material is 1.19. The weight of uranium contained in the unit volume of the channel box area is 3.3 kg/L.

Figure 35:
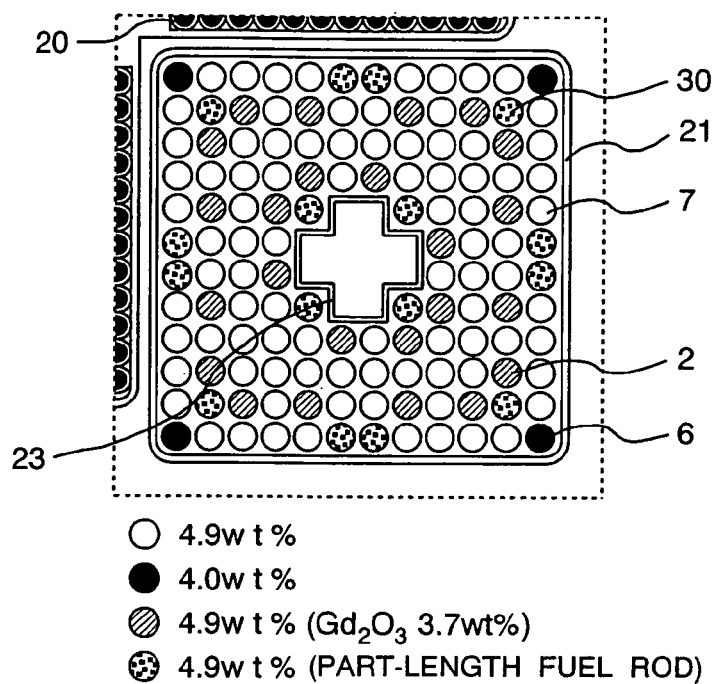
FIG. 35 is a lateral cross sectional view of a fuel assembly lattice according to thirty-first embodiment.

When the fuel assembly shown in FIG. 35 is employed, and when the number of replacement of fuel rods is 188 for each cycle, it is possible to constitute the reactor core having a super long-term of 23 months of average burning period at the discharge burnup of 49 Gd/t. When, the distance between the channel boxes is 16.7 mm, which is larger than 13 mm of BWR/5, and when the part-length fuel rods are employed, it is possible to suppress the increase of the reactivity at the cold condition, and to acquire the reactor shutdown margin of 1.0% Δk or more, thereby realizing the boiling water reactor having a smaller absolute value of the void coefficient than BWR/5.

When fuel rods having an outer diameter of 9.3 mm are arranged in a square lattice for the BWR/5 with a fuel rod pitch of 10.8 mm to increase the number of the fuel rods, thereby decreasing the average linear heat generation ratio to 95 W/cm, which is about 45% smaller than 1164 W/cm of BWR/5, it is possible to acquire MCPR of 1.3 or more, which leads to the same heat removal performance as that of BWR/5.

From the above reasons, it is possible to keep the same thermal margin as that of BWR/5, in the boiling water reactor having the same power of 1100 MWe, and the same core outer radius and the same active fuel length as those of BWR/5. The word BWR/5 is one type of a boiling water reactor. Accordingly, in this embodiment, by increasing the continuous operation term of the plant, it is possible to realize a boiling water reactor wherein the utility rate of the plant increases to contribute to reduction of the electricity generation cost, keeping the same thermal margin and safety as those of BWR/5.

Further, it is possible to improve the reactor shutdown margin, and the transient and stability performance by reducing the reactivity increase at the cold condition and the absolute value of the void coefficient.

Figure 38:
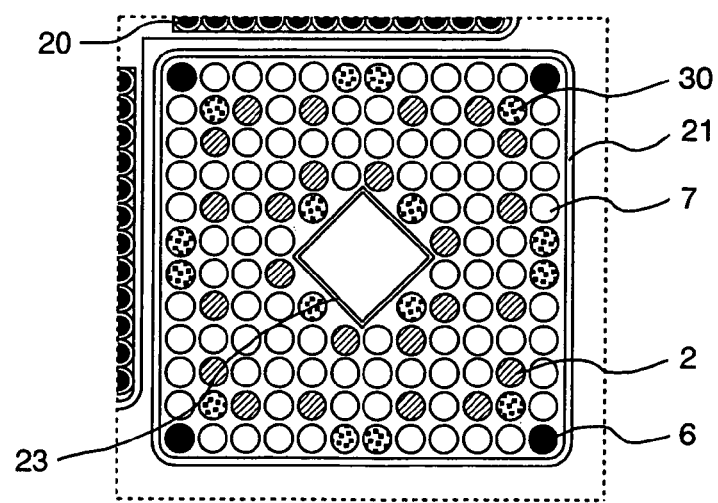
FIG. 38 is a lateral cross sectional view of a fuel assembly lattice according to thirty-second embodiment.
Figure 39:
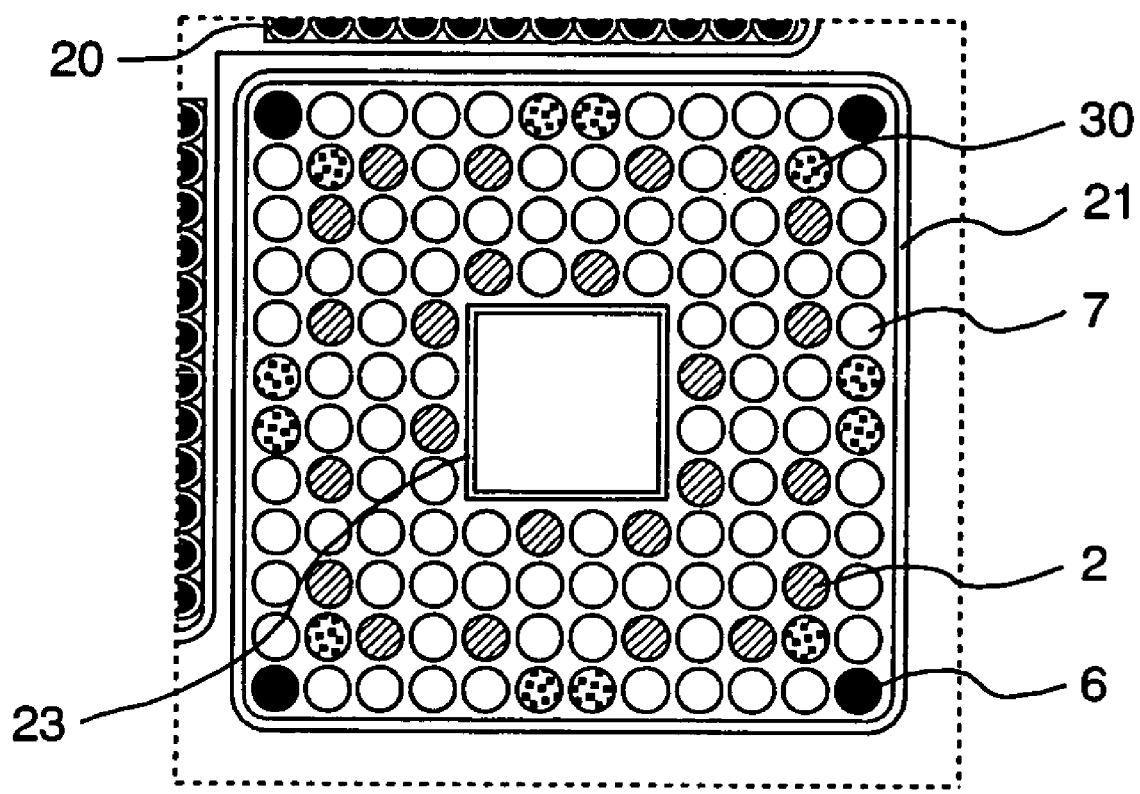
FIG. 39 through FIG. 43 are lateral cross sectional views of other embodiments of a fuel assembly lattice.
Figure 40:
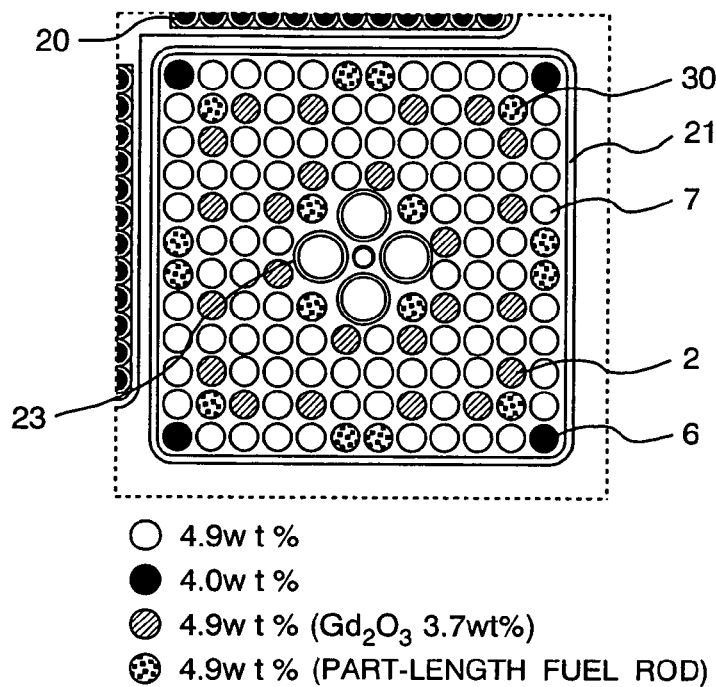
Figure 41:
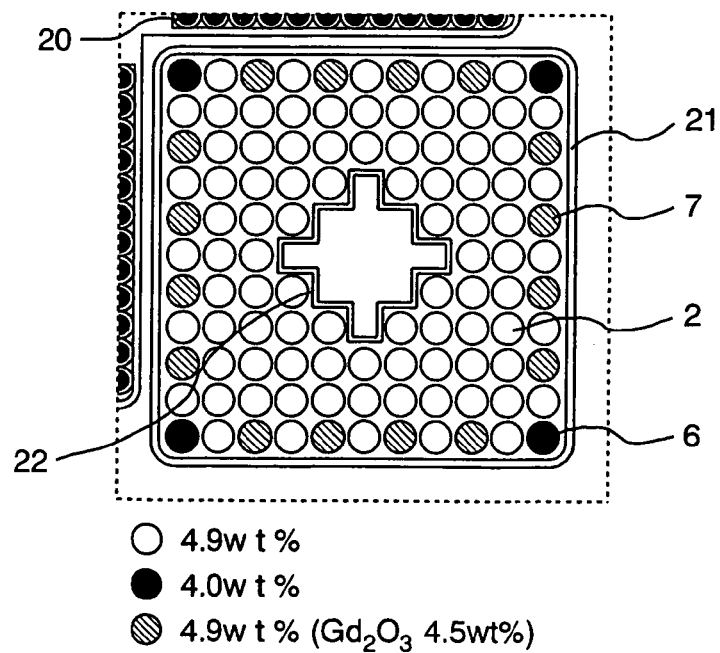
Figure 42:
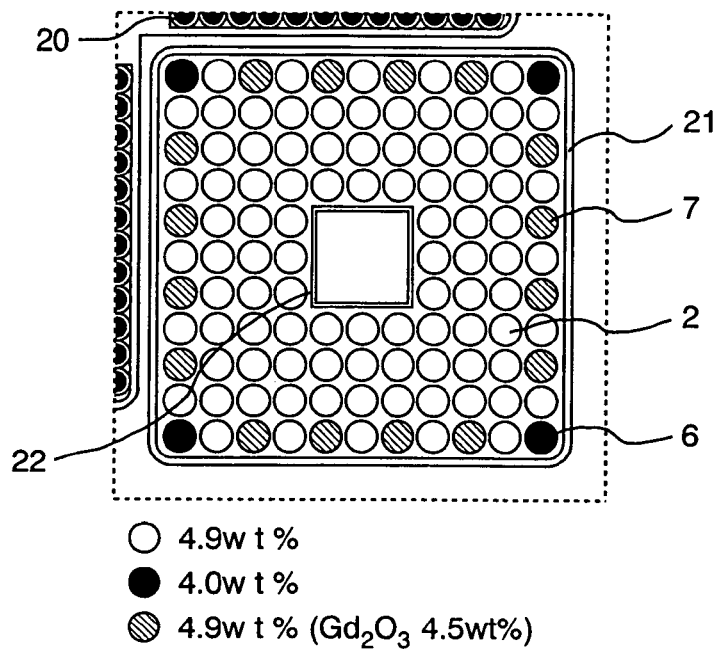
Figure 43:
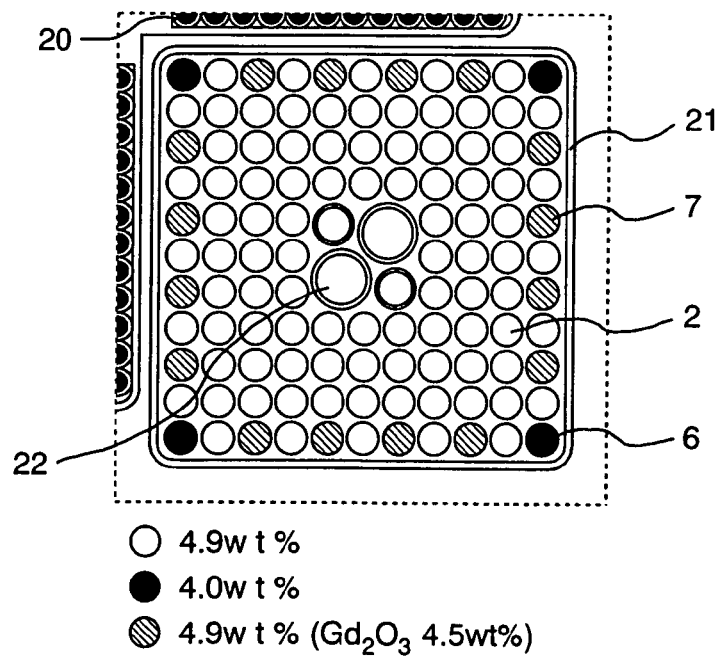

Although the contour of the water rod, in the fuel assembly is a cross-shape, the contour of the water rod is not limited. Shapes of lozenge or square shown in FIG. 38, FIG. 39, or FIG. 40 are acceptable. In 11 rows of fuel rods in embodiments 17-19, 21, 23 and 24, the contour of the water rod is not limited to lozenge, but the contours of water rods shown in FIG. 41, FIG. 42, or FIG. 43 are acceptable.

According to the embodiments of the present invention, one or more of the following advantages are brought about.
(1) Contribution to great reduction of the height of the core, thereby to reduce the construction cost of the reactor building
(2) Contribution to increase in the production of plutonium to lengthen the life of the fuel assembly, thereby to reduce the fuel cycle cost
(3) Contribution to expansion of continuous operation time period, thereby to improve the plant utility rate and to reduce the generation cost of electricity
(4) Contribution to building of the core by improvement of reactor shutdown performance, and transient and stability performance that are subjects at high burnup, by lowering the reactivity increase at the cold condition and the absolute value of void coefficient.

What is claimed is:

1. A fuel assembly for a reactor core of a burner type of a boiling water reactor, comprising at least one water rod and a fuel which is at least one of an oxide of a low enriched uranium having an average enrichment for the fuel assembly of 3 to 8 wt % and an average enrichment concentration of fissile plutonium for the fuel assembly of 2 to less than 6 wt %, wherein an average weight of the at least one of uranium and plutonium and minor actinides contained in a unit volume of an interior of a channel box which delimits the fuel assembly is 2.8 to 4.5 kg/L at a time of fuel loading of the fuel assembly in the reactor core of the boiling water reactor.

2. The fuel assembly according to claim 1, wherein the boiling water reactor provides a rate of volume of a region of two phase flow cooling water including subcooled water and saturated water for cooling fuel rods in the unit volume of the interior of the channel box of 24 to 52%, the two phase flow cooling water being in an area of the interior of the channel box, except for water in a guide rod into which a control rod is inserted and water in the at least one water rod.

3. The fuel assembly according to claim 1, wherein the boiling water reactor provides a rate of volume of subcooled water and saturated water in a guide rod into which a control rod is inserted and in the at least one water rod in the unit volume of the interior of the channel box of 5 to 12%.

4. The fuel assembly according to claim 1, wherein a rate of volume of a fuel material in the unit volume of the interior of the channel box of 30 to 49%.

5. The fuel assembly according to claim 1, wherein the boiling water reactor provides a ratio of volume of a region of two phase flow cooling water including subcooled water for cooling fuel rods within the channel box, except for water in a guide rod into which a control rod is inserted, and water in at least one water rod to volume of fuel material of 0.5 to 1.8.

6. The fuel assembly according to claim 1, wherein a distance between fuel rods is 0.1 to 2.6 mm in case of a square lattice configuration or 0.7 to 3.6 mm in case of triangular lattice configuration.

7. The fuel assembly according to claim 1, wherein an active fuel length is 1.0 to 3.0 m.

8. The fuel assembly according to claim 1, wherein the at least one water rod has a sectional area which is larger than a sectional area of a unit cell of a fuel rod lattice.

* * * * *